United States Patent
Ullal et al.

(10) Patent No.: US 12,462,501 B2
(45) Date of Patent: Nov. 4, 2025

(54) SYSTEM AND METHOD FOR EFFICIENT REDIRECTION OF USER INTERACTIONS AND GESTURES BETWEEN REMOTE AND LOCAL ENVIRONMENTS IN AUGMENTED REALITY

(71) Applicant: Vanderbilt University, Nashville, TN (US)

(72) Inventors: Akshith Ullal, Nashville, TN (US); Nilanjan Sarkar, Nashville, TN (US); Alexandra Watkins, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 162 days.

(21) Appl. No.: 18/522,011

(22) Filed: Nov. 28, 2023

(65) Prior Publication Data

US 2024/0177434 A1    May 30, 2024

Related U.S. Application Data

(60) Provisional application No. 63/385,366, filed on Nov. 29, 2022, provisional application No. 63/385,186, filed on Nov. 28, 2022.

(51) Int. Cl.
*G06T 19/00* (2011.01)
*G02B 27/01* (2006.01)
*G06F 3/01* (2006.01)

(52) U.S. Cl.
CPC ........ *G06T 19/006* (2013.01); *G02B 27/0172* (2013.01); *G06F 3/011* (2013.01)

(58) Field of Classification Search
CPC .... G06T 19/006; G02B 27/0172; G06F 3/011
See application file for complete search history.

(56) References Cited

PUBLICATIONS

"Azure Kinect DK," https://azure.microsoft.com/enus/ services/ kinect-dk/.
"Azure Kinect Examples for Unity." [Online]. Version Accessed Oct. 2, 2022. Available: https://web.archive.org/web/20221002150707/ https://assetstore.unity.com/packages/tools/integration/azure-kinect-examples-for-unity-149700 (1 page).
Abbott, P. (2008). On the perimeter of an ellipse. Mathematica Journal, 11(2), 172.

(Continued)

*Primary Examiner* — Jeffery A Brier
(74) *Attorney, Agent, or Firm* — Michael Best & Friedrich LLP

(57) ABSTRACT

A system and method for mapping a user's gestural interactions (positional interactions and pointing interactions) from their environment to that of their avatar's environment. The system and method provide a multi-objective optimization (MO) process with the primary objective being to minimize the positional error between the end effector and goal target and the secondary objective being to preserve the original body pose while redirecting the end effector to the goal target. The primary and second objectives are addressed with a dynamic weight allocation approach that optimizes between the objectives of body joint redirection and preserving the body pose of the original interaction.

11 Claims, 23 Drawing Sheets
(21 of 23 Drawing Sheet(s) Filed in Color)

(56) References Cited

PUBLICATIONS

Achilleos, A. P., et al. (Jun. 2013). Developing an effective social presence system for older adults: The connected vitality network. In Proceedings of the ITI 2013 35th International Conference on Information Technology Interfaces (pp. 153-159). IEEE.

Agethen, P., et al. (Nov. 2018). Towards realistic walk path simulation of single subjects: Presenting a probabilistic motion planning algorithm. In Proceedings of the 11th ACM SIGGRAPH Conference on Motion, Interaction and Games (pp. 1-10).

Alem, L., et al. (2011). HandsOnVideo: Towards a gesture based mobile AR system for remote collaboration. In Recent trends of mobile collaborative augmented reality systems (pp. 135-148). New York, NY: Springer New York.

Amis, J. M., et al. Organisational change in a (post-) pandemic world: Rediscovering interests and values. Journal of Management Studies. J. Manag. Stud., vol. 58, No. 2, pp. 582-586, 2021.

Aravind, G., et al. (2014). Virtual reality-based navigation task to reveal obstacle avoidance performance in individuals with visuospatial neglect. IEEE Transactions on Neural Systems and Rehabilitation Engineering, 23(2), 179-188.

Aristidou, A., et al. (2016). Extending FABRIK with model constraints. Computer Animation and Virtual Worlds, 27(1), 35-57.

Aristidou, A. et al. "FABRIK: A fast, iterative solver for the Inverse Kinematics problem." Graphical Models 73.5 (2011): 243-260.

Atkinson, A. et al. "Evidence for distinct contributions of form and motion information to the recognition of emotions from body gestures." Cognition 104.1 (2007): 59-72.

Ayyanchira, A., et al. (2022). Toward cross-platform immersive visualization for indoor navigation and collaboration with augmented reality. Journal of Visualization, 25(6), 1249-1266.

Azmandian, M., et al. (Mar. 2017). An evaluation of strategies for two-user redirected walking in shared physical spaces. In 2017 IEEE Virtual Reality (VR) (pp. 91-98). IEEE.

Babapour Chafi, M., et al. (2021). Post-pandemic office work: Perceived challenges and opportunities for a sustainable work environment. Sustainability, 14(1), 294.

Bailenson J.N. , "Nonverbal overload: A theoretical argument for the causes of Zoom fatigue," 2021.

Bailenson, J. N., et al. (2005). The independent and interactive effects of embodied-agent appearance and behavior on self-report, cognitive, and behavioral markers of copresence in immersive virtual environments. Presence, 14(4), 379-393.

Bauer, M. (2007). Tracking errors in augmented reality (Doctoral dissertation, Technische Universität München). 166 pages.

Beeson, P., et al. (Nov. 2015). TRAC-IK: An open-source library for improved solving of generic inverse kinematics. In 2015 IEEE-RAS 15th International Conference on Humanoid Robots (Humanoids) (pp. 928-935). IEEE.

Bern, M., et al. (1995). Mesh generation and optimal triangulation. In Computing in Euclidean geometry (pp. 47-123).

Beyan, C., et al. (2021). Modeling multiple temporal scales of full-body movements for emotion classification. IEEE Transactions on Affective Computing.

Beyan, C., et al. (2017, October). Moving as a leader: Detecting emergent leadership in small groups using body pose. In Proceedings of the 25th ACM international conference on Multimedia (pp. 1425-1433).

Bhattacharyya, P., et al. (May 2019). Brick: Toward a model for designing synchronous colocated augmented reality games. In Proceedings of the 2019 CHI Conference on Human Factors in Computing Systems (pp. 1-9).

Biocca, F., et al. (2003). Toward a more robust theory and measure of social presence: Review and suggested criteria. Presence: Teleoperators & virtual environments, 12(5), 456-480.

Bloise, N., et al. (2017). Obstacle avoidance with potential field applied to a rendezvous maneuver. Applied Sciences, 7(10), 1042.

Bohannon, R. W. (1997). Comfortable and maximum walking speed of adults aged 20-79 years: reference values and determinants. Age and ageing, 26(1), 15-19.

Borenstein, J., et al. (1991). The vector field histogram-fast obstacle avoidance for mobile robots. IEEE transactions on robotics and automation, 7(3), 278-288.

Borghese, N. A., et al. (1996). Kinematic determinants of human locomotion. The Journal of physiology, 494(3), 863-879.

Brogan, D. C., et al. (May 2003). Realistic human walking paths. In Proceedings 11th IEEE International Workshop on Program Comprehension (pp. 94-101). IEEE.

Budiyanto, A., et al. (Aug. 2015). UAV obstacle avoidance using potential field under dynamic environment. In 2015 International Conference on Control, Electronics, Renewable Energy and Communications (ICCEREC) (pp. 187-192). IEEE.

Campbell, S. et al. "Path planning techniques for mobile robots a review," in 2020 6th International Conference on Mechatronics and Robotics Engineering (ICMRE), 2020, pp. 12-16.

Canutescu, A. A., et al. (2003). Cyclic coordinate descent: A robotics algorithm for protein loop closure. Protein science, 12(5), 963-972.

Chandrupatla, T. R., et al. (2010). The perimeter of an ellipse. Mathematical Scientist, 35(2).

Chen, C., et al. (2010). Learning a 3D human pose distance metric from geometric pose descriptor. IEEE transactions on visualization and computer graphics, 17(11), 1676-1689.

Chen, C., et al. (2009). Perceptual 3D pose distance estimation by boosting relational geometric features. Computer Animation and Virtual Worlds, 20(2-3), 267-277.

Chen, H., et al. (Mar. 2018). Redirected walking in irregularly shaped physical environments with dynamic obstacles. In 2018 IEEE Conference on Virtual Reality and 3D User Interfaces (VR) (pp. 523-524). IEEE.

Chen, Y., et al. (Apr. 2020). Understanding viewport-and world-based pointing with everyday smart devices in immersive augmented reality. In Proceedings of the 2020 CHI Conference on Human Factors in Computing Systems (pp. 1-13).

Chi, K. H., et al. (Apr. 2011). Obstacle avoidance in mobile robot using neural network. In 2011 International Conference on Consumer Electronics, Communications and Networks (CECNet) (pp. 5082-5085). IEEE.

Choi, K. J., et al. (2000). Online motion retargetting. The Journal of Visualization and Computer Animation, 11(5), 223-235.

Choset, H., et al. (May 1995). Sensor based planning. I. The generalized Voronoi graph. In Proceedings of 1995 IEEE international conference on robotics and automation (vol. 2, pp. 1649-1655). IEEE.

Coleman, D. M., et al. (Mar. 2008). O3: An optimal and opportunistic path planner (with obstacle avoidance) using voronoi polygons. In 2008 10th IEEE International Workshop on Advanced Motion Control (pp. 371-376). IEEE.

Collins, T., et al. (2016). PASO: an integrated, scalable PSO-based optimization framework for hyper-redundant manipulator path planning and inverse kinematics. Information Sciences Institute Technical Report.

Costa, N. R., et al. (2010). Multiple response optimization: a global criterion-based method. Journal of chemometrics, 24(6), 333-342.

Cowell, A. J., et al. (2005). Manipulation of non-verbal interaction style and demographic embodiment to increase anthropomorphic computer character credibility. International journal of human-computer studies, 62(2), 281-306.

Crum, W. R., et al. (2004). Non-rigid image registration: theory and practice. The British journal of radiology, 77(suppl_2), S140-S153.

Dinas, S., et al. (2014). A review on Delaunay triangulation with application on computer vision. Int. J. Comput. Sci. Eng, 3, 9-18.

Dong, Z. C., et al. (2019). Redirected smooth mappings for multiuser real walking in virtual reality. ACM Transactions on Graphics (TOG), 38(5), 1-17.

Ekman, P., et al. (1967). Head and body cues in the judgment of emotion: A reformulation. Perceptual and motor skills, 24(3), 711-724.

(56) References Cited

PUBLICATIONS

Elvezio, C., et al. (Oct. 2018). Collaborative virtual reality for low-latency interaction. In Adjunct Proceedings of the 31st Annual ACM Symposium on User Interface Software and Technology (pp. 179-181).

Evangelista Belo, J. M., et al. (May 2021). XRgonomics: facilitating the creation of ergonomic 3D interfaces. In Proceedings of the 2021 CHI Conference on Human Factors in Computing Systems (pp. 1-11).

Everett, A. Benefits and challenges of fun in the workplace. Library Leadership & Management, 25(1)., pp. 1-10, 2011.

Falconi, R., et al. (2014). Inverse kinematics of serial manipulators in cluttered environments using a new paradigm of particle swarm optimization. IFAC Proceedings Volumes, 47(3), 8475-8480.

Fan, J., et al. (2021). SAR-connect: a socially assistive robotic system to support activity and social engagement of older adults. IEEE Transactions on Robotics, 38(2), 1250-1269.

Fan, J., et al. (2021). Field testing of Ro-Tri, a robot-mediated triadic interaction for older adults. International Journal of Social Robotics, 13, 1711-1727.

Faul, F., et al. (2007). G* Power 3: A flexible statistical power analysis program for the social, behavioral, and biomedical sciences. Behavior research methods, 39(2), 175-191.

Floater, M. S., et al. (2005). Surface parameterization: a tutorial and survey. Advances in multiresolution for geometric modelling, 157-186.

Gamelin, G., et al. (2021). Point-cloud avatars to improve spatial communication in immersive collaborative virtual environments. Personal and Ubiquitous Computing, 25, 467-484.

Geerse, D. J., et al. (2020). Quantifying spatiotemporal gait parameters with HoloLens in healthy adults and people with Parkinson's disease: Test-retest reliability, concurrent validity, and face validity. Sensors, 20(11), 3216.

Gibson, A., et al. (2018). Evaluation of a visual-tactile multimodal display for surface obstacle avoidance during walking. IEEE Transactions on Human-Machine Systems, 48(6), 604-613.

Gonzalez, E. J., et al. (Apr. 2022). A Model Predictive Control Approach for Reach Redirection in Virtual Reality. In Proceedings of the 2022 CHI Conference on Human Factors in Computing Systems (pp. 1-15).

Hale, J., et al. (2016). Testing the relationship between mimicry, trust and rapport in virtual reality conversations. Scientific reports, 6(1), 35295.

Han, W. G., et al. (Oct. 1997). Genetic algorithm based path planning and dynamic obstacle avoidance of mobile robots. In 1997 IEEE International Conference on Systems, Man, and Cybernetics. Computational Cybernetics and Simulation (vol. 3, pp. 2747-2751). IEEE.

Hang, S. (2015). TetGen, a Delaunay-based quality tetrahedral mesh generator. ACM Trans. Math. Softw, 41(2), 11.

Harada, T., et al. (Nov. 2004). Quantitative evaluation method for pose and motion similarity based on human perception. In 4th IEEE/RAS International Conference on Humanoid Robots, 2004. (vol. 1, pp. 494-512). IEEE.

He, Z., et al. (Nov. 2020). Collabovr: A reconfigurable framework for creative collaboration in virtual reality. In 2020 IEEE International Symposium on Mixed and Augmented Reality (ISMAR) (pp. 542-554). IEEE.

Henk M., "Löwner-John Ellipsoids," Optim. Stories, Doc. Math., vol. I, No. 2012, pp. 95-106, 2012.

Henrikson, R., et al. (Apr. 2020). Head-coupled kinematic template matching: A prediction model for ray pointing in vr. In Proceedings of the 2020 CHI Conference on Human Factors in Computing Systems (pp. 1-14).

Hirt, C., et al. (2018). Geometry extraction for ad hoc redirected walking using a SLAM device. In Augmented Reality, Virtual Reality, and Computer Graphics: 5th International Conference, AVR 2018, Otranto, Italy, Jun. 24-27, 2018, Proceedings, Part I 5 (pp. 35-53). Springer International Publishing.

Ho, E. S., et al. (2009). Indexing and retrieving motions of characters in close contact. IEEE Transactions on Visualization and Computer Graphics, 15(3), 481-492.

Hoffmann, C., et al. (2020). Impact of augmented reality guidance for car repairs on novice users of AR: a field experiment on familiar and unfamiliar tasks. In Proceedings of Mensch und Computer 2020 (pp. 279-289).

Hoppe, A. H., et al. (Mar. 2018). Personal perspective: Using modified world views to overcome real-life limitations in virtual reality. In 2018 IEEE Conference on Virtual Reality and 3D User Interfaces (VR) (pp. 577-578). IEEE.

Hoppe, A. H., et al. (2021). Shisha: Enabling shared perspective with face-to-face collaboration using redirected avatars in virtual reality. Proceedings of the ACM on Human-Computer Interaction, 4(CSCW3), 1-22.

Hubenschmid, S. et al. 2021. Stream: Exploring the combination of spatially-aware tablets with augmented reality head-mounted displays for immersive analytics. In Proceedings of the 2021 CHI Conference on Human Factors in Computing Systems, 1-14.

Hung, H., et al. (2010). Estimating cohesion in small groups using audio-visual nonverbal behavior. IEEE Transactions on Multimedia, 12(6), 563-575.

Hutton, C., et al. (Mar. 2016). A realistic walking model for enhancing redirection in virtual reality. In 2016 IEEE Virtual Reality (VR) (pp. 183-184). IEEE.

Ibáñez, M. B., et al. (2018). Augmented reality for STEM learning: A systematic review. Computers & Education, 123, 109-123.

Igarashi, T., et al. (2005). As-rigid-as-possible shape manipulation. ACM transactions on Graphics (TOG), 24(3), 1134-1141.

Jang, S., et al. (Oct. 2014). GestureAnalyzer: visual analytics for pattern analysis of mid-air hand gestures. In Proceedings of the 2nd ACM symposium on Spatial user interaction (pp. 30-39).

Jin, T., et al. (May 2018). Aura mesh: Motion retargeting to preserve the spatial relationships between skinned characters. In Computer Graphics Forum (vol. 37, No. 2, pp. 311-320).

Jo, D., et al. (2019). AR enabled IoT for a smart and interactive environment: A survey and future directions. Sensors, 19(19), 4330.

Jo, D., et al. (2015). SpaceTime: adaptive control of the teleported avatar for improved AR tele-conference experience. Computer Animation and Virtual Worlds, 26(3-4), 259-269.

John, B., et al. (2020). A review of mixed reality in Health Care. Delivering Superior Health and Wellness Management with IoT and Analytics, 375-382.

Joly, H. "Lead your team into a post-pandemic world," Harvard Bus. Rev. https//hbr.org/2020/05/lead-your-team-into-a-post-pandemic-world, 2020.

Jung, I. K., et al. (Jul. 1999). Path planning of mobile robot using neural network. In ISIE'99. Proceedings of the IEEE International Symposium on Industrial Electronics (Cat. No. 99TH8465) (vol. 3, pp. 979-983). IEEE.

Kanamori, K., et al. (Oct. 2018). Obstacle avoidance method in real space for virtual reality immersion. In 2018 IEEE International Symposium on Mixed and Augmented Reality (ISMAR) (pp. 80-89). IEEE.

Kane, G. C., et al. (2021). Redesigning the post-pandemic workplace. MIT Sloan Management Review, 62(3), 12-14.

Kang, H., et al. (Oct. 2019). SafeAR: AR alert system assisting obstacle avoidance for pedestrians. In 2019 IEEE International Symposium on Mixed and Augmented Reality Adjunct (ISMAR-Adjunct) (pp. 81-82). IEEE.

Kaushik, R., et al. (2018). Imitating human movement using a measure of verticality to animate low degree-of-freedom non-humanoid virtual characters. In Social Robotics: 10th International Conference, ICSR 2018, Qingdao, China, Nov. 28-30, 2018, Proceedings 10 (pp. 588-598). Springer International Publishing.

Kenwright, B. (2022). Real-time character inverse kinematics using the gauss-seidel iterative approximation method. arXiv preprint arXiv:2211.00330.

Keshavarzi, M., et al. (Mar. 2020). Optimization and manipulation of contextual mutual spaces for multi-user virtual and augmented reality interaction. In 2020 IEEE conference on virtual reality and 3D user interfaces (VR) (pp. 353-362). IEEE.

(56) References Cited

PUBLICATIONS

Khatib, O. (Mar. 1985). Real-time obstacle avoidance for manipulators and mobile robots. In Proceedings. 1985 IEEE international conference on robotics and automation (vol. 2, pp. 500-505). IEEE.

Kim, C. J., et al. (2014). Obstacle avoidance method for wheeled mobile robots using interval type-2 fuzzy neural network. IEEE Transactions on Fuzzy Systems, 23(3), 677-687.

Kim, T., et al. (Mar. 2016). Redirected head gaze to support ar meetings distributed over heterogeneous environments. In 2016 IEEE Virtual Reality (VR) (pp. 207-208). IEEE.

Kim, Y. et al. 2016. Retargeting human-object interaction to virtual avatars. IEEE transactions on visualization and computer graphics. 22, 11 (2016), 2405-2412.

Kleinsmith, A., et al. (2012). Affective body expression perception and recognition: A survey. IEEE Transactions on Affective Computing, 4(1), 15-33.

Kobayashi, F., et al. (Aug. 2003). Re-formation of mobile robots using genetic algorithm and reinforcement learning. In SICE 2003 Annual Conference (IEEE Cat. No. 03TH8734) (vol. 3, pp. 2902-2907). IEEE.

Kohli, L. (2013). Redirected touching (Doctoral dissertation, The University of North Carolina at Chapel Hill).

Kreijns, K., et al. (2022). Social presence: Conceptualization and measurement. Educational Psychology Review, 34(1), 139-170.

Kulpa, R., et al. (Dec. 2005). Fast inverse kinematics and kinetics solver for human-like figures. In 5th IEEE-RAS International Conference on Humanoid Robots, 2005. (pp. 38-43). IEEE.

Kunz, T., et al. (2011). Turning paths into trajectories using parabolic blends. Georgia Institute of Technology.

Kwan, K. C., et al. (May 2019). Mobi3dsketch: 3d sketching in mobile ar. In Proceedings of the 2019 CHI Conference on Human Factors in Computing Systems (pp. 1-11).

Lapointe, J. F., et al. (2020). A literature review of AR-based remote guidance tasks with user studies. In Virtual, Augmented and Mixed Reality. Industrial and Everyday Life Applications: 12th International Conference, VAMR 2020, Held as Part of the 22nd HCI International Conference, HCII 2020, Copenhagen, Denmark, Jul. 19-24, 2020, Proceedings, Part II 22 (pp. 111-120). Springer International Publishing.

Lasserre, J. B. (2015). A generalization of Löwner-John's ellipsoid theorem. Mathematical Programming, 152, 559-591.

Lee et al. "Automatic path generation for group dance performance using a genetic algorithm," Multimed. Tools Appl., vol. 78, No. 6, pp. 7517-7541 (2019).

Lee S. et al. "Projective Motion Correction with Contact Optimization," IEEE Trans. Vis. Comput. Graph., vol. 25, No. 4, pp. 1746-1759, 2018.

Lee, J., et al. (Jul. 1999). A hierarchical approach to interactive motion editing for human-like figures. In Proceedings of the 26th annual conference on Computer graphics and interactive techniques (pp. 39-48).

Lee, J., et al. (Jul. 2002). Interactive control of avatars animated with human motion data. In Proceedings of the 29th annual conference on Computer graphics and interactive techniques (pp. 491-500).

Lelas, J. L., et al. (2003). Predicting peak kinematic and kinetic parameters from gait speed. Gait & posture, 17(2), 106-112.

Li, H. et al. 2008. Global correspondence optimization for non-rigid registration of depth scans. Computer graphics forum (2008), 1421-1430.

Li, T. H. S., et al. (2010). Walking motion generation, synthesis, and control for biped robot by using PGRL, LPI, and fuzzy logic. IEEE Transactions on Systems, Man, and Cybernetics, Part B (Cybernetics), 41(3), 736-748.

Lindlbauer, D., et al. (Apr. 2018). Remixed reality: Manipulating space and time in augmented reality. In Proceedings of the 2018 CHI Conference on Human Factors in Computing Systems (pp. 1-13).

Lindlbauer, D., et al. (Oct. 2019). Context-aware online adaptation of mixed reality interfaces. In Proceedings of the 32nd annual ACM symposium on user interface software and technology (pp. 147-160).

Liu, Y., et al. (Jul. 2020). On the normalization in evolutionary multi-modal multi-objective optimization. In 2020 IEEE Congress on Evolutionary Computation (CEC) (pp. 1-8). IEEE.

Maas, M. J., et al. (2020). Virtual, augmented and mixed reality in K-12 education: A review of the literature. Technology, Pedagogy and Education, 29(2), 231-249.

MacKenzie S.H. et al., "Adventure in the age of COVID-19: Embracing microadventures and locavism in a post-pandemic world," Leis. Sci., vol. 43, No. 1-2, pp. 62-69, 2020.

Malathi, S. et al. "Building and Deploying a Static Application using Jenkins and Docker in AWS," Int. J. Trend Sci. Res. Dev., vol. 4, No. 4, pp. 16-18, 2020.

Marc, A. (2000). As-rigid-as-possible Shape Interpolation. In Proceedings of the 27th annual conference on Computer graphics and interactive techniques, 2000., pp. 157-164.

Marler, R. T., et al. (2004). Survey of multi-objective optimization methods for engineering. Structural and multidisciplinary optimization, 26, 369-395.

Maroger, I., et al. (Oct. 2020). Walking human trajectory models and their application to humanoid robot locomotion. In 2020 IEEE/RSJ International Conference on Intelligent Robots and Systems (IROS) (pp. 3465-3472). IEEE.

Maturana, B. et al. "Architecture, urbanism and health in a post-pandemic virtual world." Archnet-IJAR: International Journal of Architectural Research 15.1 (2021): 1-9.

Mille, M. L., et al. (1998). Are human anticipatory postural adjustments affected by a modification of the initial position of the center of gravity?. Neuroscience letters, 242(2), 61-64.

Mori, M., et al. (2012). The uncanny valley [from the field]. IEEE Robotics & automation magazine, 19(2), 98-100.

Narang, S. et al. "Simulating movement interactions between avatars & agents in virtual worlds using human motion constraints," in 2018 IEEE Conference on Virtual Reality and 3D User Interfaces (VR), 2018, pp. 9-16.

Nebeling, M., et al. (Apr. 2020). XRDirector: A role-based collaborative immersive authoring system. In Proceedings of the 2020 CHI Conference on Human Factors in Computing Systems (pp. 1-12).

Norman, M., et al. (Mar. 2019). A mixed presence collaborative mixed reality system. In 2019 IEEE Conference on Virtual Reality and 3D User Interfaces (VR) (pp. 1106-1107). IEEE.

Oh, C. S., et al. (2018). A systematic review of social presence: Definition, antecedents, and implications. Frontiers in Robotics and AI, 5, 409295.

Pandey, A., et al. (2017). Mobile robot navigation and obstacle avoidance techniques: A review. Int Rob Auto J, 2(3), 00022.

Park, D. H., et al. (Dec. 2008). Movement reproduction and obstacle avoidance with dynamic movement primitives and potential fields. In Humanoids 2008-8th IEEE-RAS International Conference on Humanoid Robots (pp. 91-98). IEEE.

Park, S. I., et al. (2004). On-line motion blending for real-time locomotion generation. Computer Animation and Virtual Worlds, 15(3-4), 125-138.

Pejsa, T., et al. (Feb. 2016). Room2room: Enabling life-size telepresence in a projected augmented reality environment. In Proceedings of the 19th ACM conference on computer-supported cooperative work & social computing (pp. 1716-1725).

Persson, P. O., et al. (2004). A simple mesh generator in Matlab. SIAM review, 46(2), 329-345.

Pfeuffer, K., et al. (2021). ARtention: A design space for gaze-adaptive user interfaces in augmented reality. Computers & Graphics, 95, 1-12.

Pfeuffer, K., et al. (May 2019). Behavioural biometrics in VR: Identifying people from body motion and relations in virtual reality. In Proceedings of the 2019 CHI Conference on Human Factors in Computing Systems (pp. 1-12).

Pinkall, U., et al. (1993). Computing discrete minimal surfaces and their conjugates. Experimental mathematics, 2(1), 15-36.

(56) References Cited

PUBLICATIONS

Piumsomboon, T., et al. (Oct. 2017). [poster] covar: Mixed-platform remote collaborative augmented and virtual realities system with shared collaboration cues. In 2017 IEEE International Symposium on Mixed and Augmented Reality (ISMAR-Adjunct) (pp. 218-219). IEEE.

Piumsomboon, T., et al. (Apr. 2018). Mini-me: An adaptive avatar for mixed reality remote collaboration. In Proceedings of the 2018 CHI conference on human factors in computing systems (pp. 1-13).

Plasson, C., et al. (Nov. 2019). Tabletop ar with hmd and tablet: a comparative study for 3D selection. In Proceedings of the 2019 ACM International Conference on Interactive Surfaces and Spaces (pp. 409-414).

Radu, I., et al. (2021). Unequal impacts of augmented reality on learning and collaboration during robot programming with peers. Proceedings of the ACM on Human-Computer Interaction, 4(CSCW3), 1-23.

Razzaque S. et al., Redirected walking. The University of North Carolina at Chapel Hill, 2005.

Ren, J., et al. (2010, June). Simulation of virtual human running based on inverse kinematics. In 2010 2nd International Conference on Education Technology and Computer (vol. 3, pp. V3-360). IEEE.

Roether, C. L., et al. (2009). Critical features for the perception of emotion from gait. Journal of vision, 9(6), 15-15.

Roth, D., et al. (Mar. 2016). A simplified inverse kinematic approach for embodied VR applications. In 2016 IEEE Virtual Reality (VR) (pp. 275-276). IEEE.

Roth, D., et al. (Oct. 2018). Injecting nonverbal mimicry with hybrid avatar-agent technologies: A naïve approach. In Proceedings of the 2018 ACM Symposium on Spatial User Interaction (pp. 69-73).

Sanchez-Cortes, D., et al. (2011). A nonverbal behavior approach to identify emergent leaders in small groups. IEEE transactions on multimedia, 14(3), 816-832.

Santi, G. M., et al. (2021). Augmented reality in industry 4.0 and future innovation programs. Technologies, 9(2), 33.

Savage, J., et al. (2013). Obstacle avoidance behaviors for mobile robots using genetic algorithms and recurrent neural networks. IFAC Proceedings vols. 46(24), 141-146.

Schmidt, S. et al. "Floor-Projected Guidance Cues for Collaborative Exploration of Spatial Augmented Reality Setups," ISS 2018—Proc. 2018 ACM Int. Conf. Interact. Surfaces Spaces, pp. 279-289, 2018.

Schroeder, R. (2002). Social interaction in virtual environments: Key issues, common themes, and a framework for research. In The social life of avatars: Presence and interaction in shared virtual environments (pp. 1-18). London: Springer London.

Sheffer, A., et al. (2007). Mesh parameterization methods and their applications. Foundations and Trends® in Computer Graphics and Vision, 2(2), 105-171.

Shen, C., et al. (2018). Path-following control of an AUV: A multiobjective model predictive control approach. IEEE Transactions on Control Systems Technology, 27(3), 1334-1342.

So, C. K., et al. (2005). Entropy-based motion extraction for motion capture animation. Computer Animation and Virtual Worlds, 16(3-4), 225-235.

Sorkine, O., et al. (Jul. 2007). As-rigid-as-possible surface modeling. In Symposium on Geometry processing (vol. 4, pp. 109-116).

Sousa, M., et al. (May 2019). Warping deixis: distorting gestures to enhance collaboration. In Proceedings of the 2019 CHI Conference on Human Factors in Computing Systems (pp. 1-12).

Sra, M., et al. (Nov. 2016). Procedurally generated virtual reality from 3D reconstructed physical space. In Proceedings of the 22nd ACM Conference on Virtual Reality Software and Technology (pp. 191-200).

Starke, S. et al. "A Forward Kinematics Data Structure for Efficient Evolutionary Inverse Kinematics," in Computational Kinematics. Springer, 2018, pp. 560-568.

Starke, S. et al. "Memetic Evolution for Generic Full-Body Inverse Kinematics in Robotics and Animation," IEEE Transactions on Evolutionary Computation, vol. 23, No. 3, pp. 406-420, 2019.

Suzanna S. et al. "Immersive Learning by Implementing Augmented Reality: Now and The Future," J. Comput. Sci. Vis. Commun. Des., vol. 6, No. 1, pp. 22-28, 2021.

Tak S. et al. "A physically-based motion retargeting filter," ACM Trans. Graph., vol. 24, No. 1, pp. 98-117, 2005.

Thomas, J., et al. (Mar. 2019). A general reactive algorithm for redirected walking using artificial potential functions. In 2019 IEEE Conference on Virtual Reality and 3D User Interfaces (VR) (pp. 56-62). IEEE.

Thomas, J., et al. (Nov. 2020). Towards physically interactive virtual environments: Reactive alignment with redirected walking. In Proceedings of the 26th ACM Symposium on Virtual Reality Software and Technology (pp. 1-10).

Tomczak M. et al. "The need to report effect size estimates revisited. An overview of some recommended measures of effect size," Trends in Sport Sciences vol. 1, 2014, 19-25.

Ullal, A., et al. (Nov. 2022). Mapping of Locomotion Paths between Remote Environments in Mixed Reality using Mesh Deformation. In Proceedings of the 28th ACM Symposium on Virtual Reality Software and Technology (pp. 1-2).

Ullal, A., et al. (Mar. 2023). A Piecewise Approach to Mapping Interactions between Room-scale Environments in Remote Mixed/Augmented Reality. In 2023 IEEE Conference on Virtual Reality and 3D User Interfaces Abstracts and Workshops (VRW) (pp. 663-664). IEEE.

Ullal, A., et al. (Dec. 2022). A Multi-Objective Optimization Framework for Redirecting Pointing Gestures in Remote-Local Mized/Augmented Reality. In Proceedings of the 2022 ACM Symposium on Spatial User Interaction (pp. 1-11).

Ullal, A., et al. (2023). An Efficient Redirection of Positional Interactions in Mixed/Augmented Reality. International Journal of Semantic Computing, 17(01), 95-118.

Ullal, A., et al. (Nov. 2021). A Dynamically Weighted Multi-Objective Optimization Approach to Positional Interactions in Remote-Local Augmented/Mixed Reality. In 2021 IEEE International Conference on Artificial Intelligence and Virtual Reality (AIVR) (pp. 29-37). IEEE.

Ungureanu, D., et al. (2020). Hololens 2 research mode as a tool for computer vision research. arXiv preprint arXiv:2008.11239.

Urtasun, R., et al. (Dec. 2004). Style-based motion synthesis. In Computer Graphics Forum (vol. 23, No. 4, pp. 799-812).

Valentini, I., et al. (Mar. 2020). Improving obstacle awareness to enhance interaction in virtual reality. In 2020 IEEE Conference on Virtual Reality and 3D User Interfaces (VR) (pp. 44-52). IEEE.

Villanueva, A., et al. (Apr. 2020). Meta-AR-app: an authoring platform for collaborative augmented reality in STEM classrooms. In Proceedings of the 2020 CHI conference on human factors in computing systems (pp. 1-14).

Wang, J., et al. (Jul. 2003). An evaluation of a cost metric for selecting transitions between motion segments. In Symposium on Computer Animation (vol. 2, No. 3).

Wang, X., et al. (2014). Mutual awareness in collaborative design: An Augmented Reality integrated telepresence system. Computers in industry, 65(2), 314-324.

Wei S.-E. et al., "Vr facial animation via multiview image translation," ACM Trans. Graph., vol. 38, No. 4, pp. 1-16, 2019.

Wen, S. et al. "Elman fuzzy adaptive control for obstacle avoidance of mobile robots using hybrid force/position incorporation," IEEE Trans. Syst. Man, Cybern. Part C (Applications Rev., vol. 42, No. 4, pp. 603-608, 2011.

Wienrich, C., et al. (Mar. 2018). Social presence and cooperation in large-scale multi-user virtual reality-the relevance of social interdependence for location-based environments. In 2018 IEEE Conference on Virtual Reality and 3D User Interfaces (VR) (pp. 207-214). IEEE.

Williams, N. L., et al. (2021). Arc: Alignment-based redirection controller for redirected walking in complex environments. IEEE Transactions on Visualization and Computer Graphics, 27(5), 2535-2544.

(56) References Cited

PUBLICATIONS

Williams, N. L., et al. (2021). Redirected walking in static and dynamic scenes using visibility polygons. IEEE transactions on visualization and computer graphics, 27(11), 4267-4277.

Winter, D. A. (1995). Human balance and posture control during standing and walking. Gait & posture, 3(4), 193-214.

Wu, F., et al. (Mar. 2019). Combining dynamic field of view modification with physical obstacle avoidance. In 2019 IEEE Conference on Virtual Reality and 3D User Interfaces (VR) (pp. 1882-1883). IEEE.

Yam, C. et al., "Gait recognition by walking and running: a model-based approach," (2002).

Yamane, K., et al. (2003). Natural motion animation through constraining and deconstraining at will. IEEE Transactions on visualization and computer graphics, 9(3), 352-360.

Yamazaki, T. et al. "Human walking motion synthesis based on multiple regression hidden semi-Markov model." In 2005 International Conference on Cyberworlds (CW'05), p. 8-pp. IEEE, 2005.

Yoon, B., et al. (Mar. 2019). The effect of avatar appearance on social presence in an augmented reality remote collaboration. In 2019 IEEE Conference on Virtual Reality and 3D User Interfaces (VR) (pp. 547-556). IEEE.

Yoon, L., et al. (2020). A mixed reality telepresence system for dissimilar spaces using full-body avatar. In SIGGRAPH Asia 2020 XR (pp. 1-2).

Yoon, L., et al. (2020). Placement retargeting of virtual avatars to dissimilar indoor environments. IEEE Transactions on Visualization and Computer Graphics, 28(3), 1619-1633.

Young, J., et al. (2019). Immersive telepresence and remote collaboration using mobile and wearable devices. IEEE transactions on visualization and computer graphics, 25(5), 1908-1918.

Yu, K., et al. (2021). Avatars for teleconsultation: Effects of avatar embodiment techniques on user perception in 3d asymmetric telepresence. IEEE Transactions on Visualization and Computer Graphics, 27(11), 4129-4139.

Zafar, M. N., et al. (2018). Methodology for path planning and optimization of mobile robots: A review. Procedia computer science, 133, 141-152.

Zhao, J., et al. (1994). Inverse kinematics positioning using nonlinear programming for highly articulated figures. ACM Transactions on Graphics (TOG), 13(4), 313-336.

Zhao, Y., et al. (Apr. 2018). A functional optimization based approach for continuous 3d retargeted touch of arbitrary, complex boundaries in haptic virtual reality. In Proceedings of the 2018 CHI Conference on Human Factors in Computing Systems (pp. 1-12).

Zhao, Z., et al. (Dec. 2019). A live storytelling virtual reality system with programmable cartoon-style emotion embodiment. In 2019 IEEE International Conference on Artificial Intelligence and Virtual Reality (AIVR) (pp. 102-1027). IEEE.

Zhou, D., et al. (2017). Fast, on-line collision avoidance for dynamic vehicles using buffered voronoi cells. IEEE Robotics and Automation Letters, 2(2), 1047-1054.

Zibrek, K., et al. (Sep. 2017). Don't stand so close to me: investigating the effect of control on the appeal of virtual humans using immersion and a proximity-based behavioral task. In Proceedings of the ACM Symposium on Applied Perception (pp. 1-11).

Zibrek, K. et al. (2018). The effect of realistic appearance of virtual characters in immersive environments-does the character's personality play a role ?. IEEE transactions on visualization and computer graphics, 24(4), 1681-1690.

(a)

(b)

SYSTEM AND METHOD FOR EFFICIENT REDIRECTION OF USER INTERACTIONS AND GESTURES BETWEEN REMOTE AND LOCAL ENVIRONMENTS IN AUGMENTED REALITY

CROSS-REFERENCE TO RELATED APPLICATIONS

This application is a non-provisional of and claims the benefit of U.S. Provisional Patent Application No. 63/385,186, filed on Nov. 28, 2022 and U.S. Provisional Patent Application No. 63/385,366, filed on Nov. 29, 2022, the contents of each application incorporated herein by reference.

STATEMENT REGARDING FEDERALLY SPONSORED RESEARCH OR DEVELOPMENT

This invention was made with government support under AG078480 awarded by the National Institutes of Health and 2225890 awarded by the National Science Foundation. The government has certain rights in the invention.

BACKGROUND

Remote work and interactions have gained significant attention, especially due to the COVID-19 pandemic. The most common form of remote interactions is 2D audio-video applications such as Zoom, Facetime, etc. These interactions, however, can be more collaborative and engaging when experienced through mixed/augmented reality (MR/AR) using head-mounted displays (HMDs). Modern HMDs have the capability to track many user features such as eye gaze, the user's position and orientation, and the user's hands, which can then be mapped onto photo-realistic avatars making the interaction more naturalistic. Many have predicted that remote work will be a permanent part of the hybrid work culture. Post pandemic, remote interactions are also extending to non-work-related areas such as entertainment, education and health. Accordingly, there is a need and opportunity for creating more immersive full-body interactions in mixed reality.

One important aspect of full-body interaction is the body pose of a telepresence avatar representing a user. Body pose has been shown to convey increased social presence and also display many personal traits of humans, making it an important component of a person's non-verbal behavior.

Body pose angles can be captured by color-depth cameras (e.g., Kinect) or sensors and then mapped onto an avatar representation of a user in the remote environment. However, a direct one-to-one mapping of the joint angles of the user to the avatar may result in erroneous positional interaction with the remote workspace (see FIG. 1) due to factors such as differences in physical dimensions between the user and their avatar representation, differences in positions of virtual objects between the remote and local environments, and localization and drift errors. The end effectors, which are in most cases the user's hands, need to be redirected to minimize the error between the end effector and the interaction object (goal target). At the same time, the new pose resulting from the redirection should be as similar to the original pose of the user in the local workspace as possible to preserve important non-verbal cues regarding the person's intent (see FIG. 2 (at a, b, c, and d)). However, these two objectives increasingly conflict with each other as the difference between the original and goal targets increases between the remote and local workspaces, making it necessary to find a suitable compromise between the two objectives.

Inverse kinematic (IK) approaches have been used for redirecting a kinematic chain to a goal target position. The human body can be modeled as an interaction of several kinematic chains under specific constraints as shown in FIG. 2 (at e), where five individual kinematic chains have been centered around the hip joint. Using kinematic chain models allows IK techniques to redirect any joint towards a goal target. Although there have been various IK techniques proposed to obtain this redirection (described in more detail below), a new approach using memetic evolutionary algorithms has shown to be highly effective in finding valid solutions. This approach has also shown to be flexible, as multiple objectives can be added to the optimization fitness function. However, one of the limitations of this method is that the weights used in the fitness function among the different objectives must be manually found by trial and error, which may lead to a suboptimal solution. The solution space for kinematic chain redirections can vary widely depending on the extent of the error or difference in the remote/local workspace environment. For example, redirection due to slight changes in physical size between the user and their avatar will be minor when compared to redirections where the interaction object is placed 180-degrees opposite (relative to the user) between the remote and local workspaces. There is a need for dynamically adjusting the weights of each objective so that an improved solution can be obtained.

Accordingly, a system and method that addresses these erroneous interactions and provides a more real-time interaction between users in different locations is desirable.

SUMMARY

The present disclosure provides a framework to minimize positional errors and preserve the pose of interactions in remote/local MR/AR. More specifically, the present disclosure provides a multi-objective optimization (MO) process including a primary objective to minimize the positional errors between the end effector and goal target (see FIG. 2 (at f)) and a secondary objective to preserve the original body pose while redirecting the end effector to the goal target.

This MO framework provides mapping of a user's gestural interactions from the user's environment to that of the user's avatar. Gestural interactions can be divided into two types: 1) positional interactions and 2) pointing interactions. Positional interactions are interactions where the user has physical contact with an object in their environment. For example, picking up a chess piece. Pointing interactions are interactions where the user points at a particular object in their environment. Both of these interactions need to be mapped onto the user's avatar, in their environment, such that the interaction has its original intended meaning In some aspects related to positional interactions, the present disclosure provides a dynamic weight allocation approach that optimizes between the objectives of body joint redirection and preserves the body pose of the original interaction. This approach is flexible in that the user can specify a minimum error tolerance, which is then used for dynamically calculating objective weights.

In some aspects related to pointing interactions, the present disclosure efficiently adjusts the weighting between two objectives and gives the user the flexibility to set the minimum angular error tolerance for the pointing gesture redirection. The primary objective is correctly pointing towards the object and the secondary objective is preserving the body pose from the original interaction as much as possible.

For example, the present disclosure provides a system and method to minimize positional errors of telepresence avatar interaction, such as reaching for an object (e.g., a cup) or pointing at an object (e.g., a picture), while preserving the original non-verbal behavior. Unlike the current optimization approaches where a single objective, typically the position error of an end-effector, is optimized, the MO framework disclosed herein includes both primary and secondary objectives. The primary objective is to minimize the positional/pointing error of the end effector, which is generally the error between the hand or fingers of the avatar and the goal target, which represents the virtual object to be grabbed or pointed at. The secondary objective is to preserve the original body pose.

This framework is applicable for any type of activity that uses a remote/local setting in MR/AR and involves interaction with objects in the environment. For example, these activities can include playing games such as chess, card games, and the like, job and vocational training, and education sessions that can be done using remote/local AR. This framework is also applicable to human-human interaction (via telepresence avatar) in AR, such as a handshake or a pat on the back. A telepresence avatar is a photorealistic life-sized virtual representation of a real human, whose body joints and facial features can be custom manipulated. As used herein, reference to avatar means telepresence avatar.

In one embodiment, the present disclosure describes a system to provide remote multi-user interactions in collaborative augmented reality (AR) via telepresence avatars. The system comprises a first user wearing a first head-mounted display (HMD) positioned within a first environment and a second user wearing a second HMD positioned within a second environment. The first HMD is communicatively coupled to the second HMD and configured to: receive, from external sensors, body pose angle data of the first user within the first environment; map the body pose angle data of the first user to the first user's telepresence avatar within the second environment while also redirecting an end effector of the first user's telepresence avatar to a corresponding object in the second environment that the first user intended to in the first environment by: applying a multi-objective optimization (MO) approach with dynamic weight allocation of an optimization fitness function to the body pose angle data of the first user, wherein the dynamic weight allocation includes weights dynamically distributed between a primary objective and a secondary objective based on a specified tolerance, and wherein the primary objective minimizes an error between the end effector of the first user's avatar and the object in the second environment, and wherein the secondary objective maximizes the preservation of the body pose angle data of the first user's telepresence avatar received from the first user.

In another embodiment, the present disclosure provides a method of providing remote multi-user interactions in collaborative augmented reality (AR) via telepresence avatars. The method comprises receiving, from external sensors, body pose angle data of a first user within a first environment; receiving, from external sensors, body pose angle data of a second user within a second environment; receiving input of a minimum error tolerance; dynamically allocating weights between a first objective and a second objective based on the minimum error tolerance; mapping the body pose angle data of the first user to a telepresence avatar of the first user within the second environment, wherein the first objective minimizes an error between an end effector of the telepresence avatar of the first user and an object in the second environment, and wherein the second objective maximizes a preservation of the body pose angle data of the telepresence avatar of the first user; and mapping the body pose angle data of the second user to a telepresence avatar of the second user within the first environment wherein the first objective minimizes an error between an end effector of the telepresence avatar of the second user and an object in the first environment, and wherein the second objective maximizes a preservation of the body pose angle data of the telepresence avatar of the second user.

In yet another embodiment, the present disclosure provides a system for mapping a user's positional interactions from a local environment to an avatar in a second environment. The system comprises a head-mounted display (HMD) configured to be worn by a first user, the first user positioned within a first environment; a controller having one or more electronic processors, the controller communicatively coupled to a plurality of external sensors. The controller is configured to: receive body pose angle data of the first user from the plurality of the external sensors, and execute a multi-objective optimization algorithm to apply a first objective and a second objective to the body pose angle data of the first user, wherein the first objective of the multi-objective optimization algorithm minimizes a positional error between an end effector of a telepresence avatar of the first user and an object, and the second objective of the multi-objective optimization algorithm maximizes a preservation of the body pose angle data of the telepresence avatar of the first user.

Other aspects of the disclosure will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
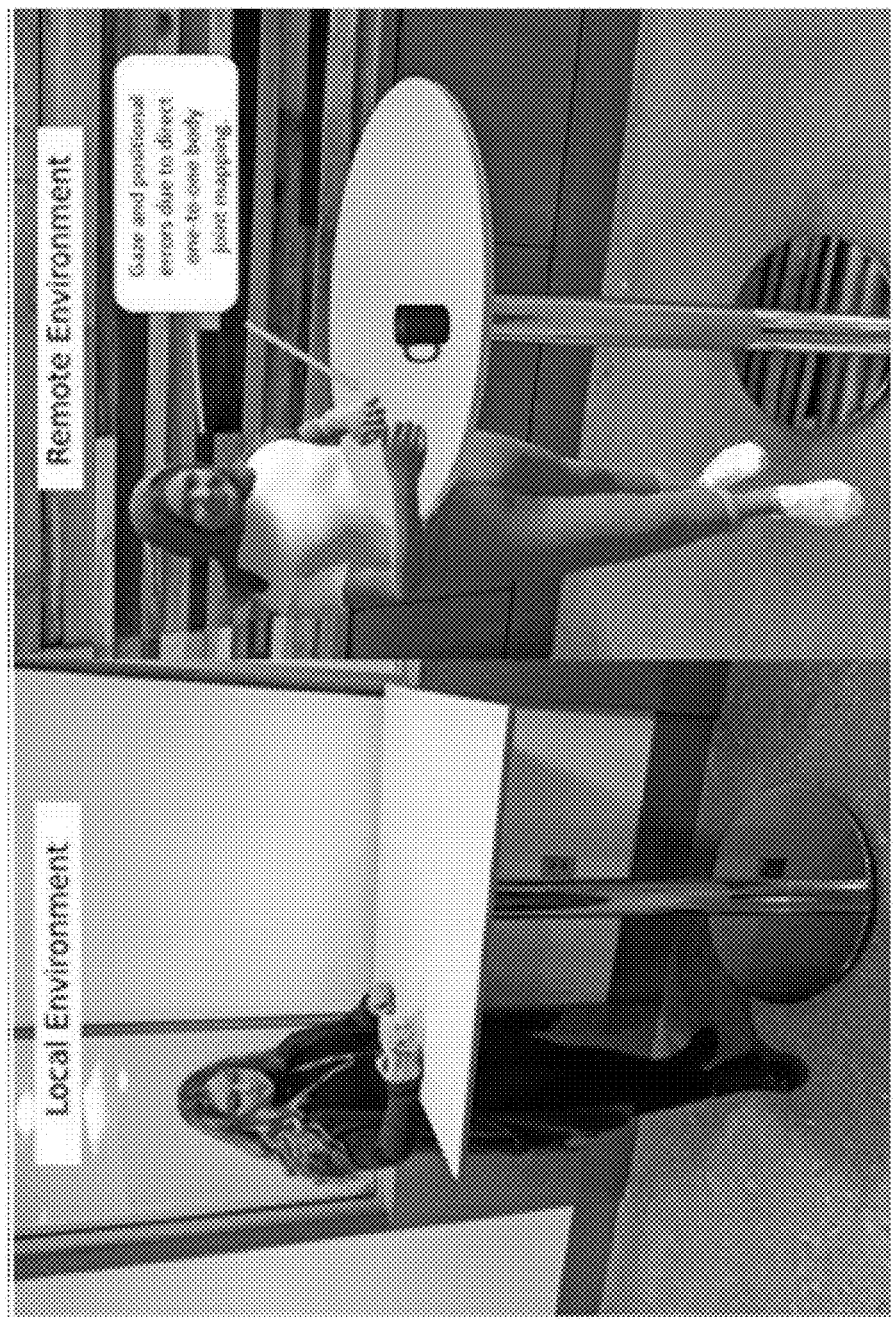
FIG. 1 illustrates an example of gaze and positional errors caused due to direct one-to-one mapping from the local to the remote environment in AR.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Introduction

There are two types of data that can be communicated across remote-local mixed MR/AR systems, such as data related to the workspace and human-oriented data. Systems that cannot only send these two types of data but also preserve the interactions between the two are desirable. During its early development, AR involved expert-novice scenarios where a video feed was sent from the remote workspace and the expert provided guidance, mainly through audio and annotations. These types of expert-novice scenarios have been extended to involve multiple users, situated both in the co-located and remote workspace to be able to view the interaction environment. Systems have also been developed that send both a headset's field of view (FOV) and 360-degree panoramic videos captured using mobile devices that allow users to communicate with each other using hand gestures. This is especially useful when collaboration takes place outdoors. There have also been systems where multiple RGBD cameras/sensors capture a complete room scene and transport it across to the remote side where virtual objects are able to adapt to the real environment surfaces. In other situations, where human gestures play a more important part than the workspace, mixed reality has been used as a platform for common remote meetings, conducting multi-modal therapy activities and biometric identification. These have included setups where only the head gaze has been redirected to collaborative sketching using avatar bust representations where users' position, orientation, and hands have been tracked. The avatars have also been customized according to the user's non-verbal behaviors to increase their sense of social presence. An RGBD camera/sensor is a type of depth camera/ sensor that provides both depth (D) and color (RGB) data as the output in real-time. Depth information is retrievable through a depth map/image which is created by a 3D depth sensor such as a stereo sensor or time of flight sensor.

There are two common ways to convey full-body non-verbal behavior. First, the RGBD data of the human can be captured using a 3D point cloud, which are then transported and replayed on a remote device. Second, human data can be overlayed onto a 3D model to create photo-realistic avatars. Although the 3D point cloud is realistic and accurately depicts the person, these data cannot be manipulated or redirected to the correct locations in the remote environments. Hence, error correction using a photorealistic avatar is preferred.

Humanoid characters are extensively used in computer games and animations, where they perform a variety of common motions such as walking and running. Many of these animations have been modeled from motion capture systems. A very common application in these games and animations is the inverse kinematics problem, i.e., given a goal target, what joint configurations of the humanoid will make the end effector reach that goal target. Obtaining a solution to the inverse kinematics problem for a humanoid modeled using kinematic chains is not straightforward, and a unique solution is not guaranteed to exist. The complexity of the problem also increases with the increase in the degrees of freedom (DOF) of the kinematic structure. On top of this, naturalistic human motion has many joint and soft motion constraints making the IK problem a highly nonconvex one. Several approaches have been proposed to solve IK problems that include analytic, heuristic, gradient-based, sampling-based, and learning approaches, where each method performs well for a specific type of application. For a given kinematic geometry, analytic methods provide solutions in closed-loop form that are exact and return all the solutions for any joint configuration. Although exact solutions may be available using analytic methods, they are only practical for simple geometries due to the increase in complexity for each additional DOF. For complex kinematic geometries, the focus has been on heuristic and iterative methods. These methods are fast and can be used for real-time applications. Well known heuristic algorithms include cyclic coordinate descent (CCD) and Forward and Backward Reaching Inverse Kinematics (FABRIK). These heuristic algorithms are also implemented in modern game engines such as Unity, Unreal and Maya. One of the drawbacks of using heuristic solutions is that they only optimize for position and are not efficient if the goal is for a kinematic chain to reach a particular orientation. This problem is overcome by gradient-based IK, which involves the computationally expensive calculation of first or second order derivatives and operate directly in joint space. Recently, evolutionary computing-based IK solutions have found to be effective. In S. Starke et al. "Memetic Evolution for Generic Full-Body Inverse Kinematics in Robotics and Animation," IEEE Trans. Evol. Comput., vol. 23, no. 3, pp. 406-420 (2019), a hybrid implementation of genetic algorithm (GA) and particle swarm optimization (PSO) have been compared with analytic, heuristic and radiant-based methods and shown to be highly effective in finding valid solutions. It has also been shown to be flexible in satisfying position, orientation, and displacement objectives while finding the solutions.

A MO problem can be described as finding the set of pareto optimal solutions. Calculating the complete set of pareto optimal solutions is computationally intensive and time consuming. Hence MO problems are tackled using multiple approaches based on the problem domain and user requirements. There are four main approaches: no preference methods, a priori, a posterior, and interactive methods. In the no-preference method, no human decision maker is required, and the solution is presented based on relatively simple rules. It is mostly used when there is no specified requirement and only some optimal solution is required. A well-known example is the method of global criterion. All the other three methods require human input in some form. In a priori methods, the human preference is asked first and then the optimization is performed. Examples include lexicographic optimization and goal programing. In a posteriori method, an initial set of pareto optimal solution set is found and then human input is taken to choose among these solutions. Evolutionary algorithms fall under this category. For interactive methods, the human is continuously involved giving input at every level of the optimization procedure. Various types of MO techniques have been used in computer animation, mainly related to inverse kinematics of motion redirection and path planning. In J. S. Lee et al. "Automatic path generation for group dance performance using a genetic algorithm," Multimed. Tools Appl., vol. 78, no. 6, pp. 7517-7541 (2019), an automatic path is generated for multiple dancers, based on the choreographers inputs of four preselected features of time, space, symmetry and entropy. Given these input values by the choreographer a genetic algorithm is used to find the pareto optimal solutions, with the most pareto dominant solution being selected as final solution. Interactive methods have also been used to optimize between naturalness of human motion animation during interaction with objects, where inputs are obtained from the contact optimizer to iteratively improve the optimization of the motion synthesizer. Finally, there are the a priori methods where the human specifies the order of the importance of the objectives. This is most commonly done by specifying the relative weights among objectives.

This optimization framework describes mapping a user's gestural interactions from the user's environment to that of the user's avatar. Gestural interactions can be divided into two types: i) positional interactions and ii) pointing interactions. Positional interactions are interactions where the user has physical contact with an object in their environment. For example, picking up a chess piece. Pointing interactions are interactions where the user points at a particular object in their environment. Both of these interactions need to be mapped onto the user's avatar, in its environment, such that the interaction has its original intended meaning.

Optimization Framework for Redirection Of Positional Gesture Interactions

Figure 2:
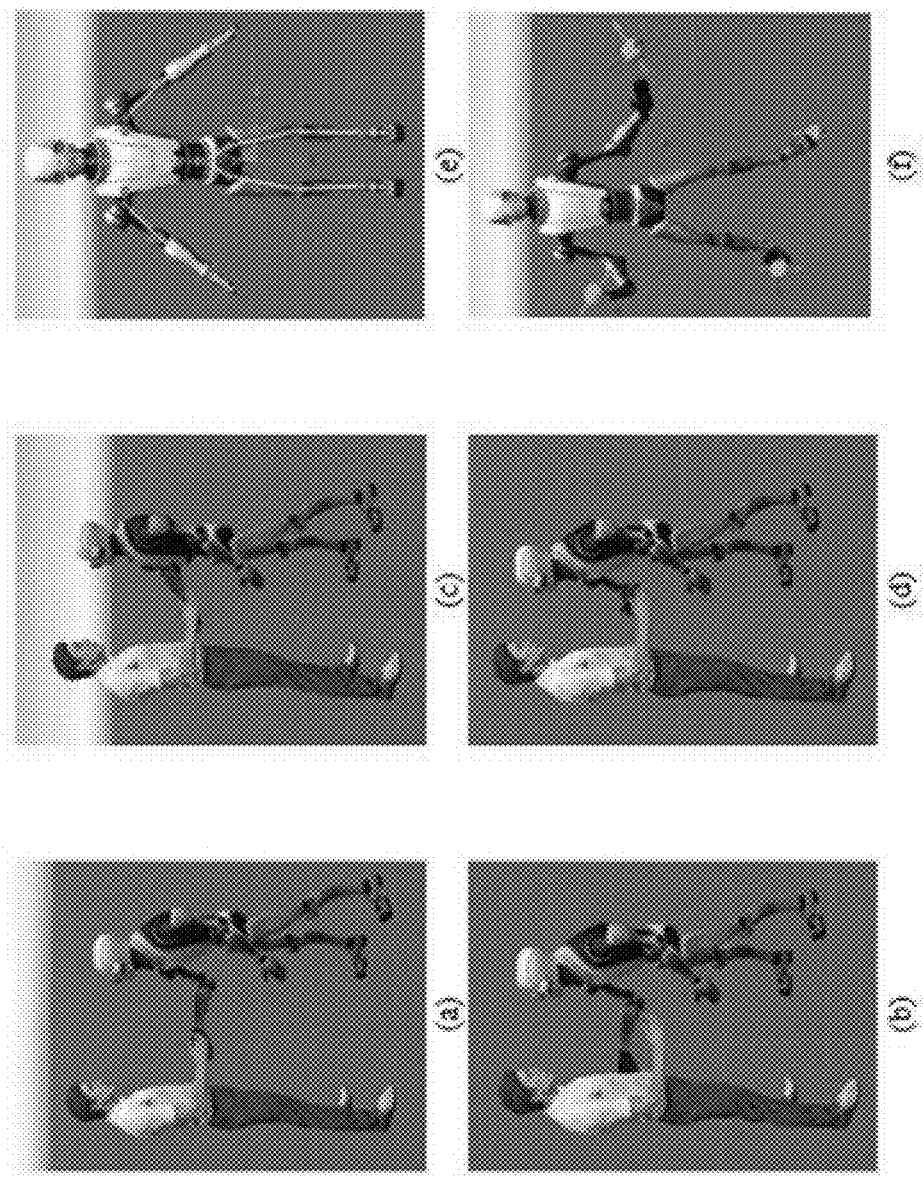
FIG. 2 illustrates a series of images demonstrating the need for a MO approach for positional interactions (a, b, c, d) in remote-local MR/AR; (a) Local workspace A—the robot's body pose indicated it is hesitantly interacting with the human; (b) Remote workspace A—direct body pose mapping results in erroneous interaction, due to slight positional change of the human from (a); (c) Remote workspace A—redirection with no body pose optimization seems the robot is confidently interacting; (d) Remote workspace A—the hesitancy of the robots interaction and its handshake is preserved with a MO based body pose optimization; (e) body pose modeled as a combination of five serial kinematic chains with constraints; (f) example of primary objective end effector goal targets (blue) and secondary objective goal targets (red) in the serial kinematic chain.
Figure 3:
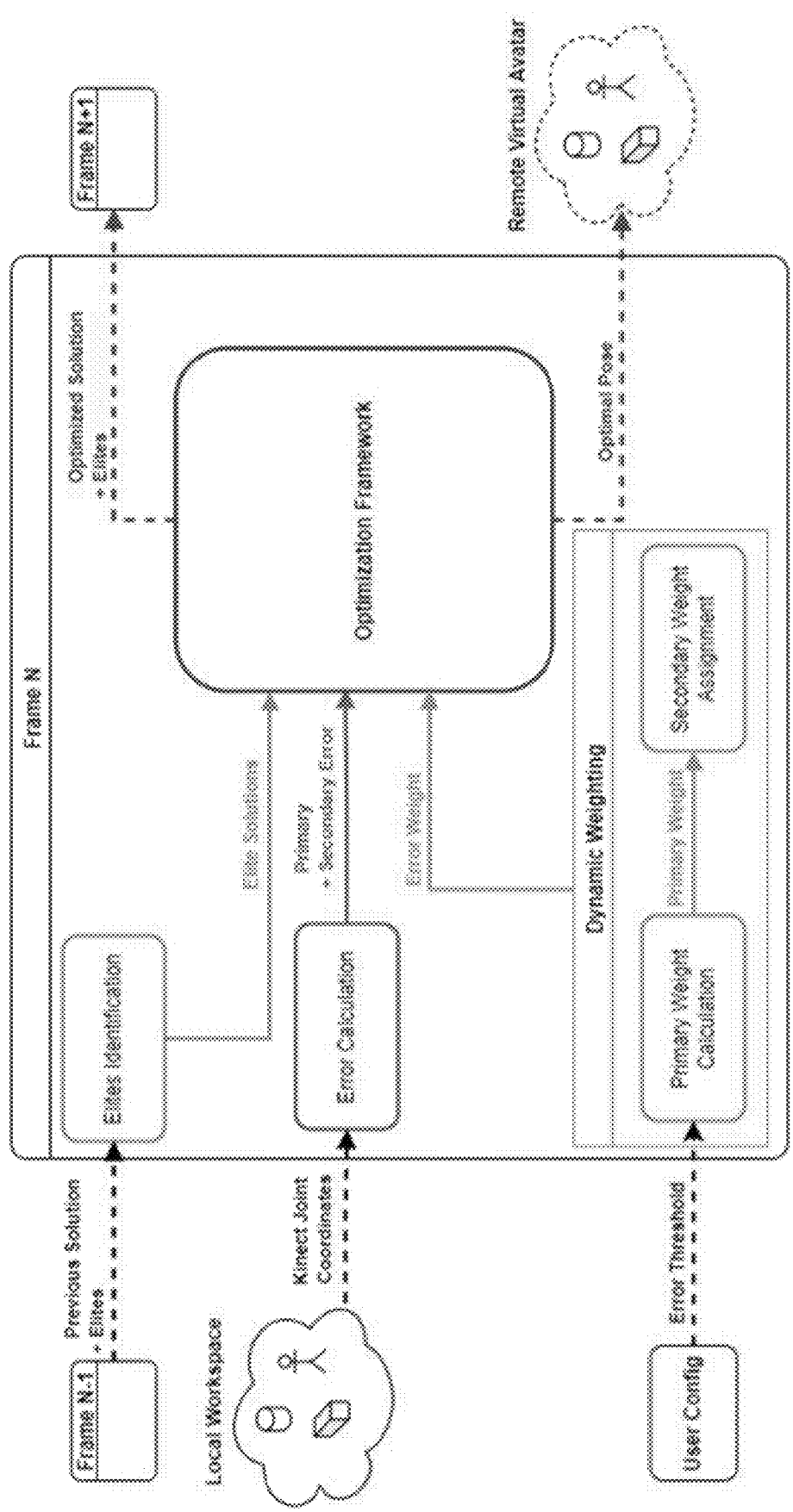
FIG. 3 is a schematic of a frame-by-frame optimization pipeline for pose estimation according to primary and secondary objective constraints. Although, the user defined error threshold can be input for every frame, it is generally set at the start (1st frame) of the optimization process.

In order to represent the human body's pose, the model shown in FIG. 2 was used. The model consists of five serial kinematic chains with constraints and 20 joints. A body pose can be represented as a joint variable configuration $\theta$ $$\theta = (j_1 | j_2 | j_3 | \ldots | j_{n-1} | j_n) \tag{eq. 1}$$

where n represents the number of joints in the model and $j_1, j_2 \ldots j_n$ represent the individual 3D joint angles. Each of the joints also have realistic human body pose constraints $$\theta_{i_{min}} \leq j_i \leq \theta_{i_{max}} \forall i = 1, \ldots n \tag{eq. 2}$$

where $\theta_{i_{min}}$ and $\theta_{i_{max}}$ are the minimum and maximum angles for the $i_{th}$ joint. The goal of the optimization framework is to find $\theta$s for the remote workspace such that the primary objective error between the end effector and goal target is minimized, i.e., it should be within the minimum error tolerance specified by the user. Once this primary objective is satisfied, among these θs, the one set of angles that keeps the pose as similar to the local workspace pose, is selected (secondary objective). This MO is carried out for every frame with optimization framework pipeline shown in FIG. 3. The primary and secondary objective errors are defined below.

Several distance metrics have been proposed to compare body poses. Among these, the weighted joint coordinate distance (WJCD) metric was selected to compare different body pose interactions since it is based on Euclidean distances, the same metric that is used to measure the input errors for positional interactions. This is important because in MO problems, if the objectives have differing units and scale, these values have to be normalized to a common unit and scale, which is not a trivial task. For example, if one objective is measured in Euclidean distance and the other in radian angles, the distance error not being bounded, tends to overshadow the angle error which is bounded between 0 and $2\pi$, causing a difficult normalization problem. Since positional errors are already calculated in Euclidean distances, using WJCD body poses (secondary error) can also be quantified using Euclidean distances, preventing the normalization problem. The primary objective error ($x_{pe}$) can be defined as $$x_{pe} = \alpha \sum_{i=1}^{n_p} d_E^2(p_i, g_i) \quad \text{(eq. 3)}$$

where $p_i, g_i \in \mathbb{R}^3$ represent the Cartesian coordinates of the primary objective for joint i of the current candidate solution of the optimization framework and its respective goal target, respectively. $d_E$ ($p_i, g_i$) represents the Euclidean distance between $p_i, g_i$ and $n_p$ represents the number of primary objectives. The primary error is multiplied by the primary weight (calculation described in a later section). Similarly, the secondary objective error ($x_{se}$) based on WJCD can be defined as $$x_{se} = \beta \sum_{i=1}^{n_p} d_E^2(p_i^l, p_i^r) \quad \text{(eq. 4)}$$

where $p_i^l, p_i^r \in \mathbb{R}^3$ represent the Cartesian coordinates of the secondary objective for joint i in local and remote workspace, respectively. $d_E(p_i^l, p_i^r)$ represents the Euclidean distance between $p_i^l, p_i^r$ and $n_s$ represents the number of secondary objectives. The secondary error is multiplied by the secondary weight β (calculation described below). To obtain $p_i^r$, the temporary joint positions $(p_1^t, p_2^t \ldots p_{n-1}^t, p_n^t)$ given by the optimization framework that minimizes the primary error are first recorded in the remote workspace (eq. 5)

$$f(\theta_{local}) = (p_1^t, p_2^t \ldots p_{n-1}^t, p_n^t) \quad \text{(eq. 5)}$$

If $p_0^l$ is the root node (in this case, the hip joint) position in the local workspace coordinates and $p_{root}^r$ is the root node in remote workspace coordinates, then the offset position $p_{off}$ between the two workspace avatar root nodes as:

$$p_{off} = p_{root}^r - p_0^l \quad \text{(eq. 6)}$$

$p_i^r$ is then computed as follows:

$$p_i^r = p_i^t + (p_{off_x}, p_{root_y}^r, p_{off_z}) \forall i = 1, \ldots n \quad \text{(eq. 7)}$$

where $p_{off_x}, p_{off_z}$ are the x and z coordinates of the remote-local workspace offset, and $p_{root_y}^r$ is the y-coordinate (height) of the root node of the remote workspace avatar.

In MO, the goal is to find the set of pareto optimal solutions. Calculating the complete set of pareto optimal solutions is computationally intensive and time consuming. Hence MO problems are tackled using multiple approaches based on the problem domain and user requirements: namely, no preference methods, a priori, a posterior and interactive methods. The present problem falls under the category of a priori methods, i.e., the order of importance of the objectives is known beforehand and the complete pareto optimal set of solutions is not required. Scalarizing a MO problem, as used in the present case is a type of a priori method, where the MO problem with multiple objectives are framed as a single-objective optimization problem such that optimal solutions to the single-objective optimization problem are Pareto optimal solutions to the MO problem.

The cost function is selected to obtain smooth optimization solution that does not exhibit sudden fluctuations for small changes in objective errors. To this end, the method of combining the multiple objectives into a single scalar root mean squared (RMS) value shown in (eqs. 8 and 9) was used. By representing the cost function (C(x)) as an RMS equation, the optimization problem was converted from a linear to a quadratic equation, which has an approximate convex solution.

$$C(x) = \sqrt{\frac{\alpha \sum_{i=1}^{n_p} d_E^2(p_i, g_i) + \beta \sum_{i=1}^{n_s} d_E^2(p_i^l, p_i^r)}{n_p + n_s}} \quad \text{(eq. 8)}$$

which can be simplified and written as $$C(x) = \sqrt{\frac{x_{pe} + x_{se}}{n_p + n_s}} \quad \text{(eq. 9)}$$

where $x_{pe}$ and $x_{se}$ represent primary and secondary errors, respectively.

The GA-based IK architecture used in S. Starke et al. "Memetic Evolution for Generic Full-Body Inverse Kinematics in Robotics and Animation," IEEE Trans. Evol. Comput., vol. 23, no. 3, pp. 406-420 (2019) has a manual weighting scheme, i.e., the weights have to be adjusted according to the user preference. This is mainly done by trial and error since finding the exact relation between the objective weights is complex and time-consuming. A new dynamic weight allocation approach to this problem is presented, where the weights are distributed dynamically between the primary and secondary objectives based on a user-specified tolerance. The function used for the weight allocation and the factors that affect it are described herein.

The standard logistic function, to dynamically allocate weights between the objectives, is shown in eq. 10:

$$f(x) = \frac{L}{1 + e^{-k(x-x_0)}} \quad \text{(eq. 10)}$$

where L represents the maximum function value, k represents the function growth rate and $x_0$ represents the x value at the midpoint of f(x). In this application, f(x) represents the weight for the primary objective, x represents the primary objective error, and k is used to control the steepness of the curve. Although there are many dynamic easing functions that can be used, the logistic function is the most widely used due to its smoothness and monotonic nature, which smoothly transitions the weights between the objectives. Logistic functions have been used in many optimization and machine learning applications.

The two main factors that influence the shape of the logistic function are $x_0$ and k. x is the primary error and is considered as the input to the logistic function. Hence the domain of the function is (0, ∞) and the default range is [0.5 L, 1 L], when $x_0=0$. As $x_0$ is increased the x value of f(x) at the midpoint increases. The value of k is used to control the strictness of the allowed error. When k=13.81, full weightage is given to the primary objective after x≈0.2 m whereas when k=1.00, full weightage is given to the primary objective after x≈5 m. As for L, the absolute value of the weight does not matter, but the relative distribution of weights among the objectives counts.

All joints considered as part of the primary objective are multiplied by the primary weight and similarly, all joints considered part of the secondary objective are multiplied by the secondary weight in the cost function (eqs. 8 and 9). The primary weight is set based on the average error of the primary objective joints $x_{pavg}$ and the user-defined minimum error tolerance $k_{tol}$ (described below).

$$x_{pavg} = \frac{\sum_{i=0}^{n_p} d_E(p_{if}, g_{if})}{n_p} \quad \text{(eq. 11)}$$

where $p_{if}, g_{if} \in R^3$ represent the Cartesian coordinates of the primary objective for joint i and its respective goal target. $d_E$ ($p_{if}, g_{if}$) represents the Euclidean distance between $p_i$, $g_i$, and $n_p$ represents the number of primary objectives. It is important to note the difference between $x_{pavg}$ in eq. 11 and $x_{pe}$ in eq. 3. $x_{pavg}$ is calculated once every frame and is used to set the primary weight that is then used to calculate $x_{pe}$, which is the error for the current candidate solution of the optimization framework cost function, calculated many times in a frame and used to find the best joint angle configuration. The primary weight ($\alpha$) is obtained from equation 12. Once the primary weight is determined the secondary weight ($\beta$) can be calculated as shown in eq. 13:

$$\alpha(\text{primary weight}) = \frac{L}{1 + e^{-k_{tol}(x_{pavg})}} \quad \text{(eq. 12)}$$

$$\beta(\text{secondary weight}) = L - \alpha \quad \text{(eq. 13)}$$

Different types of avatar-object interactions require different levels of accuracy. For example, if an avatar-object interaction involves lifting a large virtual ball, the error tolerance required may not be very precise when compared to a dexterous manipulation of holding and rotating a cup with one's fingers. The differences in error tolerance required for different tasks and contexts can be set up using our weighting approach. Setting a minimum error tolerance ($x_{tol}$) amounts to letting the dynamic weighting function know how to decide on the threshold for allocating the maximum weightage to the primary objective. For example, suppose if a highly dexterous application requires a minimum error tolerance of 0.01 m, then a $k_{tol}$ value in eq. 12 must be found, for which when $x_{pavg}$>0.01 m the primary weight ($\alpha$)≈L. This can be done by rearranging eq. 12 as follows:

$$k_{tol} = \frac{\log\left(\frac{f(x)_{max}}{L(1 - f(x)_{max})}\right)}{x_{tol}} \quad \text{(eq. 14)}$$

where $x_{tol}$ is the user-defined minimum error tolerance and $f(x)_{max}$≈1 to prevent $k_{tol}$ from being indeterminate if $f(x)_{max}$ is considered to exactly equal 1.

The rationale followed to compare the two weighting strategies was to keep all other variables in the testing conditions equal and closely controlled so that the cases only differed in the weighting strategies. Testing for the static weighting case was not straightforward, as a body pose action sequence needed to be tested with all combinations of primary and secondary weights. When testing, a sequence of actions was used that is converted to an animation clip. This is the case even when testing on human participant actions, where the participant was first recorded performing the required action during a book shelving task in AR, and then converted it into an animation clip. In this way, a combination of weights during one animation cycle and then changing it for the next cycle knowing that the sequence of body joint movements is exactly the same as the previous animation cycle. In this case, for a positional target location the first animation cycle was initially started with having primary weight ($\alpha$)=1 L (maximum weight) and secondary weight ($\beta$)=0. Then for every consequent animation cycle the primary weight was decremented by 0.01 until it reached 0 and correspondingly at the same time the secondary weight reached 1 L. The dynamic weighting case was run for the same animation and number of cycles as that of the static weighting case, but with the primary weight selected according to eq. 12. All other variables including the optimization architecture and avatar models used are the same for both the static and dynamic cases.

Figure 4:
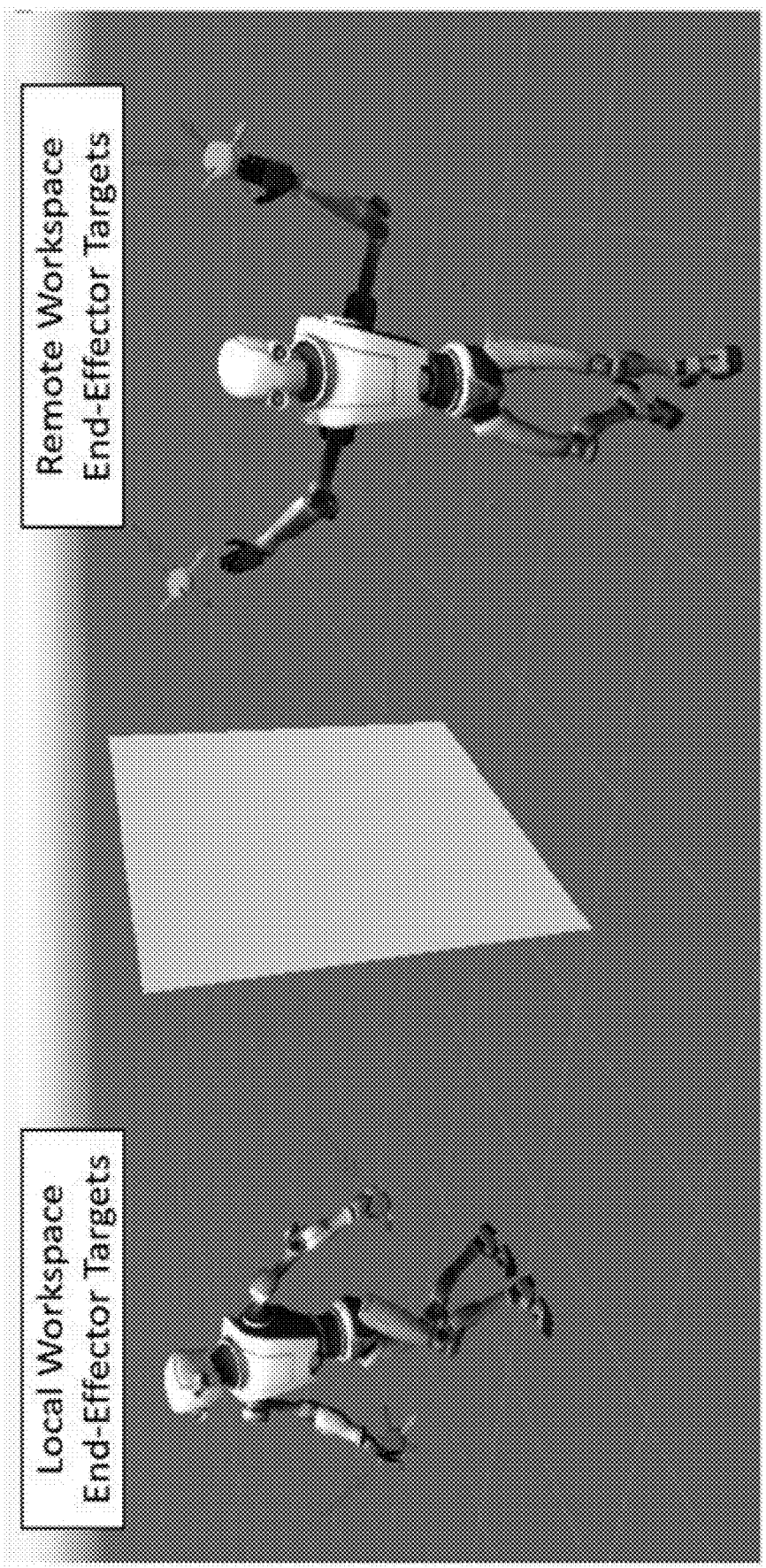
FIG. 4 illustrates a simulation setup. The local workspace with positional goal targets (left) and the remote workspace with its positional goal targets (right). The red dots on the remote workspace side are the secondary objective goal targets for the respective joints, obtained from the local workspace pose.

Sample motion capture animations were initially used to test this redirection method due to the wider range of actions expressed with a full body motion compared to the more limited and constrained actions encountered during the human subjects AR task. For example, while performing a book shelving task in AR, participants generally only used their upper limbs, with their lower limbs being stationary. Hence, for the motion capture animations tested, specific animations were selected which have full body movements (such as walking, running, sprinting etc.). The simulation setup used for testing is shown in FIG. 4. Also, in order to evaluate the robustness and adaptability of the dynamic weighting mechanism on these animations they were tested by varying other factors described below.

Testing with different minimum error tolerances. Ideally, minimum error in the positional interactions (primary objective) is desired during remote-local interactions in MR/AR. The dynamic weighting mechanism is focused on this task i.e., minimizing the primary objective error for the specified minimum error tolerance. Once this is achieved, then it optimizes the secondary objective. This algorithm sometimes optimizes the primary objective at the expense of the secondary objective if the primary error tolerance requirement is very precise. To test the performance of the dynamic weighting mechanism with varying minimum error tolerances two cases of minimum error tolerances were considered: i) a strict case where $k_{tol}$=13.81 and ii) a lenient case where $k_{tol}$=1. These are two representative values chosen for comparison; any other values could also be chosen for testing. The rationale behind choosing a strict and a lenient error tolerance case is to reflect the applications of positional redirection while conducting an activity in AR. For example, activities such as playing cards or chess require highly accurate redirection of the avatar's hands. In such cases, an erroneous redirection will be costly as it will result in the avatar picking up a wrong card or chess piece, which can be detrimental to the interaction. On the other hand, some activities do not require such high level of positional accuracy. For example, in the case when the avatar is mimicking the action of lifting a large object such as a box, a more lenient error tolerance will suffice, so that the body pose can be optimized more.

Figure 5:
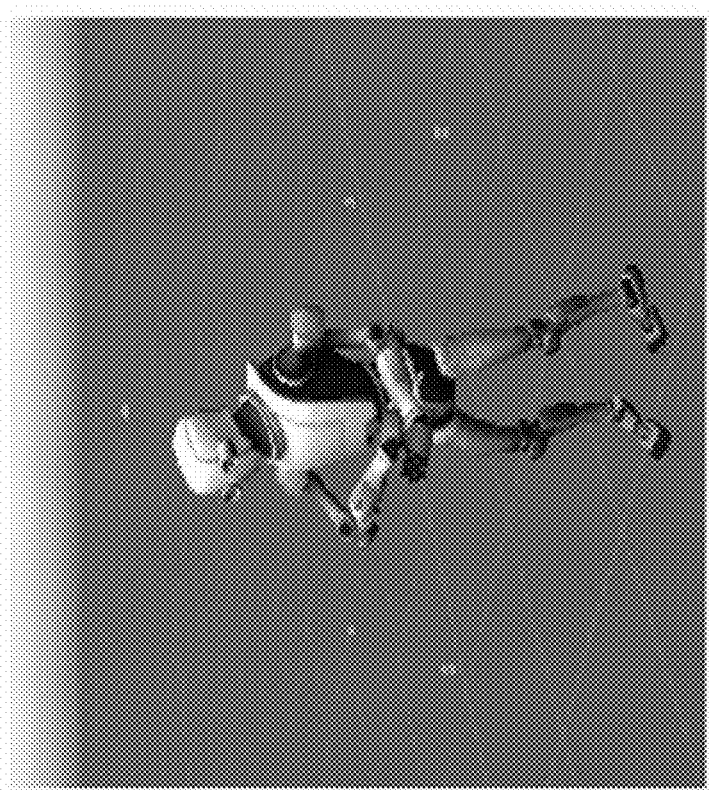
FIG. 5 illustrates all positions (represented by green dots) tested for redirection in the remote workspace for the (a) animations case and (b) for the human participant actions case. Since the average human action is much longer than a motion capture animation cycle, for practicality a representative set of 360-degree target locations were selected for human action redirection.
Figure 5:
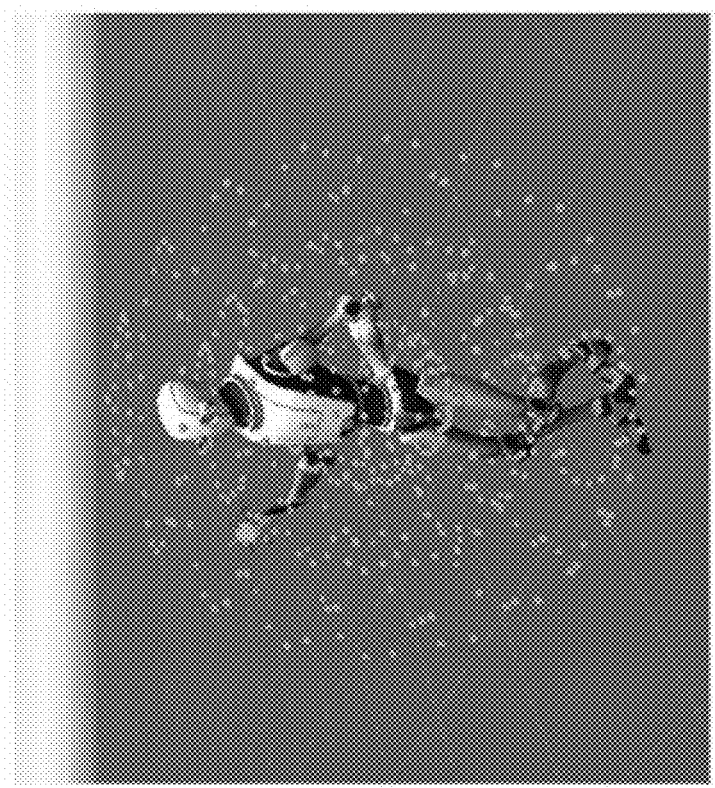

Redirection position locations. Although in most cases the dissimilarities between the remote and local environments are not large, the performance of the dynamic weighted mechanism for redirections in all directions within one's physical reach was tested. The complete positional map of all the locations tested is shown in FIG. 5 (at a). As can be seen, the radial distance of the positions is also varied to simulate interaction with near and far objects, with the outer radius of this positional map decided by the length of the arm kinematic chain. Each position is separated by 18 degrees in both horizontal and vertical planes. The goal target was redirected to each of these locations. The redirections were tested with both one and two goal target cases. In the case of two goal targets, the first target follows the same sequence as the one target case while for the second target a random sequence of target positions is selected from the target locations in FIG. 5 (at a). This same random sequence of target positions is used for all two target tests of different error tolerances and animation speeds. It is noted that all redirections tested were performed with no locomotion, since if locomotion is involved then the optimal pose solution changes.

Sample animation speeds. The dynamic vs static weighting approach was tested on four different speeds of motion capture animations of idling, walking, running, and sprinting. The rationale was to simulate varied speeds of action that users employ while performing tasks in remote-local MR/AR. For example, a sketching and painting task requires faster hand movements when compared to a book sorting task. These animations also have a varied range of body movements with sprinting having the most and idling having the least. The animation speed differences could be seen via recorded video.

Trends across various minimum error tolerances. This dynamic weighting approach allows the user to set the required minimum error tolerance. The weighting mechanism is configured in a manner to give full attention to the primary objective until the set error tolerance is met, after which it gives the remaining weight to the secondary objective. Trends were observed in the primary and secondary errors as the minimum error tolerance values were eased. Different error tolerances were tested starting with 0.01 m, 0.05 m up to 2 m.

EXAMPLE

Testing Redirection of Human Actions Performed During an AR Task

The main goal is to show the efficacy of the dynamic weighting method vis-à-vis the static weight method when human participants are performing a real-world task in AR. The task was book shelving due to its simplicity and it also mimics common actions of picking and moving virtual objects in AR. In addition to the book shelving task, actions of participants performing an angry emotion directed at another person was recorded, the idea being to test the efficacy of the redirection of gesture pointed at a person. The experimental setup and procedure are explained below.

Figure 6:
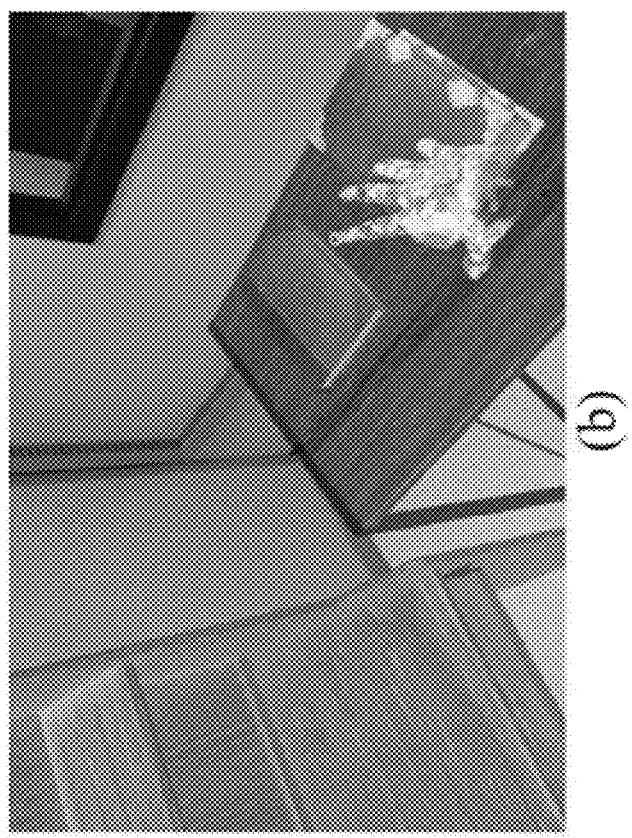
FIG. 6 illustrates an experimental setup for collecting human participant actions in AR. (a) Human participant performing the book shelving task wearing the HoloLens2 (participants actions are recorded by the Azure Kinect). (b) First-person view of the AR task. The books, table and the bookshelf are virtual objects placed in the real environment.
Figure 6:
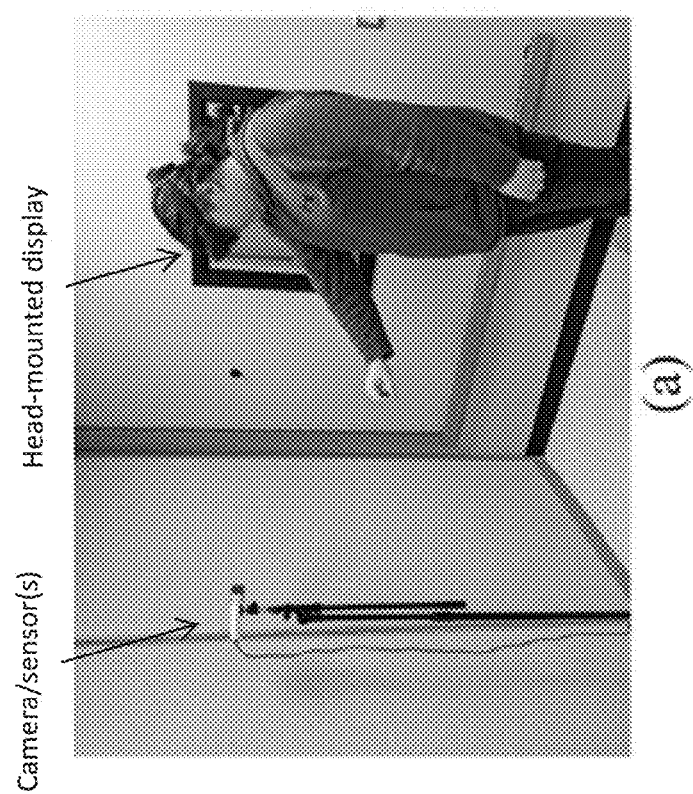

The experimental setup for recording human participant actions is shown in FIG. 6. As illustrated, the user is wearing a HMD. The HMD can include a housing, a controller configured to execute non-transitory computer readable media stored therein, memory, one or more displays, a transmitter and a receiver, electronic communications hardware and software for coupling to a network, and other relevant electronic circuitry of which a person of skill in the art would understand to be present in a HMD. The controller is configured to execute the optimization frameworks described herein and illustrated in FIGS. 3 and 11.

For the setup an Azure Kinect color depth camera/sensor was used to capture the participant actions (FIG. 6 (at a)). The AR task was designed and developed on the HoloLens 2 HMD. The HoloLens2 can detect the user's hands automatically which allows the user to freely interact with the environment without the need for an external controller (FIG. 6 (at b)). The view of the task setup through the HMD is shown in FIG. 6 (at b). The user can view the books on the virtual table and can see a bookshelf to his/her left side. The Azure Kinect camera is placed directly across the participant, making sure that the participant's full body frame is in view. In total, data from 12 participants (5 male, 7 female) with an average age of 24.6 years was collected.

Each participant was asked to perform a set of four actions. The first two actions were based on the book shelving task and the other two actions were an angry gesture pointed at a person. For the first action, the participant was asked to pick up a book placed on a virtual table in front of them and place it on a bookshelf to their left. They were asked to pick up the book again from the shelf and place it back on the table. This sequence of actions was supposed to be performed with the right hand only. For the second action, the participants were asked to repeat the first action, but instead of holding the book in one hand, they were told to use both the hands, as to simulate a two-goal target redirection. The hand and wrist joints were used as goal targets while testing the algorithms for redirection. The third and the fourth actions were angry gestures pointed at another person, with the third action using one hand and the fourth action using both the hands. These actions were specifically selected to simulate general interaction with people and objects in an AR setup.

Once the set of actions from the participants was collected, these actions were used for the redirection purposes. The recorded actions were converted to a .anim file using a package from the Unity asset store. These files were then used in the animator component in Unity to test for redirections. In general, the book shelving actions were longer (average time: 13.4 seconds) than the angry emotion actions (average time: 5.1 seconds). Since the human action cycles were significantly longer than the motion capture animation cycles (average time: 0.5 seconds) we did not test all the redirection target positions for the human actions (FIG. 5 (at b)) as for the animation case (FIG. 5 (at a)). However, the target positions were selected from a 360-degree spherical perspective, in order to keep the target locations similar to the animation case. The human actions were tested the same way as the animation case, i.e. for the static case and dynamic case (with $k_{tol}$=1.00 and 13.18).

The results are presented below in two sections: the performance of the static vs dynamic weighting approach i) with the animation case and ii) with actions recorded while human participants are performing a task in AR.

Performance of the dynamic vs static approach. The comparison results are presented in Tables I and II. They can be broadly divided into two categories of minimum error tolerances i) strict case (Table I) and ii) lenient case (Table II). For each of these cases, four different animation speeds were tested with the remote-local workspace redirection locations as shown in FIG. 5 (at a). When reporting the percentage changes, the dynamic errors were measured relative to the static errors. This is shown in Table I for the strict case where the primary error for the dynamic case has decreased by nearly 70% (average of all animations and targets). However, the secondary error showed an increase of nearly 38% compared to the static case (average of all animations and targets). Similarly, Table II shows the average primary and secondary errors changes for the lenient case where the primary error for the dynamic case has decreased by nearly 20.5% (average of all animations and targets) and the secondary error showed a very slight increase of 0.5% compared to the static case (average of all animations and targets). The average secondary error is nearly double for faster animations of running and sprinting when compared to animations of idling and walking, though this is not because of the dynamic weighting scheme since it is seen in both the static and dynamic cases.

TABLE 1

Comparison of the primary and secondary errors (PE and SE) of motion capture animations for static vs dynamic approach for strict minimum error tolerance ($X_{tol}$ = 0.25 m, k = 13.81) condition

| Motion capture animation | Average Static PE (m) | Average Static SE (m) | Average Dynamic PE (m) | Average Dynamic SE (m) | Reduction in PE—static vs dynamic (%) | Reduction in SE—static vs dynamic (%) | Net (PE + SE) change in error (%) |
|---|---|---|---|---|---|---|---|
| Idling (1 target) | 0.19 | 0.31 | 0.05 | 0.52 | 71.67 | −68.64 | 3.03 |
| Idling (2 target) | 0.39 | 0.51 | 0.07 | 0.67 | 80.07 | −33.10 | 46.97 |
| Walking (1 target) | 0.27 | 0.58 | 0.08 | 0.88 | 70.67 | −53.00 | 17.67 |
| Walking (2 target) | 0.38 | 0.73 | 0.11 | 1.10 | 70.47 | −51.06 | 19.40 |
| Running (1 target) | 0.20 | 0.74 | 0.05 | 0.94 | 73.02 | −27.39 | 45.63 |
| Running (2 target) | 0.41 | 1.06 | 0.11 | 1.37 | 72.11 | −28.33 | 43.78 |
| Sprinting (1 target) | 0.19 | 0.84 | 0.05 | 1.03 | 73.50 | −21.67 | 51.83 |
| Sprinting (2 target) | 0.39 | 1.18 | 0.11 | 1.48 | 72.25 | −25.17 | 47.08 |
| Total Average | 0.30 | 0.74 | 0.07 | 0.99 | 72.97 | −38.54 | 34.42 |

TABLE 2

Comparison of the primary and secondary errors (PE and SE) of motion capture animations for static vs dynamic approach for lenient minimum error tolerance ($X_{tol}$ = 5 m, k = 1) condition

| Motion capture animation | Average Static PE (m) | Average Static SE (m) | Average Dynamic PE (m) | Average Dynamic SE (m) | Reduction in PE—static vs dynamic (%) | Reduction in SE—static vs dynamic (%) | Net (PE + SE) change in error (%) |
|---|---|---|---|---|---|---|---|
| Idling (1 target) | 0.19 | 0.30 | 0.15 | 0.30 | 19.57 | −0.18 | 19.38 |
| Idling (2 target) | 0.39 | 0.50 | 0.32 | 0.50 | 17.18 | −0.02 | 17.15 |
| Walking (1 target) | 0.19 | 0.48 | 0.15 | 0.47 | 19.50 | 3.36 | 22.86 |
| Walking (2 target) | 0.39 | 0.73 | 0.32 | 0.70 | 17.83 | 3.24 | 21.08 |
| Running (1 target) | 0.18 | 0.73 | 0.15 | 0.72 | 14.71 | 2.26 | 16.98 |
| Running (2 target) | 0.41 | 1.05 | 0.32 | 1.00 | 22.61 | 5.13 | 27.74 |
| Sprinting (1 target) | 0.19 | 0.73 | 0.14 | 0.84 | 27.51 | −14.94 | 12.56 |
| Sprinting (2 target) | 0.40 | 1.19 | 0.29 | 1.18 | 25.68 | 0.57 | 26.26 |
| Total Average | 0.29 | 0.71 | 0.23 | 0.71 | 20.57 | −0.0725 | 20.50 |

Figure 7:
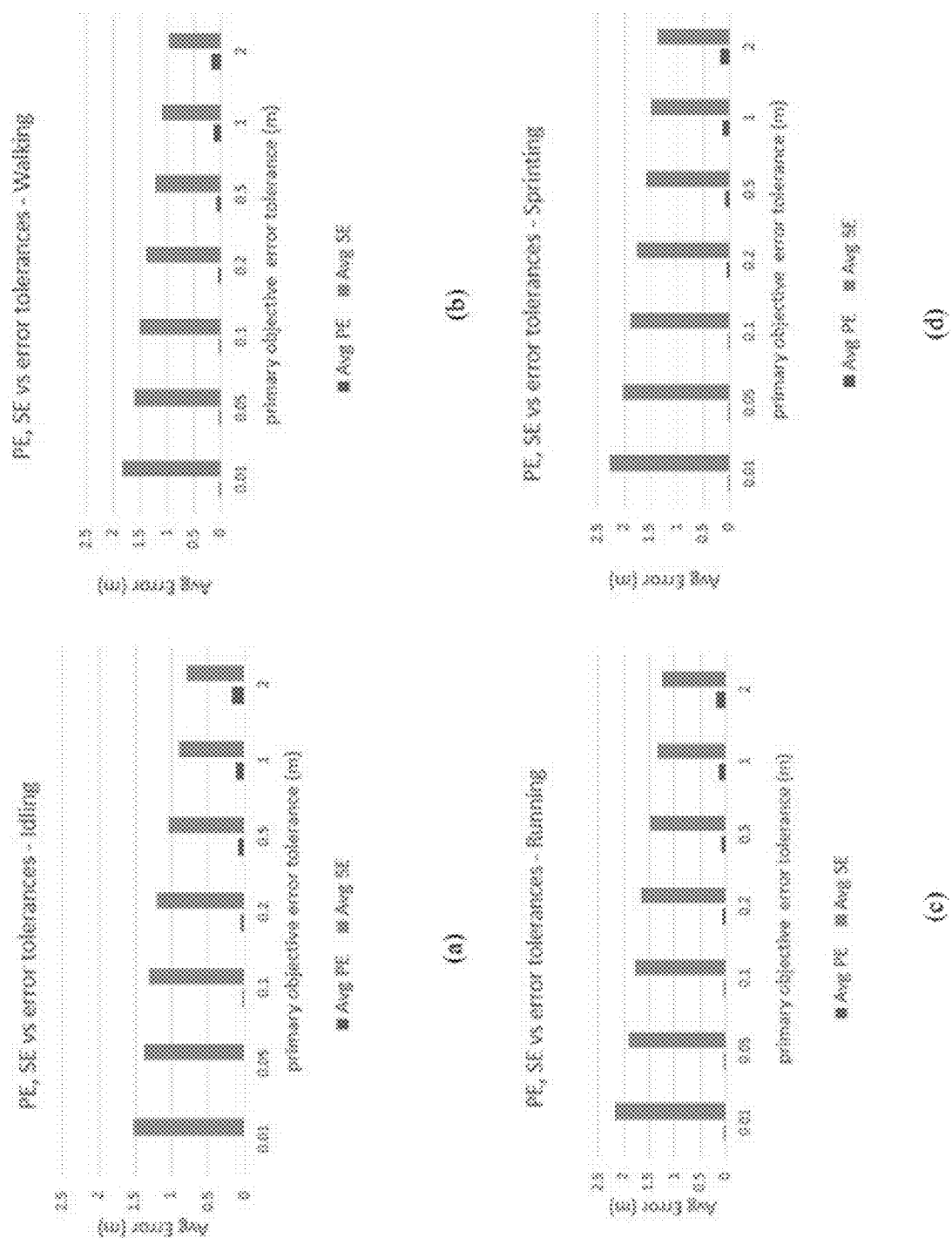
FIG. 7 illustrates average (Avg) primary and secondary (PE and SE) trends for the dynamic weighted approach with the user defined minimum error tolerance values varied for (a) idling (b) walking (c) running (d) sprinting animations.

Dynamic weighting trends across error tolerances. The primary and secondary error trends for different animations across various error tolerance levels are shown in FIG. 7. The observations of the general expected trends of what the dynamic weighting mechanism is designed, i.e., as minimum error tolerance for the primary objective eases, the secondary objectives get optimized more resulting in a decrease in the average secondary error and an increase in the average primary error. It must be noted that the x-axis in FIG. 7 is not plotted on a linear scale. Similar trends were noticed as in Tables 1 and 2 in FIG. 7 in terms of absolute values of the secondary error with slower animations of idling and walking having a smaller average error when compared to running and sprinting animations.

The recorded human participants action results are shown in Table 3 and Table 4 below.

TABLE 3

Comparison of the primary and secondary errors (PE and SE) of recorded human actions for static vs dynamic approach for strict minimum error tolerance ($X_{tol}$ = 0.25 m, k = 13.81) condition

| Motion capture animation | Average Static PE (m) | Average Static SE (m) | Average Dynamic PE (m) | Average Dynamic SE (m) | Reduction in PE—static vs dynamic (%) | Reduction in SE—static vs dynamic (%) | Net (PE + SE) change in error (%) |
|---|---|---|---|---|---|---|---|
| Book task (1 target) | 0.29 | 0.55 | 0.07 | 0.76 | 71.17 | −39.25 | 31.92 |
| Book task (2 target) | 0.41 | 0.66 | 0.13 | 1.20 | 66.44 | −80.38 | −13.93 |
| Angry action (1 target) | 0.21 | 0.51 | 0.06 | 0.70 | 68.17 | −36.26 | 31.91 |
| Angry action (2 target) | 0.58 | 0.99 | 0.19 | 1.73 | 66.03 | −70.18 | −4.14 |
| Total Average | 0.37 | 0.67 | 0.11 | 1.09 | 67.95 | −56.51 | 11.44 |

TABLE 4

Comparison of the primary and secondary errors (PE and SE) of recorded human actions for static vs dynamic approach for lenient minimum error tolerance ($X_{tol}$ = 5 m, k = 1) condition

| Motion capture animation | Average Static PE (m) | Average Static SE (m) | Average Dynamic PE (m) | Average Dynamic SE (m) | Reduction in PE—static vs dynamic (%) | Reduction in SE—static vs dynamic (%) | Net (PE + SE) change in error (%) |
|---|---|---|---|---|---|---|---|
| Book task (1 target) | 0.29 | 0.55 | 0.25 | 0.39 | 14.43 | 28.43 | 42.86 |
| Book task (2 target) | 0.41 | 0.66 | 0.36 | 0.55 | 12.52 | 16.03 | 28.56 |
| Angry action (1 target) | 0.21 | 0.51 | 0.18 | 0.35 | 15.57 | 30.57 | 46.14 |
| Angry action (2 target) | 0.58 | 0.99 | 0.51 | 0.86 | 13.96 | 13.29 | 27.26 |
| Total Average | 0.37 | 0.67 | 0.32 | 0.53 | 14.12 | 22.08 | 36.20 |

It is noted that for the recorded human actions, the static cases were run only once, unlike in the animations case where it was run once when $k_{tol}$=1.0 and again when $k_{tol}$=13.18, which was unnecessary. Hence, the error values in Table 3 and Table 4 for the static case are the same. For each $k_{tol}$ there are four actions tested with the redirection target locations as shown in FIG. 5 (at b). For the strict case, in the dynamic case the primary error decreased by nearly 68% (average of all actions and targets). However, as in the case for the animations, the secondary error showed an increase of nearly 56% compared to the static case (average of all animations and targets). For the lenient case, the performance was much better (than animations case) as shown in Table 4, where for the dynamic case the primary error decreased by nearly 14% (average of all actions and targets) and the secondary error also decreased by a larger amount of 22.08% compared to the static case (average of all animations and targets). The average primary error for the actions with two goal targets was almost twice that of the one target ones as shown in Table 3 and Table 4. When comparing the human actions with one goal target with the two goal target ones, there was a decrease in the reduction of the average net error (primary+secondary objective). This is the case for both the strict and the lenient case, with the lenient case having an average net error reduction of 44.5% and the strict case of 31.91% for one target locations when compared to an average reduction of 27.91% and −9.03% for two target locations. This reduction in net average error was primarily due to the decrease in error reduction in the secondary error between the one and two target actions (decrease in primary error was similar for both one and two target cases) as can be seen from the 7th column of Table 3 and Table 4.

Comparison of animations and human actions testing results. Overall, dynamic weighting performed better in both the animation and human actions case, with the animation case having a reduction in the net average error (all animations+one and two targets) of 20.49% for the lenient case and 34.42% for the strict case. For the human actions, the net average error (all actions+one and two targets) reduction was about 36.2% for the lenient case and about 11.44% for the strict case. When split into the primary and secondary error reductions, it amounts to 20.57% and −0.07% (lenient case) and 72.96% and −38.54% (strict case) average error reductions (all animation s+one and two targets) for the animations case. For the human actions, the primary and secondary error reductions, it amounts to 14.12% and 22.08% (lenient case) and 67.95% and −56.51% (strict case) average error reductions (all animations+one and two targets). When comparing the results between one and two targets, the reduction in average error is more uniformly distributed (especially for the secondary error) for the animation case than the human actions case. For the animation case, the average reduction (all animations) in primary and secondary errors are 20.32% (lenient case), 72.19% (strict case) and −9.46% (lenient case), −42.67% (strict case) for one target and 20.82% (lenient case), 73.71% (strict case) and 2.23% (lenient case), −34.47% (strict case) for two target redirection cases. For the human actions case, the average reduction (all human actions) in primary and secondary errors are 15.0% (lenient case), 69.67% (strict case) and 29.5% (lenient case), −37.75% (strict case) for one target and 13.24% (lenient case), 66.23% (strict case) and 14.66% (lenient case), −75.28% (strict case) for two target redirection.

For the animations case, the reduction in the net average error (primary objective error+secondary objective error) across various animation speeds and number of goal targets for the strict case was 34.4% and for the lenient case was 20.5%. To put it in another way, compared to the net average dynamic error, the net average static error is 248% and 26% larger for the strict and lenient error tolerance cases, respectively. Higher net error reduction in the strict case was primarily due to the 72.97% reduction in the primary objective error when compared to the lenient case where reduction in primary objective error was only 21%. The dynamic weighting approach can adapt across animation speeds and number of targets and similar results were observed for both one and two goal targets and different animation speeds for both the strict and lenient cases. Although the percentage errors across animation speeds between the dynamic and static cases, are similar, when comparing between the animations, faster animations of running and sprinting have higher body pose (secondary) error. This is not due to more primary objective optimization (in the dynamic case) since this trend was also seen for the static case, but because these animations have larger range of body movements causing increase of the distance error to a particular target during redirection. This can also be seen in the average secondary errors in FIG. 7.

The dynamic weighting method showed better performance for both the human actions and the animations case. However, for the human actions the improvement in performance between one and two targets was not uniform, especially for the secondary objective when compared to the animations case. For the human actions case, the average reduction in error for one target case was twice as much as the two-target case. This boosts its net average error reduction for one target to almost twice that of the animation case. This was because for one goal targets it was easier to optimize the primary objective compared to two goal targets, hence more weightage can be given to the secondary objectives. However, this trend was not so pronounced in the animation case, mainly because sequence of actions had more overall body joint movements and higher speed. This means even for one target cases, much more weight must be given to the primary objective as compared to the secondary objective to obtain a solution within the user-defined error thresholds.

Optimization Framework for Redirection of Pointing Gesture Interactions

Pointing gestures play a key role for users to communicate about aspects related to their AR/MR environment.

Also, the body pose one uses during pointing, relays cues of the user's intentions and non-verbal behaviors during the interaction. Due to dissimilarities in multiple users' environments, pointing gesture needs to be redirected since direct animation of the user's motion onto its avatar may introduce error. At the same time, the non-verbal behavior represented by the body pose also needs to be preserved for realistic interaction. While these objectives are not mutually exclusive, current approaches only solve the redirection of the gesture without preserving the body pose. The present disclosure provides a systematic approach to solving the dual problem of redirection of gesture as well as preserving the body pose using a multi-objective optimization framework. The presented framework efficiently adjusts the weighting between the two objectives and gives the user the flexibility to set the minimum angular error tolerance for the pointing gesture redirection.

Figure 8:
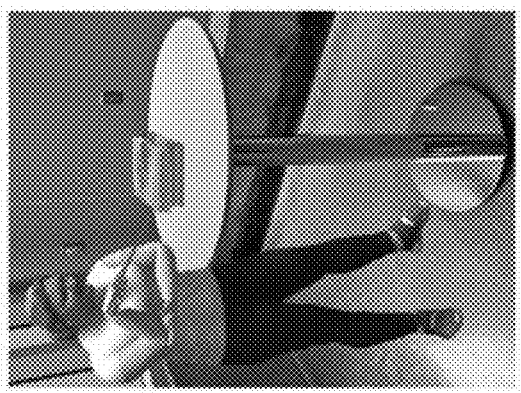
FIG. 8 illustrates a remote/local AR setup to show pointing errors. (a) User2 pointing in their environment. (b) User2's photorealistic avatar as seen by User1 wearing the AR HMD with a direct one-to-one mapping of User2's gestures. Note the error in the pointing gesture. (c) Correction of pointing errors as done by current approaches; body pose-non-verbal communication of the original interaction is not preserved. (d) Correction of the pointing error by the framework disclosed herein, that preserves the non-verbal aspects of the interaction, that is important in establishing social presence.
Figure 8:
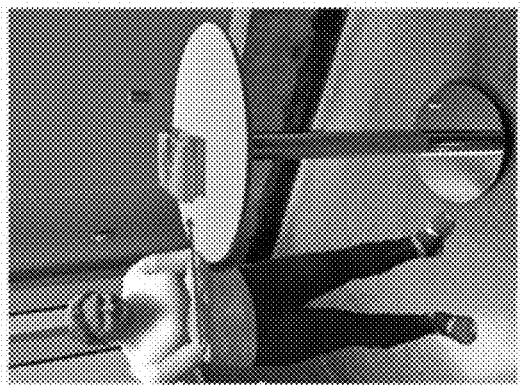
Figure 8:
Figure 8:
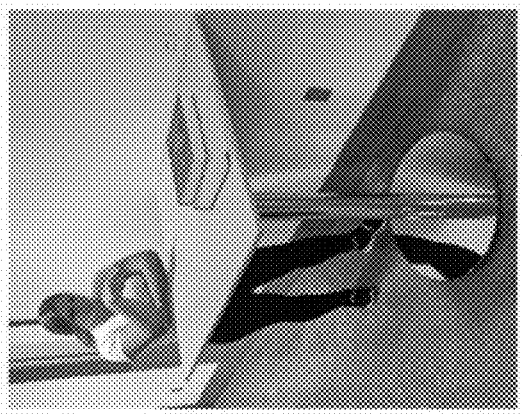

In remote/local AR, a remote user is represented in the local user's workspace through their life-size photorealistic avatar and vice versa, with common objects of interaction present in both the workspaces (FIG. 8). Interactions with these objects can be mainly classified as contact and non-contact interactions. Examples of contact interactions include moving a cup or a chess piece by the user while non-contact interactions include mainly gestural interactions. Gestural interactions are primarily used to communicate information about an object in the environment. Example of such interactions could be when a user is pointing at a book on the table or even waving at other users in the environment. Direct mapping of these gestures from the users to their avatars lead to interaction error and loss of meaning of the gesture, since the object and avatar positions between the environments differ due to the geometric dissimilarities between them (FIG. 8 (at a and b)). A direct mapping also introduces errors if there are differences in physical dimensions between the user and their avatar representation, or other perturbations such as localization and drift errors. Hence the gestures need to be redirected to convey the intended meaning by the user. When gesturing, non-verbal behavior plays an important role and provides motivation to not only redirect the gesture to the intended object, but also to preserve the non-verbal behavior of the original interaction (FIG. 8 (at c and d)). These two objectives sometimes conflict with each other. The present disclosure provides a systematic approach based on a MO framework to solve this problem where the primary objective is correctly pointing towards the object and the secondary objective is preserving the body pose from the original interaction as much as possible.

Figure 9:
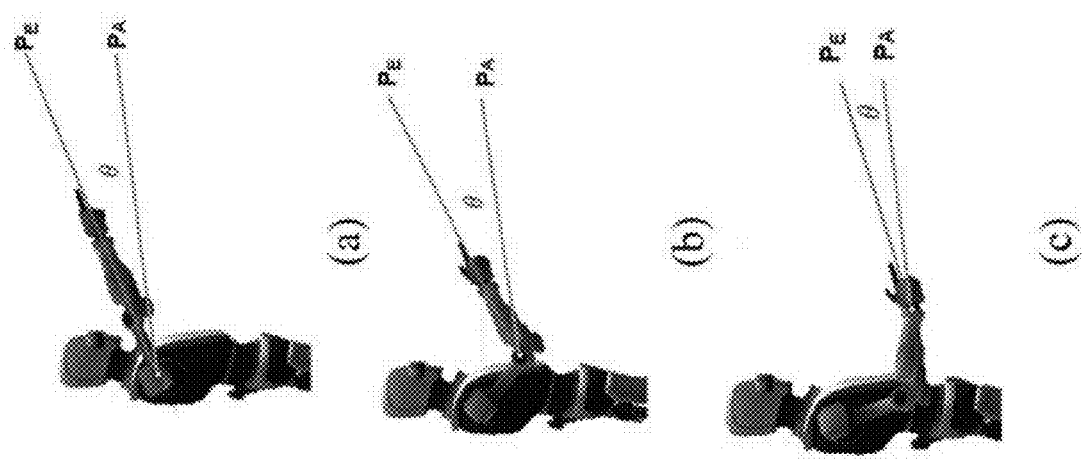
FIG. 9 illustrates the pointing gesture error for different joints. (a) Shoulder joint (b) forearm joint (c) wrist joint. $P_E$ represents the position of a distal object referred to by the gesture. $P_A$ refers to the actual position of the object and $\theta$ refers to the gestural error in each case.

Objects in the environment are mainly pointed at using either the wrist, shoulder, or forearm. When an object is pointed at, the link of that body joint is put at a particular angle and a straight raycast from that joint reaches the object (FIG. 9). In the case of remote/local AR, when a user points at a particular object, the same object in the remote environment is identified and the user's avatar redirected to point towards it. The upper body which is used for pointing can be modelled as a kinematic chain (FIG. 10) and inverse kinematic (IK) approaches can then be used to align a particular joint at an angle to correctly point at the required object. There are various approaches used to solve the IK problem for body frames which mainly include Jacobian based and iterative redirection approaches. For the MO framework, the recent genetic algorithm (GA) based approach was used, as it has shown to be more robust, and better at finding globally optimal solutions. However, the current-state-of-the-art GA approach, is inefficient in the sense that it cannot dynamically adapt the weighting between multiple objectives as required. This is important because from a particular body pose certain redirections could be harder or easier to reach than others. Also, based on the user requirement and the environmental context, the objects pointed to may vary widely in angular resolution. For example, when users are pointing to a chess piece, a higher angular resolution is required compared to when they point at a large table. Lower requirement of angular resolution means that the body pose of the gesture can be optimized more, conveying non-verbal behavior more accurately. Hence, there is a need to be able to dynamically set the weighting between the objectives and set the required angular resolution according to environment and user preference so that an improved body pose can be obtained. This helps in preserving non-verbal behavior and the social presence of the interaction.

The present disclosure provides a GA based MO framework that is used to correct pointing gestures, while at the same time preserving the body pose related non-verbal behavior of the original gesture. This approach is efficient, in terms of its ability to dynamically adapt the optimization between the primary and secondary objectives and flexible in terms of setting the required angular resolution according to user preference and environment.

When a user points at an object, they align a particular joint i.e., wrist, forearm or shoulder at an angle such that a straight ray cast from that joint, colinear with the joint link would hit the intended object being pointed at (FIG. 2). This gesture of the user creates a particular body pose which can be represented as a set of joint angles θ.

$$\theta = (j_1|j_2|j_3| \ldots |j_{n-1}|j_n) \qquad \text{(eq. 15)}$$

where n represents the number of joints in the model and $j_1, j_2 \ldots j_n$ represent the individual joint angles. Each of the joints also has a maximum and minimum body pose constraint $\theta_{i_{min}} \leq j_i \leq \theta_{i_{max}}$. When a user points at an object in their environment, their body pose is taken as the reference pose. The goal of the pointing redirection framework is to make the avatar of that user point to the correct corresponding object in its environment (primary objective). This redirection should be done by not violating joint constraints, while at the same time preserving the body pose of the original interaction (secondary objective). The redirection is carried out for every frame.

From a particular pose, certain gesture redirections are easier to reach than others. For example, in FIG. 1, if the book had been placed at the back side of the avatar, it would involve a more complex redirection than when the book is placed as shown in the front. When the redirection is not far, it is easier for the optimization framework to find the solution since it starts with the current pose as the elite solution to the GA, requiring fewer iterations to get to the correct pointing gesture. This is also true for other IK approaches such as Forward and Backward Reaching Inverse Kinematics (FABRIK) and Cyclic Coordinate Descent (CCD) that consider the current body pose as the initial solution to iterate upon. In this case, more weight can be given to the body pose optimization objective in the overall cost function. When the object to be pointed at by the avatar is far from its position compared to the user's environment, more weight is needed for the pointing objective to obtain the user specified level of accuracy. Hence, the weighting between the objectives should be dynamically adjusted in real time to make the optimization more efficient.

To minimize the pointing error, the body joint the user uses to point at an object is identified, which could be their wrist, shoulder or forearm. Once the pointing body joint has been identified, the error for it is defined as follows:

Shoulder joint error. The error is defined as the angle between the straight line from the shoulder joint to the object to be pointed at and the straight line colinear with the avatars hand. In this case, the wrist and forearm joint are not optimized and these joints are always kept collinear to the avatars complete hand (FIG. 2 (at a)).

Forearm joint error. The error is defined as the angle between the straight line from the forearm joint to the object to be pointed at and the straight line colinear with the forearm. In this case, the wrist joint is not optimized, and it is always kept collinear to the forearm (FIG. 2 (at b))

Wrist joint error. The error is defined as the angle between the straight line from the wrist joint to the object to be pointed at and straight line colinear with the wrist. (FIG. 2 (at c)).

The pointing gesture error ($\theta_{pe}$) can then be defined as $$\theta_{pe} = \alpha + d_E^2(u, \alpha) \qquad \text{(eq. 16)}$$

where $u, a \in R^3$ represent the angular vector representing the user's and the avatar's joint used for pointing, respectively and $d_E^2(u, \alpha)$ represents the Euclidean distance between these vectors. a represents the primary objective weight whose computation is described below.

Figure 10:
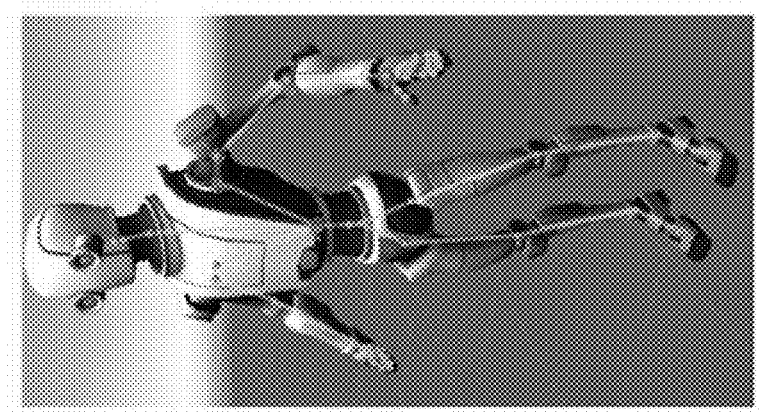
FIG. 10 illustrates the (left) arm chain joints used for pointing gestures shown in pink. The robot can be replaced by any other avatar.

For optimizing the body pose while pointing, two body poses are quantified for similarity. Although there are many similarity metrics for comparing body poses as described, the Weighted Joint Orientation Distance (WJOD) metric is used since this represents the body pose compared to a reference pose in terms of Euclidean angles. This is important since the pointing gesture error is measured in angles and having the body pose also described in the same units prevents the problem of normalization associated with MO, which has been shown to be difficult to solve. When considering pointing interactions, it is sufficient to only involve the joints in the hand kinematic chain, i.e., all the joints from the hip to the wrist (FIG. 10). This is because any pointing gesture can be redirected to any other direction using only these joints. If both hands are used for gesturing, then both the hand chains are added to the optimization framework. For the remaining joints of the body, the angles from the reference pose can be directly mimicked to minimize the WJOD for the whole body. The pointing body pose error based on the WJOD can be mathematically written as ($\theta_{be}$)

$$\theta_{be} = \beta \Sigma_{i=1}^{n_j} w_i * d_E^2(u_i, \alpha_i) \qquad \text{(eq. 17)}$$

where $u_i, a_i \in R^3$ represent the angular vector for joint i of the user and their avatar in their respective environments. $d_E^2(u_i, \alpha_i)$ represents the Euclidean distance between $u_i$, $a_i$ and $n_j$ represents the number of joints in the gesture pointing chain. $w_i$ is the weight associated with each joint in the kinematic chain. These weights are determined by the joint lengths from the wrist to that joint. They are weighted in this way since an error in the previous parent joint in the chain will propagate through all the other subsequent child joints in the chain. For example, an angular error in the hip joint will also cause an angular error in the forearm joint. The summation of the weighted errors is finally multiplied by the secondary weight $\beta$, which is determined dynamically for every frame as discussed below.

The MO problem is of an a priori type, where the order of importance of the objectives is known beforehand. Hence, the a priori techniques of scalarizing the MO problem are used, where multiple objectives are framed as a single-objective optimization problem such that optimal solutions to the single-objective optimization problem are Pareto optimal solutions to the MO problem. In this way, by combining multiple objectives into a single scalar root mean squared (RMS) cost function $C(\theta)$ shown in (eqs. 18 and 19), the optimization problem is converted from a linear to a quadratic one, which has an approximate convex solution.

$$C(\theta) = \sqrt{\frac{\alpha * d_E^2(u, a) + \beta \sum_{i=1}^{n_j} w_i * d_E^2(u_i, a_i)}{1 + n_j}} \qquad \text{(eq. 18)}$$

which can be simplified and written as $$C(\theta) = \sqrt{\frac{\theta_{pe} + \theta_{be}}{1 + n_j}} \qquad \text{(eq. 19)}$$

where $\theta_{pe}$ and $\theta_{se}$ represent pointing gesture and body pose errors, respectively. The primary weight ($\alpha$) is obtained from equation 20, where $\theta_{fr}$ is the angle error for the pointing gesture joint between the user and their avatar calculated for the current frame, $k_{tol}$, is the angular error tolerance factor, which is calculated as shown below, based on the minimum angular error tolerance ($\theta_{tol}$) set according to the user's preference and L is the maximum weight. Computation of the primary weight is based on the logistic function which is used due to its smooth and monotonic nature. Once the primary weight is determined the secondary weight ($\beta$) can be calculated as shown in eq. 21

$$\alpha(\text{primary weight}) = \frac{L}{1 + e^{-k_{tol}(\theta_{fr})}} \qquad \text{(eq. 20)}$$

$$\beta(\text{secondary weight}) = L - \alpha \qquad \text{(eq. 21)}$$

$k_{tol}$ in eq. 20 can be found by rearranging equation 20 as follows:

$$k_{tol} = \frac{\log\left(\frac{f(x)_{max}}{L(1 - f(x)_{max})}\right)}{\theta_{tol}} \qquad \text{(eq. 22)}$$

where $\theta_{tol}$ is the user-defined minimum angular error tolerance and $\alpha = f(x)_{max}$ is taken as the maximum normalized value i.e., divided by L and approximately equal to 1 to prevent $k_{tol}$ from being indeterminate if $f(x)_{max}$ is considered exactly equal to 1.

Figure 11:
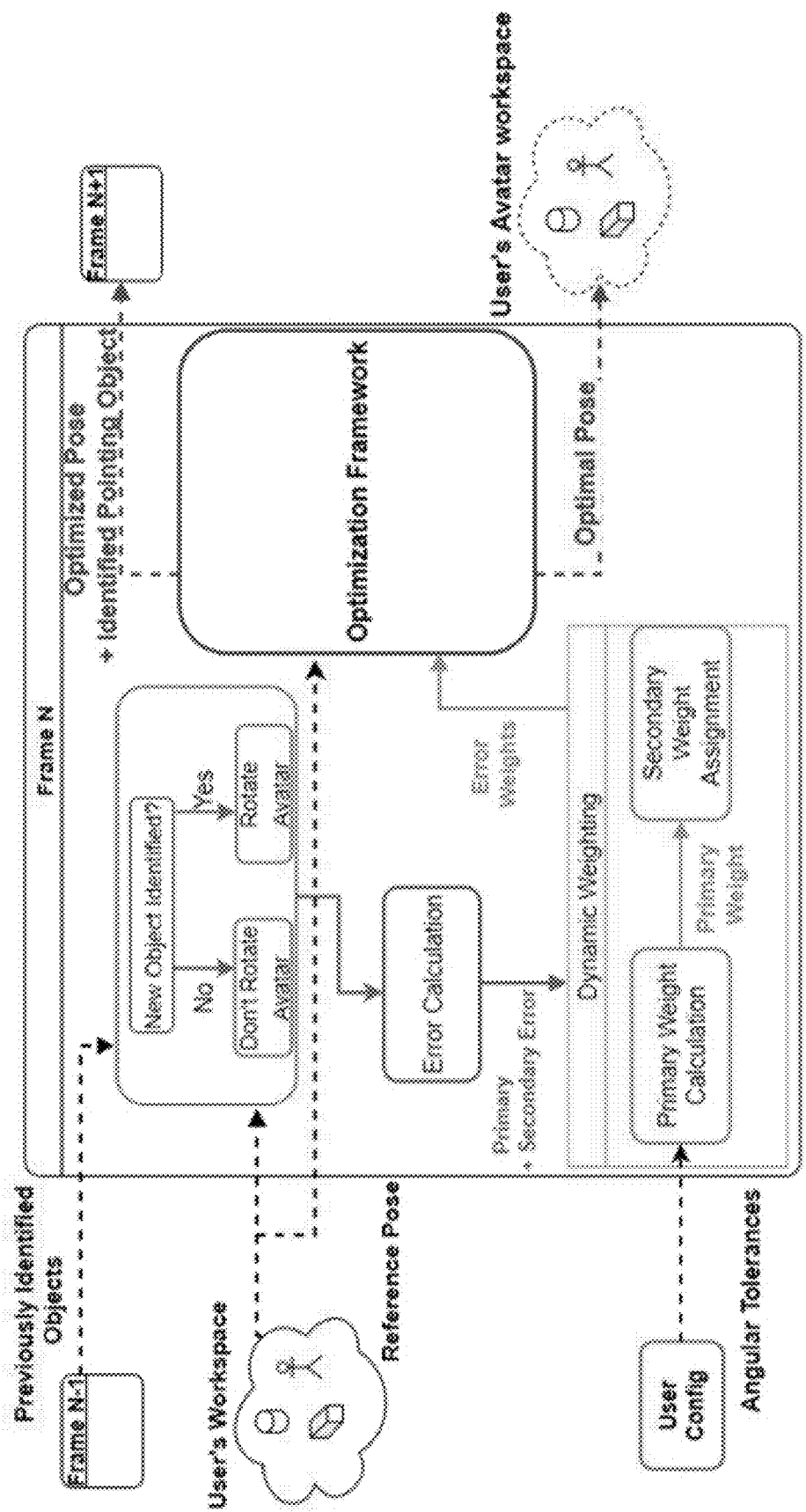
FIG. 11 is a schematic of a frame-by-frame optimization pipeline of the disclosed gesture pointing framework. The primary weight is multiplied to the pointing error while the secondary weight is multiplied to the body pose error in the optimization cost function.

FIG. 11 schematically illustrates the mechanism of the pointing framework, which involves integrating the components described above. The framework works on a frame by frame basis where for every frame, the reference body pose received from the user and the angular error tolerance ($k_{tol}$) are the inputs. Whenever a user points to an object in their environment, the pointing algorithm framework is activated and the corresponding object in the avatar's environment is identified. When an object has been newly pointed at, i.e., not pointed at in the previous frame, the current avatar body frame is rotated along the yaw axis with the current frame reference body pose such that the pointing gesture error is minimized (red block in FIG. 11). This step is performed because the body pose of the avatar can be made as similar as the original interaction by first rotating the body frame to minimize the yaw angle between it and the straight line from the avatar to the object and then continuing with the redirection. While rotating, an interpolation animation is added to look more natural. If the avatar is already pointing at an object in the previous frame, then the above step is not carried out since then the object to be pointed at will have a continuous path from the previous frame. The primary pointing error is then determined based on the joint that the user uses to point at that object (green block in FIG. 11). Then, from the primary error and angular tolerance threshold set by the user the primary and secondary weights for the objectives are obtained according to equations 20 and 21 (orange block in FIG. 11). These weights are then input into the memetic algorithm to find the optimal joint angles to describe the body pose (blue block in FIG. 11). These joint angles are then applied to the avatar frame and also used as inputs for the next frame.

The efficacy of the disclosed MO framework was tested in correctly redirecting pointing gestures of the user to their avatar in their respective environments. The paper by Piumsomboon et al. describes the current state-of-the-art and has looked into various aspects of collaboration between remote and local environments in MR, including pointing gesture redirection. The framework disclosed herein is compared to the one used in the Piumsomboon paper. It uses the Unity game engine IK approach, which is based on the FABRIK iterative algorithm. This method needs to be given a goal target for the end effector. For a pointing gesture, this goal target position is the position of the wrist joint, when the forearm is positioned collinearly with the straight line from the forearm joint to the object to be pointed at. Since the approach used by Piumsomboon et al. has no other conflicting objectives, its solution for the pointing gesture redirection is accurate. On the other hand, the framework disclosed herein has two objectives to balance, the primary objective being pointing gesture accuracy and the secondary objective being similarity of body pose to the original interaction. Hence, this framework is configured to first optimize the pointing gesture according to the minimum error tolerance set by the user, after which it will optimize the body pose. Thus, in order to have an equivalent comparison between the approach used by Piumsomboon et al. and the approach described herein, the rationale as described below is followed.

EXAMPLE

Testing Redirection of Pointing Gesture Accuracy During an AR Task

The ability of the MO framework to adapt to different user specified angular error tolerance values was tested. The goal was to show that the framework was able to first optimize the pointing gesture accuracy according to the set error requirements by the user. The dynamic action of the optimization was demonstrated, i.e., as the error threshold requirements for the pointing gesture becomes lenient, the body pose should be optimized more. Once these aspects of the framework were established the performance of current state-of-the-art and the disclosed approach were compared with respect to the body pose error with different reference poses and with recorded human actions while performing an activity in AR. The specifics of the methods are explained below.

Figure 12:
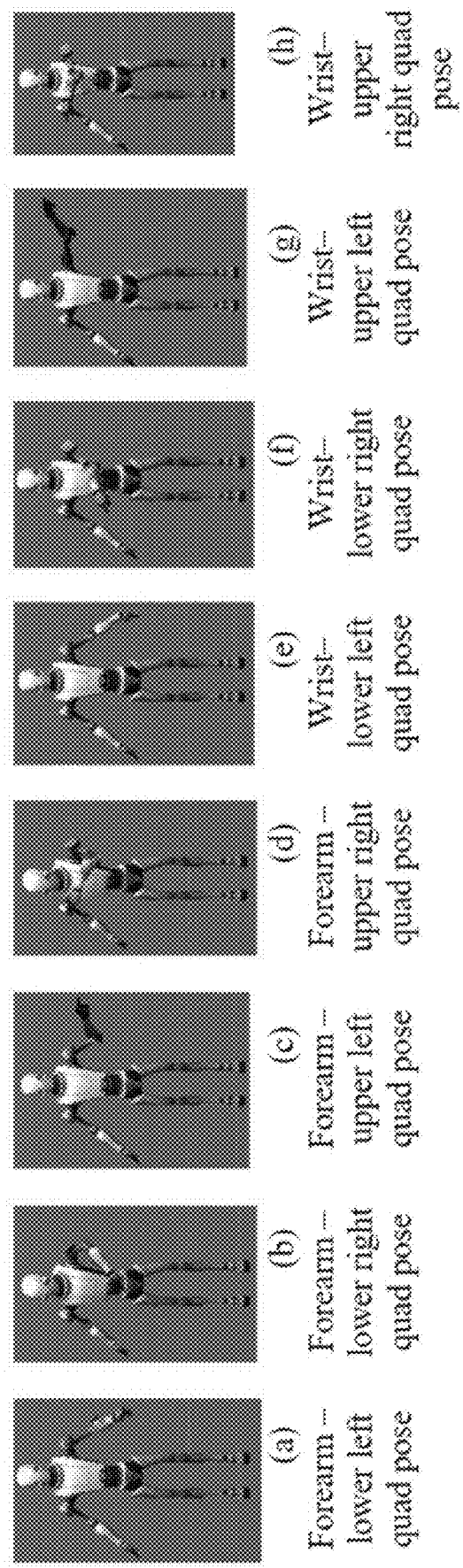
FIG. 12 illustrates various reference poses used to simulate user pointing at objects for testing.

Testing different angular error tolerance values. The goal was to test if the disclosed framework can optimize the pointing gesture accuracy according to the user set error requirement and if the framework has the expected dynamic action of optimizing between the objectives as the error requirements change. This was tested with 8 reference poses, 4 each for the wrist and the forearm joints simulating pointing at four different quadrants as shown in FIG. 12. The reference poses were used to simulate the body pose of a user pointing at an object in their environment. The testing setup is similar to the one shown in FIG. 13, except we do not have the current state-of-the-art approach. The red object is the target to point, and it is moved in a random continuous trajectory. For each reference pose, error tolerance values of 0.1, 1, 10, 100 and 1000° were used for testing. Very large error values of 100 and 1000° were used to test for the dynamic action of optimization of the framework. All tested cases had the same trajectory path for the object to be pointed at.

Figure 13:
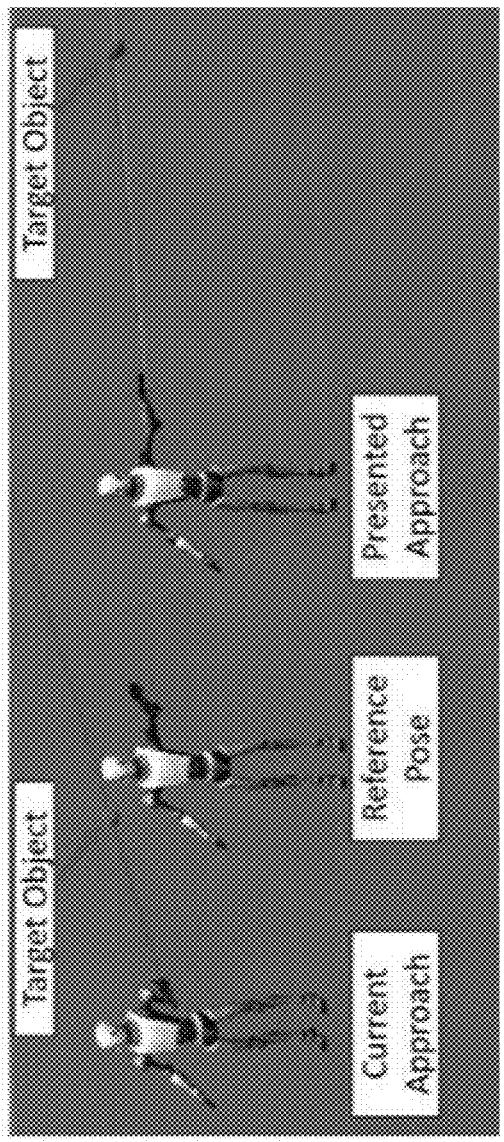
FIG. 13 illustrates the simulation setup. The user's pointing action is simulated by a reference pose in the center. Leftmost avatar points to the object using the current state-of-the-art approach. Rightmost avatar points using our presented framework. The two pointing objects are at the relatively same position in terms of the local frame of the avatars. The green line shows the zero-error gesture and the red line shows the avatar's gesture. Note the similar body pose of the presented approach to the reference pose.

Testing the current state-of-the-art approach vs the presented approach. In this case, the body pose errors between the current state-of-the-art and the framework when the avatar points at an object were compared. The object to be pointed, shown in red in FIG. 13 is in the same position when viewed from the local coordinates of the avatar for both the approaches and was moved with the same random continuous trajectory as used in the above paragraph for all the cases of reference poses. The different reference poses are shown in FIG. 12.

Figure 14:
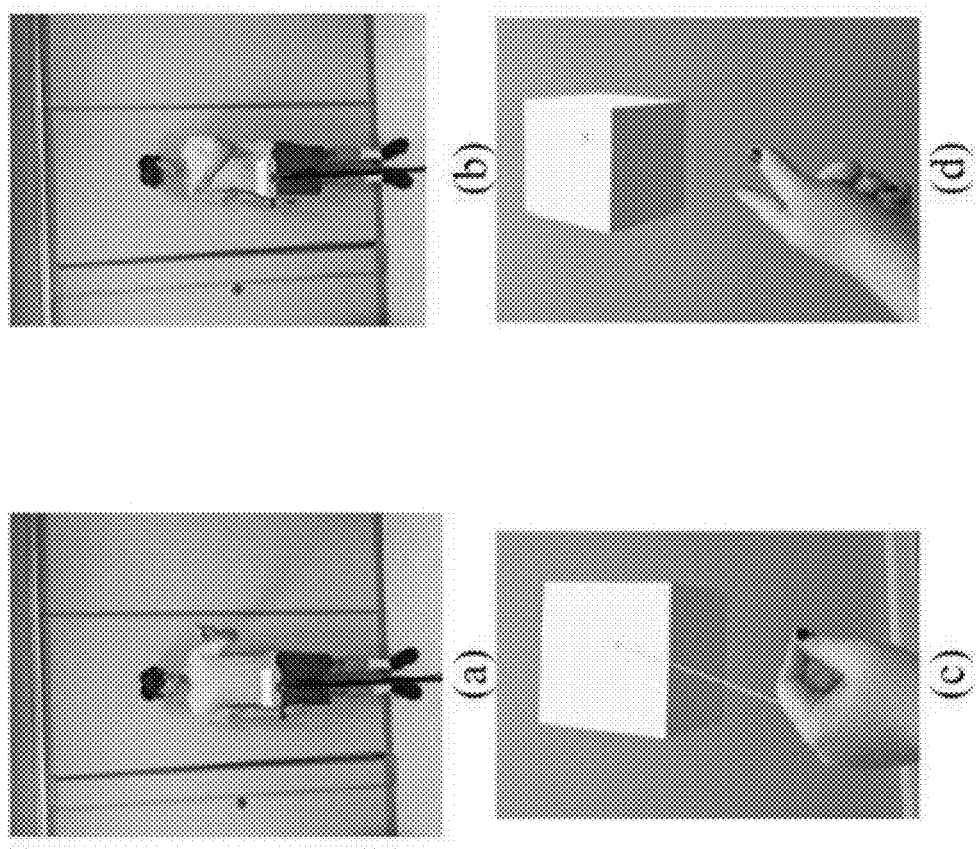
FIG. 14 illustrates the human gesture pointing setup. (a) represents the gesture pointing action with the recorded object trajectory on the left side, (b) on the right side. (c) represents HMD view of the manipulation and recording of the object trajectory that needs to be pointed at and (d) represents HMD view of pointing at the recorded object.

Testing recorded participants actions in AR. The rationale was to redirect pointing gesture actions that have been recorded when a human participant has been pointing at an object in AR. In addition, unlike as discussed above, here we do not have a reference pose but a continuous reference action of the participant pointing at an object. The experimental setup for recording human participant actions is shown in FIG. 14. For the setup an Azure Kinect RGBD camera was used to capture the participant actions (FIG. 14 (at a and b)). The Azure Kinect camera is placed directly in front of the participant, making sure that the participant's full body frame is in view. The AR task was developed on the HL2, which allowed the user to freely use their hands to point at a moving object. A straight ray was cast from the index finger of the participant to ease in the recognition of the pointing action (FIG. 14 (at d)). In total, data from 12 participants (6 male, 6 female) with an average age of 24.8 years was collected. As part of the task, the user was first asked to grab a 3D object (FIG. 14 (at c))—a cube in this case—and move it in a random trajectory using their wrist and forearm joints. They were told to repeat the motion on the left and then the right side of their body using their left hand. The participants could only use their left hand to move the object since the left arm chain was used for optimization. The cube's trajectory was then recorded and replayed for the users and they were asked to point at the replayed cube's trajectory using the same hand, wrist and forearm joints as before (FIG. 14 (at a and b)). Thus, for each participant, a right and a left side cube trajectory was obtained and recorded using forearm and wrist joint and the actions of pointing to the trajectories with the same forearm or wrist joint they were recorded with. In order to simulate a pointing redirection, the trajectories and their actions were interchanged, i.e., the left side pointing action was used as the reference action and made the participant point to the right-side cube trajectory and vice versa. This way combinations of actions and trajectories were tested for both the wrist and forearm joints for both the current state-of-the-art and the disclosed approach.

Figure 15:
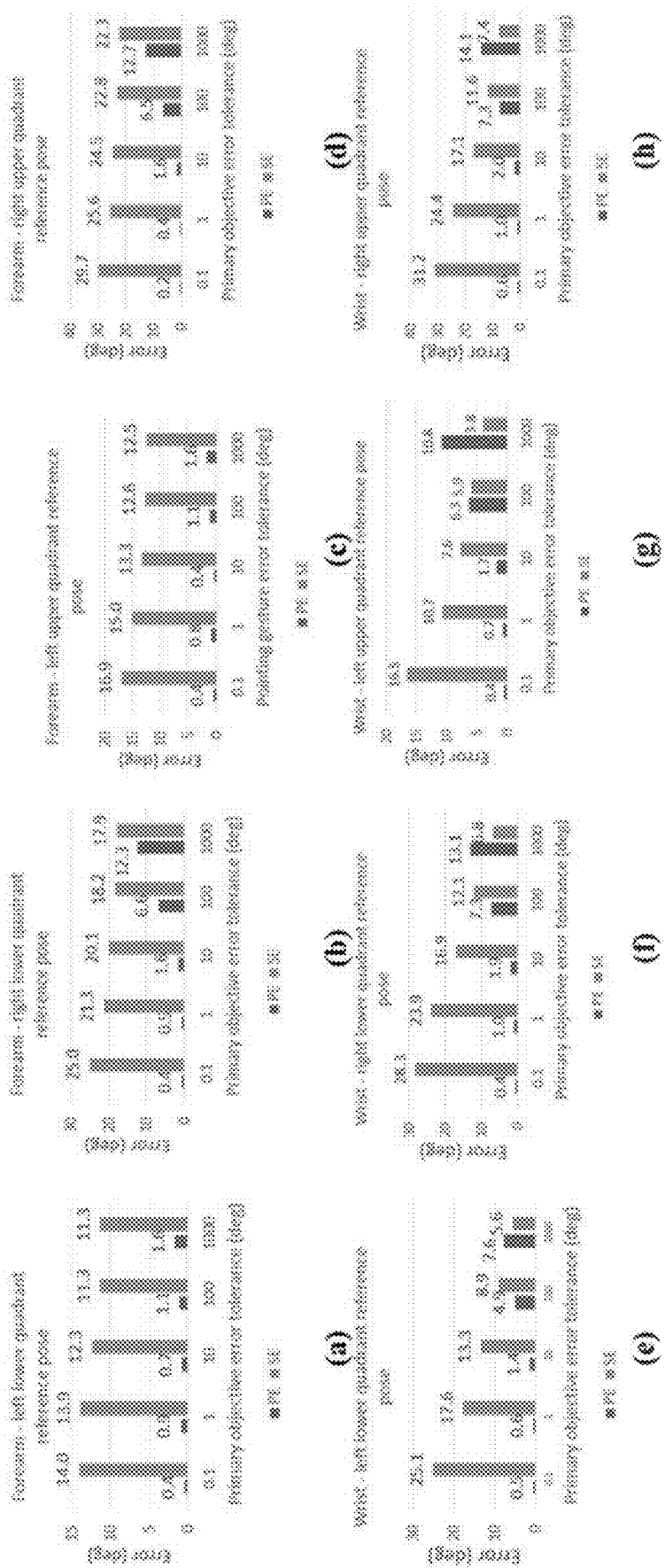
FIG. 15 illustrates dynamic weighting action for different reference poses of the wrist and the forearm. The primary error (PE) is the average pointing gesture error and secondary error (SE) is the average body pose error of the total number of frames.

The response of the framework in redirecting pointing gestures for various user-defined error tolerances is shown in FIG. 15. These are obtained by taking the average for the total number of frames the object trajectory is played when the avatar is pointing at it. The reference poses shown in FIG. 12 were tested with the object to be pointed at having the same trajectory for all the cases. The dynamic action of the framework, i.e., decrease in the body pose error and the corresponding increase in the pointing gesture error to match with the increase in error tolerances is visible across the graphs, for both the forearm and wrist joints. For the forearm joint, the right quadrant reference poses have higher body pose errors, in the range of 29 to 17.9° compared to the left quadrant poses which are in the range of 16.9 to 11.3°. Similarly, the pointing errors for the forearm right quadrants are also higher with the most lenient error tolerance cases having a pointing gesture error in the range of approximately 12° compared to 1.6° for the left forearm joint cases. Compared to the forearm joint, the dynamic action for the wrist joint is more pronounced with all the four reference poses having larger error values for the pointing gesture than the for the body pose error for the most lenient error tolerance case. The pointing errors for the wrist joint increases between the range of 0.4 to 14.1° while the body pose errors decreases between the ranges of 31.2 to 3.8° across various error tolerances.

The testing using the presented framework was performed with the minimum angle error requirement set to 1°. Table 5 shows results for the current state of the art vs the presented approach where the values obtained are averaged over the total frame count during the duration of pointing. Overall, the pointing gesture errors for the disclosed framework were within the user specified error tolerance. Similar to the previous discussion on error tolerance results, the pointing error is larger for the wrist joint, 0.67° on average compared to 0.43° for the forearm joint. In terms of the body pose error, the performance of the presented approach is better compared to the current approach, with the decrease in error of 33.58% across both the wrist and forearm joints for all the reference poses. A similar trend of the much larger decrease in body pose error for the left quadrant reference poses was observed as compared to right for both the wrist and forearm joints (Table 5). T-scores were used to calculate the p-values. From Table 5, a similar trend was observed that for both forearm and wrist redirections the results for the left quadrant were significant while for the right quadrants were not. The results for the pointing gesture redirection of recorded participants actions is shown in Table 6 and was performed with error tolerance set to 1° same as for the reference poses. The framework pointing error are within the set error requirements and it was also observed the similar case that the error is larger for the wrist joint, 0.96° on average compared to 0.225° for the forearm joint. For all the combinations of participant actions and recorded object trajectories the body pose error for the disclosed framework is lower, with an average reduction of 33.67%.

TABLE 5

Comparison of the Primary pointing error and Secondary body pose errors (PE and SE) for the presented vs current state-of-the-art approach for various reference poses ($\theta_{tol} = 1°$)

| Pointing gesture joint | Reference pose | Presented approach Average PE (°) | Presented approach Average SE (°) | Current state-of-the-art Average SE (°) | % SE reduction current vs presented approach (p-value, 0.05 significance level) |
|---|---|---|---|---|---|
| Forearm | Lower left quad | 0.50 | 11.82 | 23.10 | 48.83 (0.00429) |
|  | Lower right quad | 0.41 | 21.10 | 24.06 | 12.32 (0.19365) |
|  | Upper left quad | 0.41 | 12.90 | 29.88 | 56.83 (0.00001) |
|  | Upper right quad | 0.42 | 25.72 | 27.89 | 7.79 (0.27266) |
| Wrist | Lower left quad | 0.52 | 17.08 | 29.70 | 42.48 (0.03669) |
|  | Lower right quad | 0.78 | 22.58 | 26.77 | 15.64 (0.19634) |
|  | Upper left quad | 0.48 | 10.79 | 25.65 | 57.93 (0.00005) |
|  | Upper right quad | 0.90 | 22.26 | 30.44 | 26.88 (0.24910) |

TABLE 6

Comparison of the Primary pointing error and Secondary body pose errors (PE and SE) for the presented vs current state-of-the-art approach for recorded human participant gestures ($\theta_{tol} = 1°$)

| Pointing gesture joint | Pointing Action direction | Object Trajectory direction | Presented approach Average PE (°) | Presented approach Average SE (°) | Current state-of-the-art Average SE (°) | % SE reduction current vs presented approach |
|---|---|---|---|---|---|---|
| Forearm | Left | Right | 0.21 | 16.84 | 26.33 | 35.66 |
|  | Right | Left | 0.24 | 20.20 | 22.45 | 8.59 |
| Wrist | Left | Right | 0.92 | 15.68 | 24.07 | 33.34 |
|  | Right | Left | 1.00 | 15.18 | 23.35 | 57.12 |

The performance of the MO framework was better than the current state-of-the-art pointing redirection technique. Across the results, there were some consistent patterns. First, the reduction in the body pose error was more for the reference poses and actions that are pointed towards the left quadrants. This can be seen from the results in Table 5 and Table 6. It was mainly due to the fact that the left arm chain for pointing at the object was used. Thus, it was easier to point at a particular object using the left arm chain and keep the body pose similar to the reference pose, resulting in lower body pose error. Since, the current state-of-the-art approach does not optimize for the body pose, it has similar errors for both the left and right sides. This was also reflected in the significance testing results where left quadrant results, compared to the right quadrants were significant mainly because the secondary error (SE) error reduction for the right quadrant, for both forearm and wrist joint was lower compared to the left quadrants, which increased the t-score giving rise to a high p-value. Second, the pointing gesture error for the wrist joints were much higher than for the forearm joints. This was because compared to the forearm joint, the wrist joint is a more constrained joint. Since the disclosed framework considers human body joint constraints, accurate pointing gestures require the manipulation of the upper joint i.e., the forearm joint in the chain. This caused a larger change in the body pose error compared to the reference pose causing the framework to optimize more on the body pose keeping the pointing gesture error nearer to the user defined error threshold limit, resulting in higher pointing error. This was also the reason why the difference between the pointing and body pose errors were much starker for the wrist joint (FIG. 15 (at e to h)) compared to the forearm joint (FIG. 15 (at a to d)) as the error tolerances were made more lenient. Although, the user-defined error tolerance as 1° was used for the results, if a higher angular resolution is required it can be set accordingly for the framework to optimize. This may be a requirement especially if the room is large and objects to be pointed at are far away. Also, if both hands are used by the user for gesturing at the same time, then both kinematic arm chains can be added to the optimization framework. In this case the average of the pointing error for both the left and right pointing gestures can be taken in order to compute the primary error weight ($\alpha$) of the framework.

Figure 16:
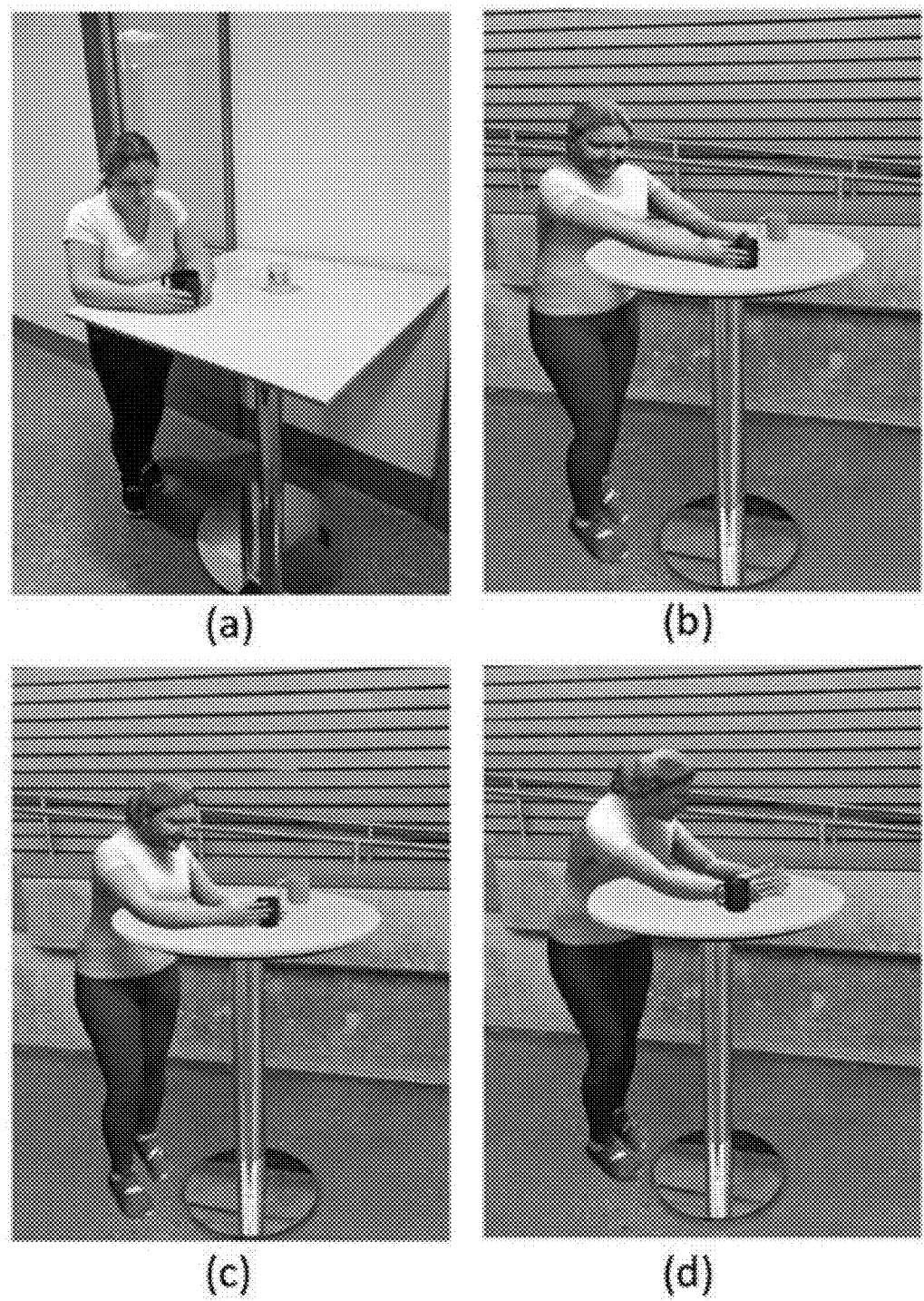
FIG. 16 illustrates avatar adaptation being a core component of realistic remote/local interaction. (a) A local user-object interaction is observed with the intent to be depicted in a remote environment. (b) Current state-of-the-art approaches to depicting a remote avatar interacting with an object do not preserve body posture when avatar repositioning is needed. (c) The approach disclosed performs minor avatar repositioning while preserving body posture (Pose Mimicry). Additionally, if explicit redirection to a new object is needed (d), this approach maintains nonverbal posture information while performing the redirection (Pose Redirection).

Augmented Optimization Metric to Preserve Body Pose During Avatar Adaptation in MR/AR The MO framework described above can include an Augmented Joint Coordinate Distance (AJCD) metric to correctly mimic a user's observed body pose while still portraying user intent and interactions, even when undergoing intentional avatar redirections. The AJCD metric provides an improved process for both pose mimicry and pose redirection. As used herein pose mimicry is defined as the correction of positional and rotational errors in avatar pose to mimic a given pose while preserving intended actions, e.g., contact with a target object. As used herein, pose redirection is the further addition of an explicit redirection of an avatar's action, e.g., the user is observed to contact object A (black cup in FIG. 16 (at a)) and the avatar is redirected to contact object B (white cup in FIG. 16 (at d)). Depending on the context, a mixed reality scenario can involve periods of both pose mimicry and redirection throughout its duration. Current state-of-the-art avatar adaptation techniques make no effort to preserve body posture when redirecting an appendage, instead focusing solely on preserving the intended interaction, i.e., pointing or touching. As such, they are incapable of pose mimicry and only produce minimal results for pose redirection.

The AJCD metric provides a way to preserve body posture of an avatar as body posture conveys a large amount of affective state of a user. For example, take the affective states presented in FIG. 16. The user in FIG. 16 (at a) has a posture that presents a relaxed state of mind. The naive redirection in FIG. 16 (at b), presents a stiffer posture that can be associated with a more stressed state. The Pose Mimicry performed in FIG. 16 (at c) and Pose Redirection performed in FIG. 16 (at d) both preserve the presentation of a relaxed state on the user's avatar.

Introduction

Successfully adapting user's actions to their avatar representation consists of various components such as the method used to transfer the information between the remote and local environments, metrics used to represent body pose and nonverbal behavior and the techniques used for redirecting gestures.

Avatars have long been customized according to the user's non-verbal behaviors to increase their sense of social presence. There are two common ways to convey full-body non-verbal behavior. First, the RGBD data of the human can be captured using a 3D point cloud, which is then transported and replayed on a remote device. Second, human data can be overlayed onto a 3D model to create photorealistic avatars. Although the 3D point cloud is realistic and accurately depicts the person, it cannot easily be manipulated or redirected to the correct locations in the remote environments. As a result, error correction using a photorealistic and poseable avatar is preferred. Avatar redirection can take many forms, from imitating the body posture of other users, to applying local transformations of avatars to provide a shared point of view. Recent literature in shared perspective incorporated basic positional manipulation of gestures in order to maintain meaning while discussing objects present in mutual workspaces.

In terms of preserving the workspace and gestures, recent work includes "Mini-me", where gaze, body orientation and hand redirection are explored in mixed reality. When considering full body redirection there are dual objectives that come into play, i.e., to keep the avatar pose as similar to the original interaction while making sure the end-effector reaches the correct target position. Various metrics have been proposed in literature to measure and compare the similarity of human body poses. The most basic of these are the joint coordinate distance (JCD) and weighted joint coordinate distance (WJCD), where a Euclidean distance metric between the Cartesian positions of the joint configurations of the user and their remote avatar is calculated. The weights in WJCD can be defined according to the users preference for enhancement of a particular joint. Many more features can be added to the body pose metric to capture the spatial relations between the joints. With more features added, the number of weight variables also increase. Hence a method was presented where the weights were learned automatically from human labeled data. Labeling data, however, requires extensive manpower and requires large datasets for convergence, with the sample size reaching up to 12,000 pose pairs. To reduce this manpower need and considering the availability of large unlabeled pose data from motion capture systems, a semi-supervised learning distance metric named Regularized Distance Metric Learning with Sparse Representation (RDSR) was proposed. Although the number of features used for RDSR compared to WJCD was greater, the difference in accuracy vis-a-vis human perception was small, with 88% for WJCD compared to 92% to RDSR. This led to the conclusion that pose metrics have to be chosen according to the user's needs considering the trade-off between accuracy and real time computing requirements. In previous work the WJCD was used and integrated with an optimization framework for redirecting interactions. However, since WJCD relies on the Cartesian distance between the users and avatar's pose, it cannot capture rotational singularities while redirecting gestures. Such singularities are taken into account with the new proposed distance metric discussed herein.

Many situations in games and computer graphics applications require the humanoid character's end-effectors, i.e., limbs, to be at particular target positions. Examples include when holding onto a moving object or walking on an uneven surface. The challenge of deriving joint positions such that the end-effectors are at desired locations is known as the inverse kinematics (IK) problem. Humanoid models are highly redundant, which means that solutions to the IK problem are usually non-unique. The high DoF of the humanoid model coupled with the many joint and motion constraints associated with naturalistic motion creates a highly complex problem to which there is not a simple general solution. Approaches exist that focus on solving IK for isolated kinematic chains, such as an individual arm or leg, in order to reduce the complexity and solution space. Unfortunately, full-body IK solutions must rely on iterative, numerical methods to arrive at solutions that satisfy imposed constraints. Well-known heuristic algorithms include cyclic coordinate descent (CCD) and Forward and Backward Reaching Inverse Kinematics (FABRIK). These algorithms act on serial kinematic chains and provide quick, low-computation solutions for positioning the end-effectors of humanoid models. One of the drawbacks of using these heuristic solutions is that they cannot easily incorporate pose constraints, leading to unrealistic poses and unnatural motion. This problem is overcome by gradient-based IK algorithms, which involve the computationally expensive calculation of first or second order derivatives of an optimization criterion: $g=g(\theta)$. Converging onto a solution that accounts for pose or motion constraints can then be framed as minimizing g.

A key component of most gradient-based algorithms is the Jacobian matrix, $J(\theta)$, of the model's forward kinematics. The Jacobian relates the instantaneous velocity of a kinematic chain's end-effector, $\dot{x}$, to the joint velocities within the chain, $\dot{\theta}$. The advantage of gradient based algorithms involving the Jacobian matrix is that custom constraints can be set for each joints. However, a major drawback is that they suffer from the multiple local optima problem, which becomes noticeable when applied for complex geometries such as a humanoid model. Improvements to it could be made by introducing heuristic restarts using random initial seeds and combining with sequential quadratic programming which have shown good results when applied to serial chains. Recently, evolutionary computing-based IK solutions have been found to be effective at finding better globally optimal solutions. However, these are time consuming. In order to obtain the best of both worlds Starke et. al presented a hybrid approach of gradient and evolutionary based algorithms, which was compared with analytic, heuristic and Jacobian-based methods and shown to be highly effective and robust at finding valid solutions. The algorithm, Bio-IK, has also been shown to be flexible in satisfying simultaneous position, orientation, and displacement objectives while finding solutions, making it an efficient method for a wide range of inverse kinematic problems.

Augmented Joint Coordinate Distance Metric

The Augmented Joint Coordinate Distance (AJCD) metric is applied to address the problems discussed above relate to preservation of pose. AJCD is a modified form of the Weighted Joint Coordinate Distance (WJCD) metric.

BioIK Framework

As described above, Starke et al. developed a hybrid gradient and evolutionary based algorithm for generic full-body inverse kinematics. Oftentimes, no single solution exists that optimizes all objectives at once, and instead a "noninferior" solution is converged upon wherein no single objective function can be improved upon without significantly degrading other objective values. The question of what is viewed as "significant" degradation is often subjective and, in the case of Starke's BioIK, inferred through the manually assigned weights of each objective function.

A feature of BioIK that is of great importance is how the error terms for the joints are described. This is done through a Root-Mean-Squared-Error (RMSE) approach:

$$\phi = \sqrt{\frac{1}{k}\sum_{i=1}^{k}\omega_i \mathcal{L}_i^2(\theta)} \quad \text{(eq. 23)}$$

where $\mathcal{L}_i(\theta)$ is a single objective function that returns a scalar value based on the configuration of a body joint, $\theta$, $\omega_i$ is that objective function's assigned weight in the BioIK framework, and k is the total number of objective functions in the system. The configuration of a joint, $\theta$ represents the current state of the joint. Depending on implementation of the objective function, this could be the joint's articulation angle or its current position and orientation in space. It is important to note that $\theta$ is a single joint in a kinematic configuration, and not $\overline{\theta}$, all joints within the system. This means that a separate objective function is assigned for each joint of interest within the system, and any custom objective functions defined operate on a single joint. When optimizing on these objective functions BioIK generates a solution consisting of a joint configuration $\overline{\theta}$ that is a noninferior solution to the provided objectives.

By using an RMSE approach, BioIK "simplifies" the multi-objective problem into a single combined objective: the minimization of $\phi$.

This framework works to optimize on avatar pose by defining the concept of a Primary Error and a Secondary Error. Primary Error, denoted by $x_{pe}$, is defined as:

$$x_{pe}=\alpha\Sigma_{i=1}^{n_p}d_E^2(p_i,g_i) \quad \text{(eq. 24)}$$

where $d_E(p_i,g_i)$ is the Euclidean distance metric between an end-effector's current position, $p_i$, and its goal position, $g_i$, and $n_p$ is the total number of end effectors in an avatar. For example, $n_p$ could be 4, one for each hand and foot.

Secondary Error, denoted by $x_{se}$, is defined as:

$$x_{se}=\beta\Sigma_{i=1}^{n_\theta}e^2(\theta_i,\theta_i^r) \quad \text{(eq. 25)}$$

where $e(p_i,p_i^r)$ is an arbitrary error metric, this time between the pose of a joint, $\theta_i$ and its reference pose $\theta_i^r$. $n_\theta$ is the number of joints in the avatar.

The primary and secondary weights, $\alpha$ and $\beta$, are dynamically calculated as:

$$\alpha = \frac{L}{1+e^{-k_{tol}x_{pe}}} \quad \text{(eq. 26)}$$

$$\beta = L - \alpha \quad \text{(eq. 27)}$$

where L is a manually set base weight, $$\frac{1}{1+e^{-k_{tol}x_{pe}}}$$

is a logistic function, and $k_{tol}$ is a manually defined tolerance constant. The result is that as the primary error is minimized, i.e., the hands of an avatar arrive at their goal destination, the weights $\alpha$ and $\beta$ shift to prioritize the secondary error, telling the optimization framework to prioritize avatar pose when converging further upon an optimal solution.

The primary and secondary errors are then combined using Equation 23 to produce an overall objective metric, $\phi$:

$$\phi = \sqrt{\frac{1}{k}\left(x_{pe} + x_{se} + \sum_{i=3}^{k}\omega_i \mathcal{L}_i^2(\theta)\right)} \quad \text{(eq. 28)}$$

where the third term represents any other additional (and arbitrary) objective functions being imposed on the system. Defining a proper secondary error metric, $e(\theta_j, \theta_j^r)$, is the main goal, resulting in the AJCD metric, and is discussed below.

Weighted Joint Coordinate Distance

The WJCD metric is a simple calculation based on the Euclidean distance between two points. This can be applied to a joint in a kinematic chain to give an estimate of how close a joint's position in space is to a target point. The closer the joint is to it's target, the smaller the WJCD metric becomes. When used in an optimization framework the goal is to minimize the WJCD, a process that is described in Equation 29, with $\theta_j$ representing a specific joint pose within an avatar's kinematic structure and $\theta_{j_{local}}$ representing a local target joint pose:

$$\min(WJCD(\theta_j, \theta_{j_{local}})) = \min(\|P_j^{S_R} - P_{j_{local}}^{S_L}\|) \quad \text{(eq. 29)}$$

Figure 17:
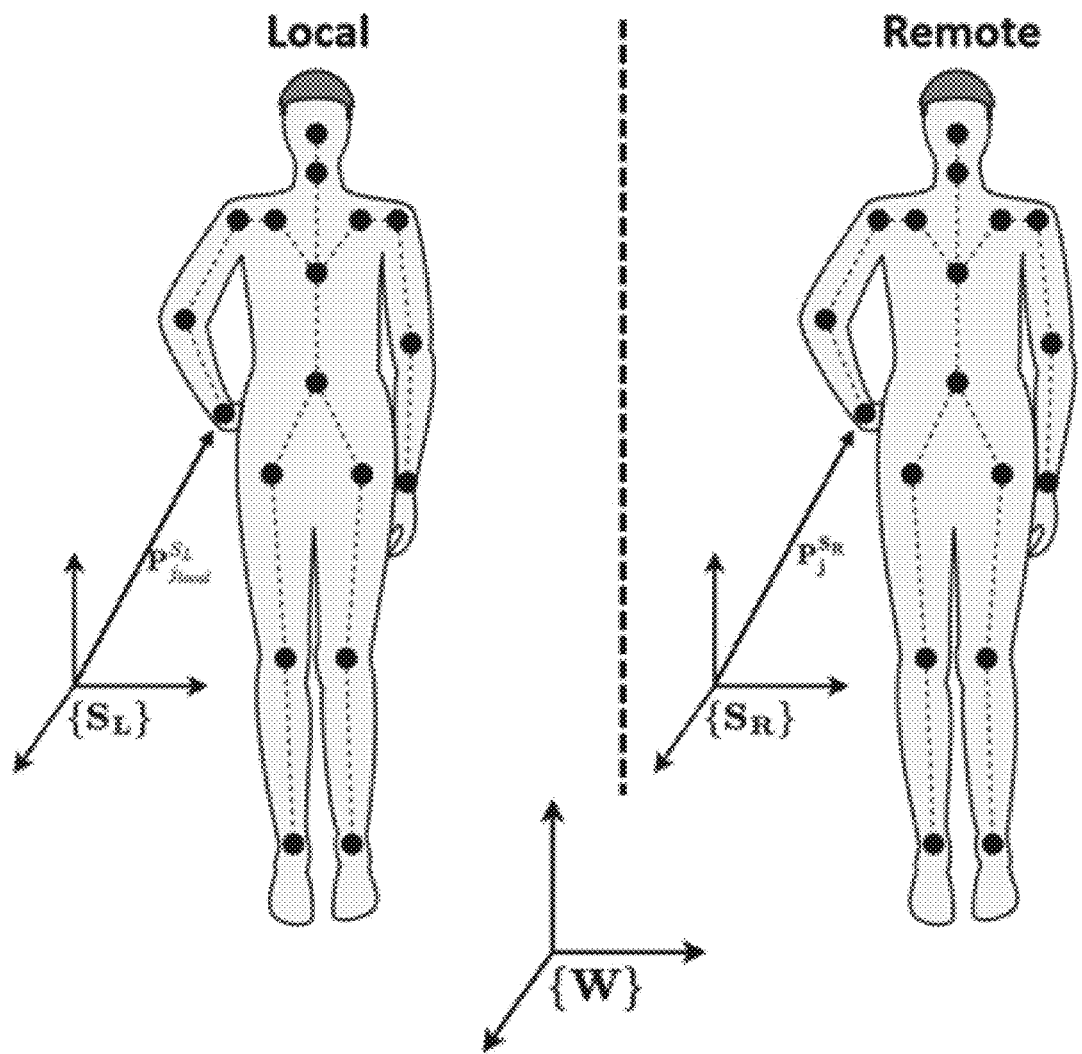
FIG. 17 illustrates preservation of body pose, each joint $\theta_j$ in a remote avatar is set to track its matching joint $\theta_{jlocal}$ in the body tracking data of the local user. The distance of each joint from a given reference frame $\{S_L\}$ and $\{S_R\}$ for local and remote, respectively, is then calculated. The weighted difference between paired joint distances is the WJCD metric.

$P_j^{S_R}$ is the 3D coordinate with respect to a coordinate system $S_R$ of a joint in a remote avatar that is manipulated and $P_{j_{local}}^{S_L}$ is the joint's relative goal position with respect to a coordinate system $S_L$, taken from the body tracking data of a local user (see FIG. 17).

MR/AR applications are typically developed and run using commercial game engines such as Unity or Unreal Engine. These development environments provide the positions of virtual objects using a world coordinate system. In order to be directly implemented in such a game engine the WJCD needs to be rewritten using world coordinates. This is done by substituting coordinates of the form $P_i^S$ with the following:

$$P_i^S = P_i^W - P_S^W \quad \text{(eq. 30)}$$

Equation 30 is used to modify both the $P_j^{S_R}$ and $P_{j_{local}}^{S_L}$ terms in Equation 29, producing a WJCD metric that is in terms of world coordinates only:

$$WJCD(\theta_j, \theta_j) = \|(P_j^W - P_{S_R}^W) - (P_{j_{local}}^W - P_{S_L}^W)\| \quad \text{(eq. 31)}$$

The WJCD objective function is then incorporated into the Primary/Secondary error scheme previously detailed as:

$$x_{se} = \beta \sum_{i=1}^{n\theta} \omega_i WJCD(\theta_i, \theta_{i_{local}}) \quad \text{(eq. 32)}$$

It is called the Weighted Joint Coordinate Distance because each individual joint's distance metric has its own independent weight, $\omega_i$, in the secondary error calculation, with the constraint that the sum of all weights $\omega_i$ is equal to unity. This allows for the development of custom weighting schemes that prioritizes specific joints in the body. Such weighting schemes are currently calculated manually using a trial-and-error process.

Augmenting the WJCD

Figure 18:
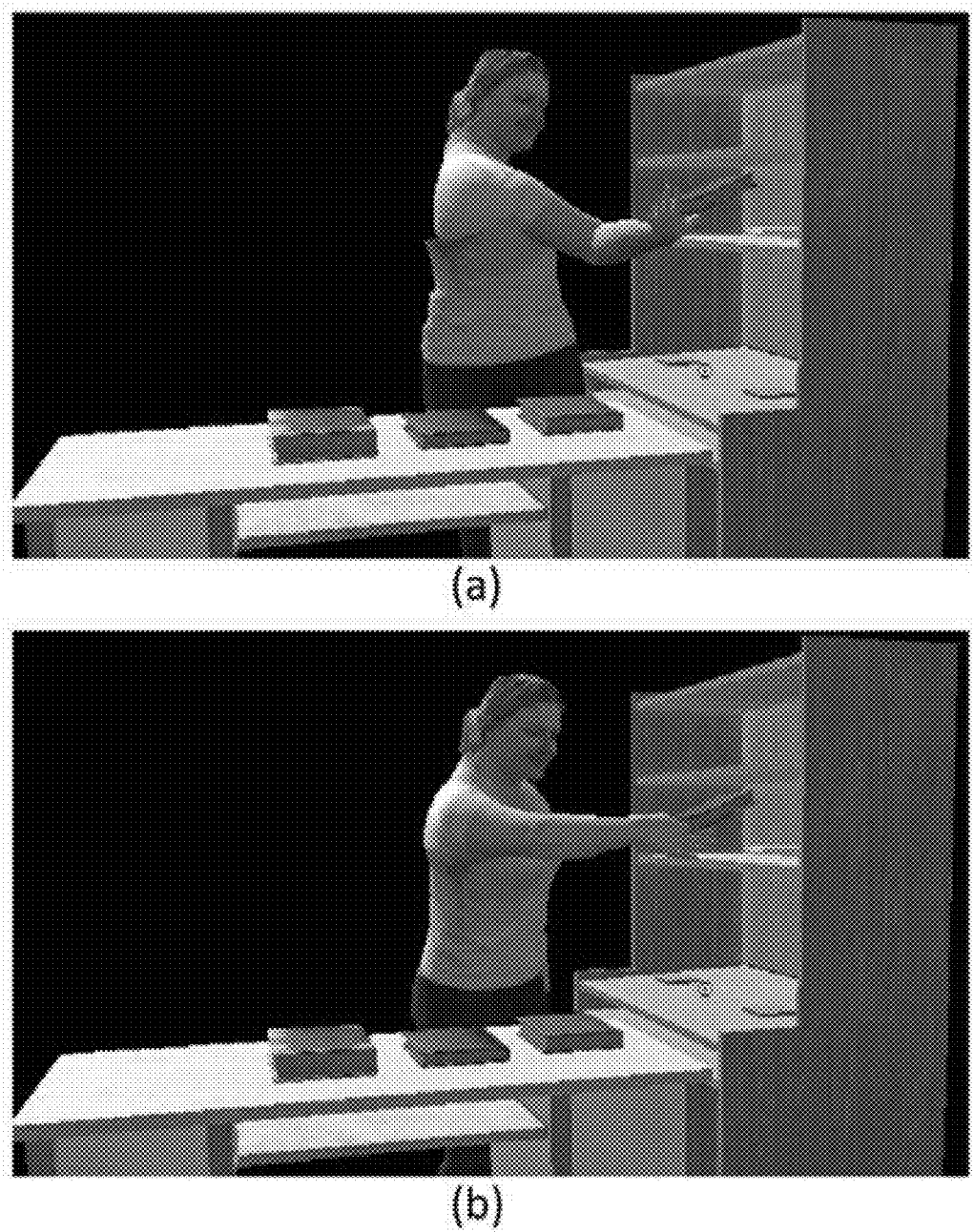
FIG. 18 illustrates a comparison of the WJCD and AJCD techniques. In (a) the WJCD metric alone does not account for overall pose cohesion and can often produce results with inverted or unrealistic joint angles, such as the shoulder and elbow shown here. The AJCD metric in (b) takes into account joint angles and preserves accurate and realistic body posture.

The WJCD function by itself fails in many scenarios due to its lack of consideration of joint orientation. This is especially evident in singularity situations, where an avatar's elbow or knee is bent in the wrong direction during the creation of an "optimal" solution, shown in FIG. 18. Optimizing on joint position alone is not sufficient for avatar posture that does not produce an uncanny effect.

The proposed solution to this quandary is to add an additional term to the objective function metric that considers joint orientation in 3D space to be used alongside the WJCD term. This can be thought of as an augmentation of the WJCD, leading to its name, the Augmented Joint Coordinate Distance metric. The orientation of a joint refers to the choice of direction of articulation for a joint's single degree-of-freedom movement with respect to the 3D space it exists in. For example, an elbow joint's orientation affects whether the elbow bends in an "upward" fashion towards the shoulder or in a "sideways" fashion towards the torso.

To develop the AJCD, first represent the metric as the WJCD and an augmented term that considers both the current orientation of a joint in a given solution and its target orientation:

$$AJCD(\theta_j, \theta_{j_{local}}) = \|P_j^{S_R} - P_{j_{local}}^{S_L}\| + \gamma \|\angle R_{j_{local}}^W - R_j^W\| \quad \text{(eq. 33)}$$

where $R_j^W$ is a rotation matrix describing the joint's orientation with respect to the world frame and $R_{j_{target}}^W$ target is a target rotation matrix for that join. $\gamma$ is a constant used to adjust for the difference in units between the first and second terms. For the following discussion, $\gamma$ was manually set to be $$0.25 \frac{m}{\text{radians}}.$$

Figure 19:
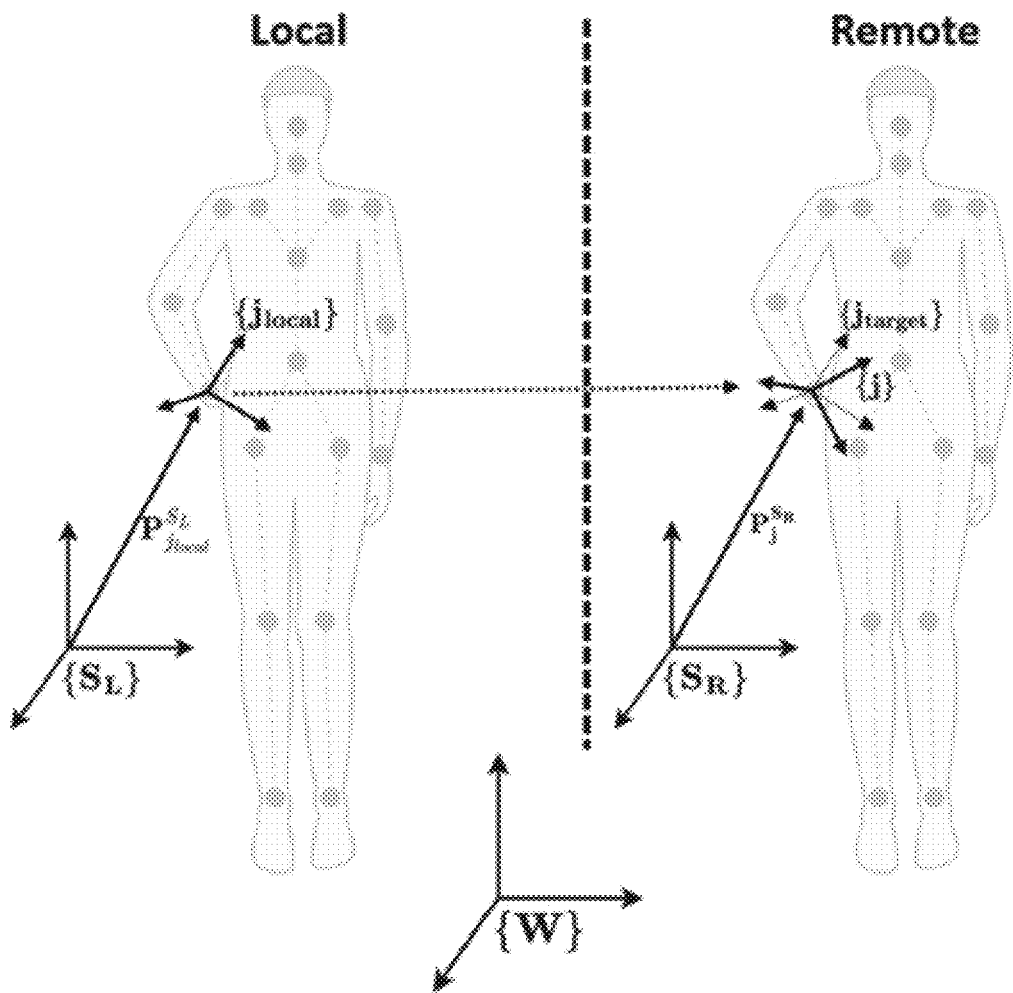
FIG. 19 shows body pose is more accurately preserved by adding a target orientation, $R_{j_{target}}{}^W$, for each joint in an avatar body. $R_{j_{target}}{}^W$ is calculated by measuring the orientation of a target joint $\theta_{j_{local}}$ with respect to a reference frame $\{SL\}$ and then creating a quaternion with the same orientation with respect to $\{SR\}$.

The next step is to calculate $R_{j_{target}}^W$. Start by representing $R_{j_{target}}^W$, as the pre-multiplication of $R_{j_{local}}^{S_L}$ the rotation between the local reference frame and the $\{j_{local}\}$ frame described in FIG. 19, by the rotation between the world frame and remote reference frame, $R_{S_R}^W$:

$$R_{j_{target}}^W = R_{S_R}^W R_{j_{local}}^{S_L} \quad \text{(eq. 34)}$$

As done earlier when deriving the WJCD metric, the rotation between the local reference frame and $\{j_{local}\}$ should be written in terms of the world frame so that all terms are in world coordinates:

$$R_{j_{local}}^{S_L} = R_{S_L}^{W^{-1}} R_{j_{local}}^W \quad \text{(eq. 35)}$$

Combining Equations 34 and 35 gives the following definition for $R_{j_{target}}^W$:

$$R_{j_{target}}^W = R_{S_R}^W R_{S_L}^{W^{-1}} R_{j_{local}}^W \quad \text{(eq. 36)}$$

The modern game engines that drive MR/AR applications represent rotations as quaternions due to their well-defined mathematical properties and to avoid the singularity issues associated with Euler angles. A basic operation on two quaternions is to calculate the angle between them as $\theta = 2\cos^{-1}(|q_1 \cdot q_2|)$. This gives the following substitution for the augmented term:

$$|\angle R_{j_{target}}^W - R_j^W| = 2\cos^{-1}|q_{j_{target}}^W \cdot q_j^W| \quad \text{(eq. 37)}$$

Plug Equation 36 into Equation 37 to get the augmented term in quaternions and world coordinates:

$$|\angle R_{j_{target}}^W - \angle R_j^W| = 2\cos^{-1}|(q_{S_R}^W q_{S_L}^{W^{-1}} q_{j_{local}}^W) \cdot q_j^W| \quad \text{(eq. 38)}$$

Referencing Equation 31 for the position term and Equation 38 for the augmented term, the total AJCD error function can be assembled for a given joint $\theta_j$:

$$AJCD(\theta_j, \theta_{j_{local}}) = \|(P_j^W - P_{S_R}^W) - (P_{j_{local}}^W - P_{S_L}^W)\| + 2\cos^{-1}|(q_{S_R}^W q_{S_L}^{W^{-1}} q_{j_{local}}^W) \cdot q_j^W| \quad \text{(eq. 39)}$$

As with the WJCD multi-objective optimization metric in Equation 32, the AJCD is incorporated into the Primary/Secondary error scheme and can have a varied weight, $\omega_i$ for each joint in the avatar body, leading to custom manually calculated weighting schemes to give the best performance for a given scenario.

AJCD Frames of Reference

The formulation of the AJCD so far has assumed that the reference frames $\{S_L\}$ and $\{S_R\}$ remain constant for every joint $\theta_i$ in an avatar's body, or, in other words, that:

$$S(\theta_i) = \{S\} \quad \text{(eq. 40)}$$

But this does not necessarily need to be the case. Depending on the scenario, it might be beneficial for each joint to have its own reference frame so that accumulated positional and rotational error is negated. One such method of assigning frames is detailed below, where each reference frame is assigned based on the joint's relative position in its kinematic chain. The terms AJCD Static and AJCD Relative will be used to distinguish between the constant frame and relative frame assignment methods.

Figure 20:
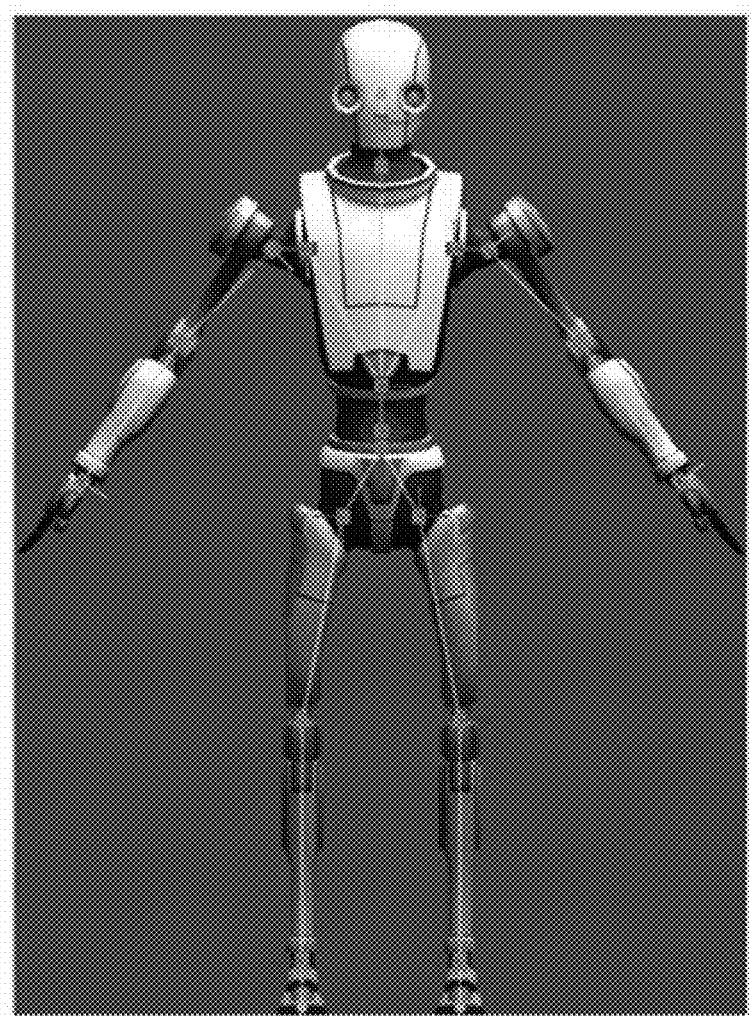
FIG. 20 illustrates (a) an avatar is made of multiple kinematic chains stemming from a root joint. (b) Within a single kinematic chain, a joint preceding a given joint $\theta_i$ can be assigned as its frame of reference. The first two joints in a kinematic chain are assigned a base frame $\{S\}$ as their frame of reference.
Figure 20:
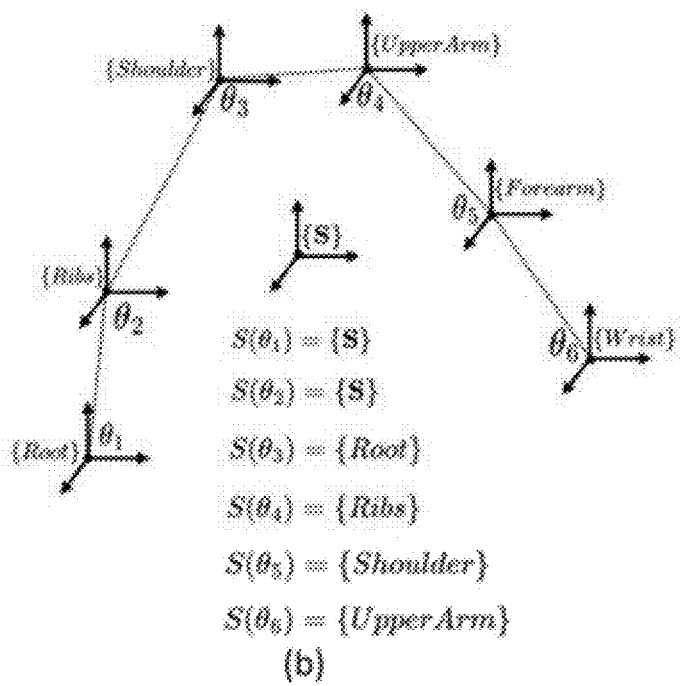

As shown in FIG. 20 (at a), all joints in an avatar are part of at least one kinematic chain, as a kinematic chain exists for each appendage and the head. A relative reference frame assignment method is to choose a kinematically closer reference frame further up the kinematic chain for each joint:

$$S(\theta_i) = \begin{cases} \{S\}, & i \leq 2 \\ \{\theta_{i-2}\}, & \text{otherwise} \end{cases} \quad \text{(eq. 41)}$$

When choosing to assign relative frames, the AJCD secondary error metric then becomes:

$$AJCD(\theta_j, \theta_{j_{local}}) = \quad \text{(eq. 42)}$$
$$\left\| \left( P_j^W - P_{S_j}^W \right) - \left( P_{j_{local}}^W - P_{S_{j_{local}}}^W \right) \right\| + 2\cos^{-1}\left| \left( q_{S_j}^W q_{S_{j_{local}}}^{W^{-1}} q_{j_{local}}^W \right) \cdot q_j^W \right|$$

Motion Capture Data

It is important to have realistic body tracking data with which to test and validate the AJCD metric. To collect this, an AR book manipulation task was developed for participants to execute while their body movement is recorded. The book manipulation task is an AR scene that includes four visually distinct books laying on the surface of a desk, spaced three inches apart. Adjacent to the desk is an empty bookshelf with four colored markers on the shelves, one corresponding to each colored book. The books, desk, and bookshelf are all virtual objects placed within the user's physical workspace. Participants were asked to wear an AR head-mounted display (HMD) and stand behind the desk. They were asked to use their right hand to pick up a book and place it on top of its corresponding visual marker in the bookshelf. Participants were asked to stand in place and to turn at the waist when moving the book in order to avoid adding changes in their position with respect to the desk and bookshelf. This was repeated for each of the four books on the desk.

The relatively simple motion asked of participants is motivated by the quality of the motion capture setup. The setup used in this study did not have the fidelity to smoothly detect and record complex body postures such as extreme bends in the waist and knees. If such a posture were to be performed, it would result in visually unpleasing and jerky motion capture recordings.

While the participants were performing this task their body posture was recorded using an Azure Kinect with body tracking software. The body tracking data was then converted into an animation file in Unity for playback on a virtual avatar. The nature of converting Kinect motion capture data to a Unity animation involves mapping the recorded participants' joints onto a generic avatar rig. This means that differences in body type between participants, such as height, arm length, torso length, etc., are not maintained in the animation. This restriction also extends to live streaming of Kinect body data within Unity. Additionally, the trajectory and orientation of each book was recorded during manipulation in order to replay the book movement and rotation over time.

The book manipulation task was presented to users using the HoloLens 2 HMD. The HoloLens 2 provides both the ability to present virtual objects in the user's real environment and the ability to track hand movements and manipulate the available virtual objects. The manipulation task was created using the Unity 2020.3.34f1 game engine and Microsoft's Mixed Reality Toolkit (MRTK) v2.7.3. Body tracking animations were recorded using the Azure Kinect, an RGBD camera with a body tracking SDK.

In total, eight participants performed the book manipulation motion capture task. Animations and book trajectory files were created for each book, for each participant, but due to noise in body tracking data only seven recordings for each book were chosen to be kept. This led to a total of (7 recordings x 4 books) 28 sets of animations and book trajectories for use in subsequent experimentation.

EXAMPLE

The efficacy of the disclosed pose adaptation algorithm was tested to show that it performs better than current state-of-the-art algorithms. The testing was conducted with two within-subjects, counterbalanced experiments. The first experiment was technical in nature and then a user evaluation experiment. In each experiment, five algorithms (two state-of-the-art, one from previous work, and two AJCD variants) were used and their results compared against each other. The first experiment was a quantitative test of end-effector accuracy and accuracy in the position and rotation of body joints as compared to a reference pose, and was conducted entirely within the Unity game engine. The second experiment was conducted in AR and involves subjective feedback from human participants who wore a HMD and observed a recreation of the book manipulation motion capture environment.

Tested Algorithms

Each experiment tested the performance of five separate pose adaptation algorithms. Two of these algorithms, Unity's built-in IK and BioIK, come from literature and can be considered as the current state-of-the-art in pose adaptation. The third algorithm is the WJCD optimization metric developed and utilized in previous work. The last two algorithms were two variants of the AJCD metric, one utilizing static reference frames and another using relative frames.

Unity's IK. Unity's IK, commonly utilized in major papers such as Piumsomboon et al., is the built-in inverse kinematics of the Unity game engine. This is a FABRIK-based algorithm that operates on a single kinematic chain, i.e., an arm or a leg. As such, it does not provide a full-body IK solution, limiting the range of motion for the redirected avatar. No blending between a target pose/animation and the IK solution is available. Instead, the kinematic chain being manipulated by the IK solver is unable to be modified to mimic a given body posture, while the rest of the avatar's joints are freely available to do so. This leads to an avatar which nearly exactly follows a target pose/animation, except for a single appendage controlled by the IK solver that attempts to correct for any inaccuracies in end-effector position and rotation.

BioIK. BioIK is the built-in algorithm of the framework developed by Starke et al. It has been shown in Starke's work to be an effective IK solution compared to other techniques such as heuristics or Jacobian-based processes. It is a hybrid genetic/gradient algorithm that operates on all joints in the system, which means that a full-body IK solution is given. A blending factor is provided to merge the IK solution with a given animation, but posture is not able to be integrated in the multi-objective optimization procedure. Instead, this means that the final IK posture and a given animation's posture are linearly blended with a user-defined mixing ratio.

WJCD and AJCD. As discussed above, the WJCD is a weighted Euclidean distance metric implemented as an objective function in the BioIK framework. The AJCD, developed in this paper, further adds a joint rotation component to the similarity metric. The difference in the two AJCD variants, AJCD-Static and AJCD-Relative, is the choice in reference frames. The AJCD-Static algorithm will utilize a single, constant frame of reference for all joint comparisons within the avatar. AJCD-Relative, on the other hand, will seek to minimize the degrees of separation within a kinematic chain between a joint and its reference frame. By doing so, the intent is to reduce the buildup of joint errors in the optimization process and increase end-effector accuracy.

Technical Testing

Figure 21:
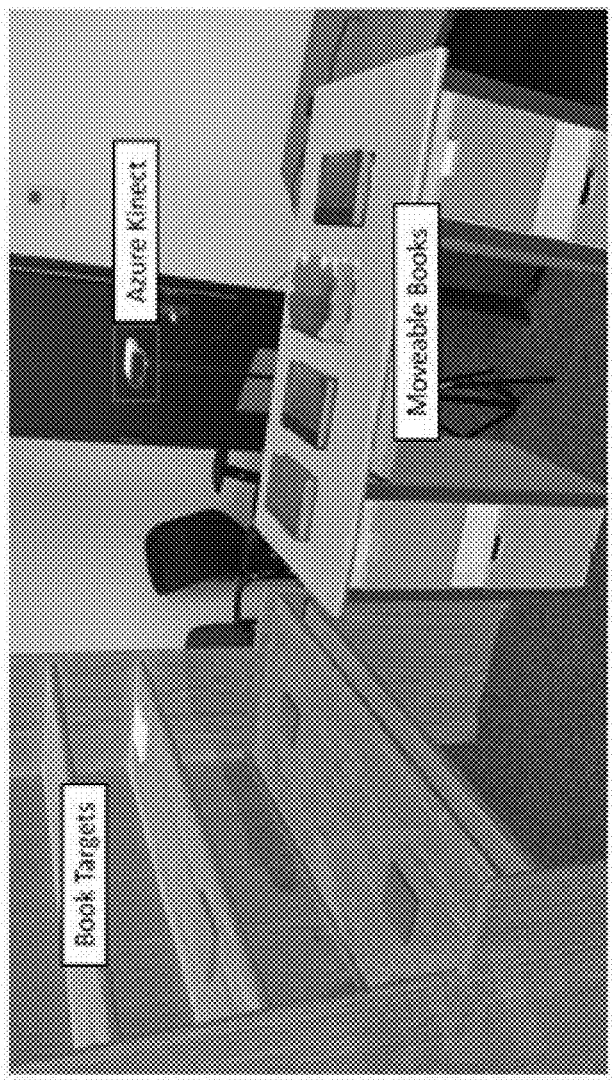
FIG. 21 illustrates the AR book manipulation task as seen from the HMD's point of view. Participants were asked to move each book from the desk onto their corresponding color targets on the bookshelf. An Azure Kinect recorded body data during book manipulation.
Figure 22:
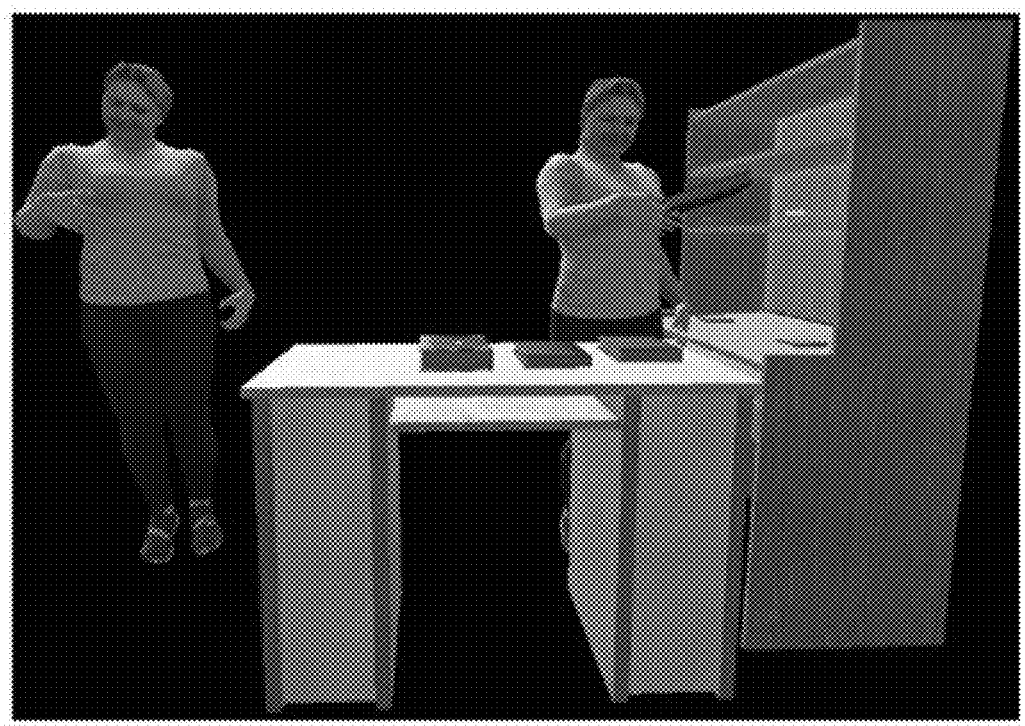
FIG. 22 illustrates experimental setups. (a) The technical experiment was run entirely within Unity. A motion capture animation was played on the left avatar, while the right avatar used a redirection algorithm to mimic its movements while maintaining contact with the book being moved. (b) The same setup was played within a user's physical workspace using an AR headset for the user evaluation experiment.
Figure 22:
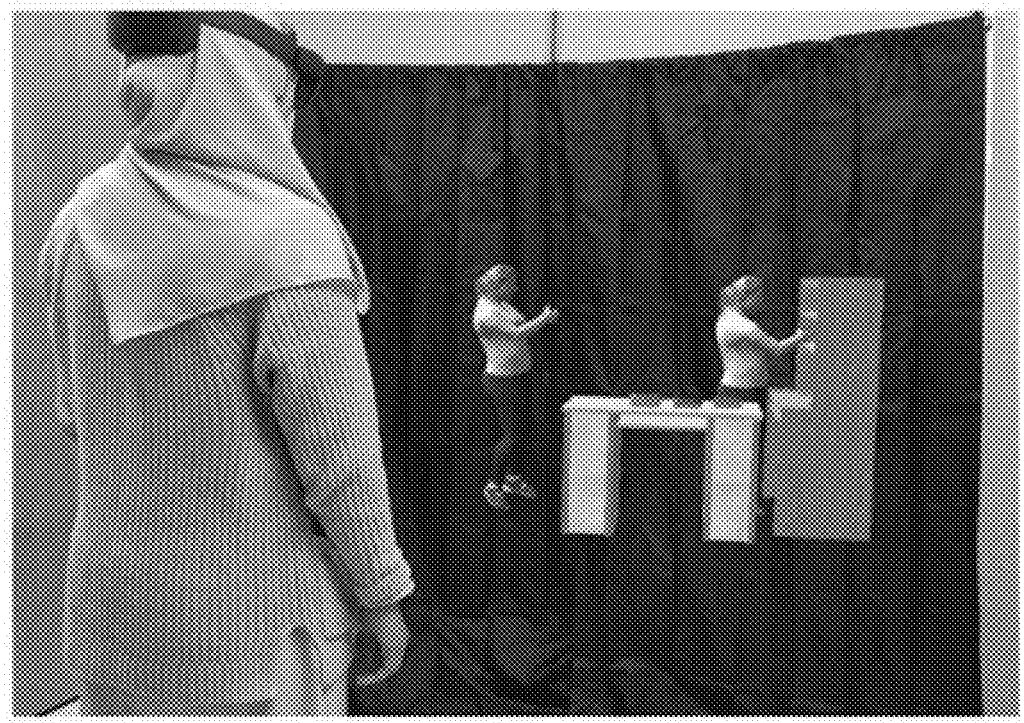

The technical experiment, depicted in FIG. 21 (at a), was developed and runs entirely within the Unity 2020.3.34f1 game engine. Two copies of a photorealistic avatar generated from a human model were placed within a virtual environment with the same assets and layout as the book manipulation motion capture scene. The first avatar, Avatar 1, was configured to play back a motion capture animation. Avatar 2 was placed approximately where the motion capture subjects stood behind the desk and beside the bookshelf. Avatar 2 was configured using one of the tested pose adaptation techniques in order to mimic the pose of Avatar 1 while maintaining contact with a target book. The reference animation of Avatar 1 was started in sync with the trajectory playback of the book being manipulated. By doing so, Avatar 2 attempted to recreate both the pose and movement of the motion capture animation while also maintaining appropriate contact with the book as it moved in its 3D trajectory from the desk to its end location on the bookshelf. During each trial (one animation+book trajectory pair), the distance of the end-effector (right hand) from the book is recorded, as well as body joint position and rotation errors between Avatar 1 and Avatar 2.

Pose Mimicry. The first group of animation+book trajectory pairs explored Pose Mimicry, which is the correction of minor positional inaccuracies when mimicking a pose without explicit redirections in one or more appendages. To do this, each recorded animation was paired with its corresponding book trajectory. The pose adaptation technique used is then tasked with accounting for minor incongruities between the avatar's placement within the scene and the location the recorded subject was standing within the same scene, as well as noise and inaccuracies inherent to the body tracking technology used.

Pose Redirection. The second group of animation+book trajectory pairs explored Pose Redirection, which is when an appendage or other body part is intentionally moved to a different position or pose than the reference body pose. To do this, each recorded animation was paired with each of the three book trajectories that do not correspond to the animation. This means that, for example, an animation of a participant moving the red book was played along with the book trajectory of the participant moving the brown book, with the avatar's hand redirected to make contact with the brown book as it moves. The pose adaptation technique used is then tasked with not only accounting for the inaccuracies present during Pose Mimicry, but also with maintaining accurate body posture while shifting the avatar's arm to make contact with the new book.

User Evaluation

Subjects were recruited for this evaluation. The user evaluation experiment was developed in Unity game engine using the Mixed Reality Toolkit v2.7.3 and deployed to the Microsoft HoloLens 2. As shown in FIG. 21 (at b) there are two avatars set up in the same manner as the technical experiment. Participants were asked to wear the HMD and view the avatars as the reference pose is played on Avatar 1 and the pose adaptation process and book tracking is performed for Avatar 2. Participants were then asked to respond to three Likert scale questions regarding the realism and believability of the observed book manipulation, detailed in Table 7.

TABLE 7

Likert scale questions for subjective feedback

| # | Statements* |
|---|---|
| Q1: Naturalism | The avatar on the right makes natural looking contact with the book. |
| Q2: Mimicry | The avatar on the right correctly mimics the posture of the avatar on the left. |
| Q3: Realism | The avatar on the right has realistic posture and movement. |

*On a scale of 1 to 7, where 1 is completely disagree and 7 is completely agree.

Pose Mimicry. As done with the technical testing, Pose Mimicry was the first pose adaptation type to be explored. Participants were shown 10 sets of animation+book pairs and asked to answer questions Q1-3. Two unique animation pairs were used for this section of the experiment, repeated for each of the five tested pose adaptation techniques, leading to a total of 10 trials. The first animation pair was randomly chosen from the red book manipulation trials, as the red book was placed closest to the user during the motion capture process. The second animation was randomly chosen from the brown book manipulation trails, as it was placed farthest from the user during motion capture. As a result, participants were shown an example of near and far-reaching poses during the Pose Mimicry trials.

Pose Redirection. Pose Redirection was presented to the participants in a similar manner. Participants were shown 10 sets of animation+book trajectory pairings and asked to answer questions Q1-3. For the Pose Redirection trials, 2 unique pairs were randomly chosen that combined a near reaching animation with a distant (brown) book trajectory and a far-reaching animation with a near (red) book trajectory, leading to 10 total trials. As a result, participants were shown pose redirections that involved both forward and backward leaning body movement.

Datasets. The Pose Mimicry data set includes 7 (motion capture subjects)×4 (book manipulation trials)×5 (number of tested techniques)=140 data points. The Pose Redirection data contains 7 (motion capture subjects)×3 (book redirection alternatives)×5 (number of tested techniques)=105 data points. In addition to the Pose Mimicry and Pose Redirection scenarios, it is also useful to look at the aggregate performance of each algorithm, as a typical application will likely switch between both modes during ordinary use. The Overall data set is an amalgamation of 140 (Pose Mimicry)+105 (Pose Redirection)=245 data points. Each data point in all sets contains the redirection, joint position, and joint rotation errors for a single executed trial.

Technical Results

Figure 23:
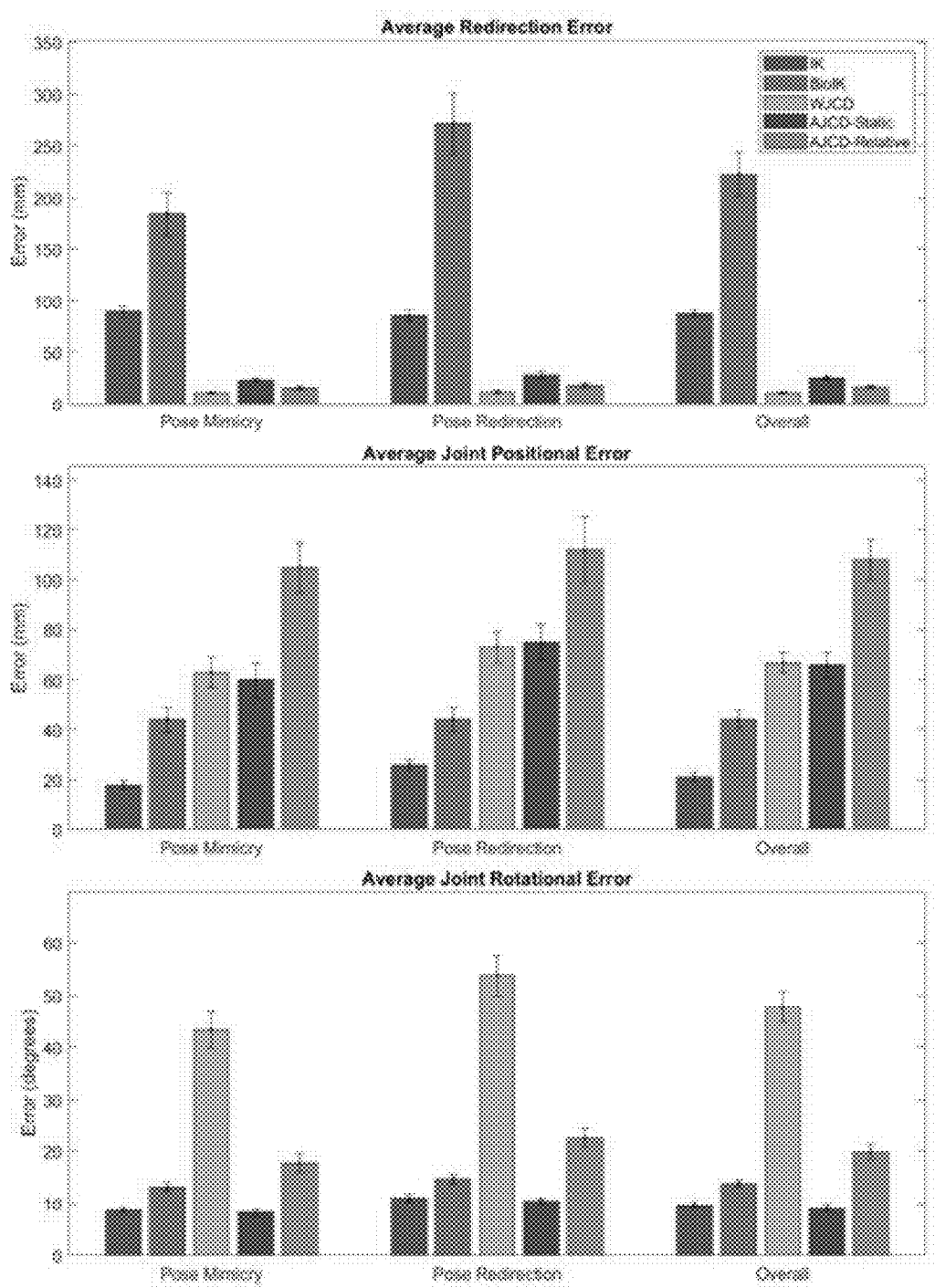
FIG. 23 graphically illustrates average redirection and joint errors for trial motion capture book manipulation data. Redirection error refers to the error in actual and target end-effector position, i.e., the error between the avatar's right hand and the target book. Rotational errors are not included in the redirection error as they will be described by the joint rotational error metric. Joint positional error is the Euclidean distance between the actual and goal joint locations. Joint rotational error describes the minimum rotation between actual and goal orientations for avatar joints. Error bars represent 95% Confidence Interval.

The results of the technical testing are shown in FIG. 23. Shapiro-Wilk tests were performed for each technique in each data set described above. All data failed to reject the null hypothesis that they came from a normal distribution. Following this, a one-way ANOVA test was performed for each data set to compare the effect of utilized technique on redirection error, joint position error, and joint rotation error. All one-way ANOVAs revealed that there was a significant difference between at least two groups (Table 8).

TABLE 8

Technical results ANOVA statistics

| Pose Mimicry | $F_{4, 135}$ | Effect Size* | p | Power* |
|---|---|---|---|---|
| Redirection Error | 254.1 | 0.95 | <0.001 | >0.99 |
| Joint Position Error | 98.8 | 0.88 | <0.001 | >0.99 |
| Joint Rotation Error | 262.7 | 0.94 | <0.001 | >0.99 |
| Pose Redirection | $F_{4, 100}$ | Effect Size* | p | Power* |
| Redirection Error | 315.6 | 1.00 | <0.001 | >0.99 |
| Joint Position Error | 88.2 | 0.88 | <0.001 | >0.99 |
| Joint Rotation Error | 381.2 | 0.96 | <0.001 | >0.99 |
| Overall | $F_{4, 240}$ | Effect Size* | p | Power* |
| Redirection Error | 351.7 | 0.94 | <0.001 | >0.99 |
| Joint Position Error | 172.0 | 0.88 | <0.001 | >0.99 |
| Joint Rotation Error | 438.0 | 0.94 | <0.001 | >0.99 |

*Effect size and power were calculated using G*Power 3.1.9.7

Redirection Error. For all three data sets, Pose Mimicry, Pose Redirection, and Overall, Tukey's HSD test for multiple comparisons found that the mean redirection error was significantly different between AJCD-Static and IK, BioIK, and between AJCD-Relative and IK, BioIK (p<0.001 for all). There was a significant difference between AJCD-Static and AJCD-Relative (all p<0.001). Finally, there was a significant different between WJCD and all other techniques (all p<0.001).

Joint Position Error. For all three data sets, Tukey's HSD test for multiple comparisons found that the mean joint position error was significantly lower for both IK and BioIK compared to both AJCD-Static and AJCD-Relative (all p<0.001). AJCD-Static was significantly lower than AJCD-Relative (all p<0.001). Additionally, there was no significant difference between WJCD and AJCD-Static ($p_{Pose\ Mimicry}$=0.186, $p_{PoseRedirection}$=0.518, $p_{Overall}$=0.536).

Joint Rotation Error. For all three data sets, Tukey's HSD test for multiple comparisons found that there was no significant difference in the means of rotation error between IK and AJCD-Static ($p_{PoseMimicry}$=0.998, $p_{PoseRedirection}$=0.997, $p_{Overall}$=0.994). AJCD-Static was significantly lower than BioIK (all p<0.001). The mean rotation error for AJCD-Relative was significantly higher than IK, BioIK, and AJCD-Static (all p<0.001). WJCD was significantly higher than both AJCD-Static and AJCD-Relative (all p<0.001).

Computational Performance. Table 9 displays the average computation time for generating an IK solution using each algorithm, as well as the resulting Frames per Second (FPS). Note that the FPS includes other overhead such as other computational processes and rendering time. Computational performance testing was run on an Intel Core i7-8700 CPU at 3.2 GHz and an NVIDIA Geforce GTX 1660 Ti GPU.

TABLE 9

Average computation time and FPS for each algorithm

| | Computational Time (ms) | FPS |
|---|---|---|
| UnityIK | 0.3 | 579.3 |
| BioIK | 0.9 | 487.9 |
| WJCD | 2.0 | 307.2 |
| AJCD-Static | 2.1 | 299.8 |
| AJCD-Relative | 2.0 | 301.5 |

User Evaluation Results

Figure 24:
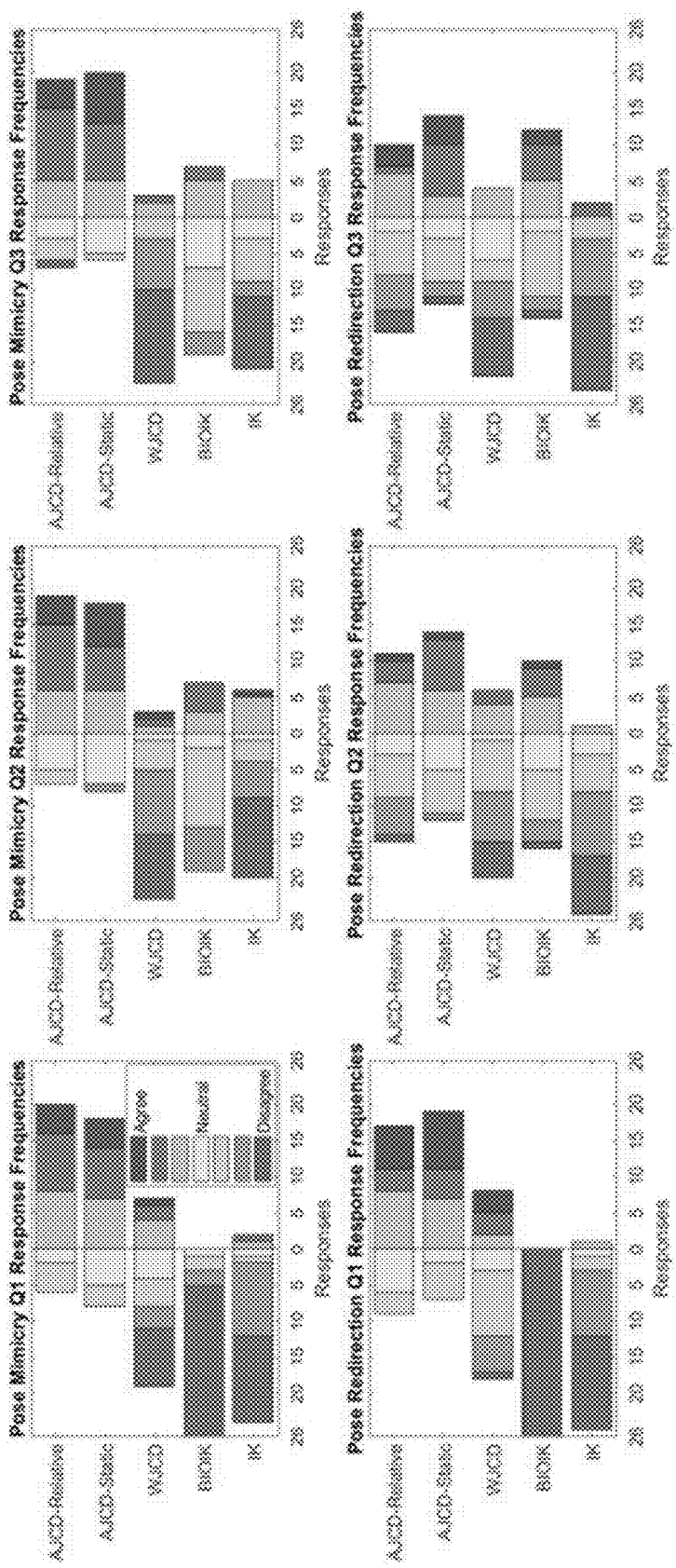
FIG. 24 illustrates user feedback from human subjects. For each of the 10 Pose Mimicry and 10 Pose Redirection trials subjects were asked to provide feedback for the questions presented in Table 7. As there were 13 subjects and 2 trials for each tested technique, each technique has a total of 26 responses.

In total, 13 subjects participated in the user evaluation experiment (see FIG. 24). Six were male, and seven were female. The median age of the subjects was 25.5 ($\sigma$=3.4). All subjects reported previous infrequent use of HMD VR/AR displays. All subjects reported normal or corrected-to-normal vision.

Shapiro-Wilk tests were performed for each technique in each data set. All data rejected the null hypothesis that they came from a normal distribution. Following this, the Kruskal-Wallis H test was performed for each data set to compare the effect of utilized technique on the results of questions Q1-Q3. All Kruskal-Wallis tests revealed there was a significant difference between at least two groups (Table 10). The evaluation results are shown in Table 11 and FIG. 24.

TABLE 10

User evaluation Kruskal-Wallis statistics

| | $H_{4, 125}$ | Effect Size* | p | Power** |
|---|---|---|---|---|
| Q1: Naturalism | | | | |
| Pose Mimicry | 76.8 | 0.58 | <0.001 | 0.97 |
| Pose Redirection | 91.9 | 0.70 | <0.001 | 0.98 |
| Q2: Mimicry | | | | |
| Pose Mimicry | 57.5 | 0.43 | <0.001 | 0.99 |
| Pose Redirection | 34.54 | 0.24 | <0.001 | 0.96 |
| Q3: Realism | | | | |
| Pose Mimicry | 66.1 | 0.50 | <0.001 | 0.99 |
| Pose Redirection | 37.0 | 0.26 | <0.001 | 0.95 |

*Effect size was calculated using the $\eta^2$ statistic
**Power was calculated using G*Power 3.1.9.7

TABLE 11

User Evaluation Questions Results

| | Q1: Naturalism | | Q2: Mimicry | | Q3: Realism | |
|---|---|---|---|---|---|---|
| | Mean | STD | Mean | STD | Mean | STD |
| Pose Mimicry | | | | | | |
| IK | 1.92 | 1.29 | 2.54 | 1.79 | 2.65 | 1.573 |
| BioIK | 1.35 | 0.80 | 3.54 | 1.39 | 3.77 | 1.14 |
| WJCD | 3.12 | 1.88 | 2.35 | 1.60 | 2.00 | 1.41 |
| AJCD (Static) | 5.15 | 1.26 | 5.31 | 1.32 | 5.58 | 1.21 |
| AJCD (Relative) | 5.23 | 1.27 | 5.31 | 1.19 | 5.19 | 1.50 |
| Pose Redirection | | | | | | |
| IK | 1.77 | 1.03 | 2.23 | 1.14 | 1.92 | 1.38 |
| BioIK | 1.00 | 0.00 | 4.00 | 1.52 | 4.19 | 1.65 |
| WJCD | 3.82 | 1.77 | 2.92 | 1.57 | 2.73 | 1.51 |
| AJCD (Static) | 5.31 | 1.49 | 4.58 | 1.33 | 4.62 | 1.79 |
| AJCD (Relative) | 5.12 | 1.34 | 3.88 | 1.58 | 3.69 | 1.87 |
| Overall | | | | | | |
| IK | 1.85 | 1.16 | 2.38 | 1.50 | 2.29 | 1.51 |
| BioIK | 1.17 | 0.58 | 3.77 | 1.46 | 3.98 | 1.42 |
| WJCD | 3.46 | 1.84 | 2.63 | 1.60 | 2.37 | 1.0 |
| AJCD (Static) | 5.23 | 1.37 | 4.94 | 1.36 | 5.10 | 1.59 |
| AJCD (Relative) | 5.17 | 1.29 | 4.60 | 1.56 | 4.44 | 1.84 |

Question One: Naturalism. For Pose Mimicry, AJCD-Static was significantly higher than IK (p<0.001), BioIK (p<0.001), and WJCD (p=0.005). There was no significant difference between AJCD-Static and AJCD-Relative (p>0.99)

For Pose Redirection, AJCD-Static was significantly higher than IK (p<0.001), and BioIK (p<0.001). There was no significant difference between AJCD-Static and WJCD (p=0.222) and between AJCD-Static and AJCD-Relative (p>0.99).

Question Two: Mimicry. For Pose Mimicry, AJCD-Static was significantly higher than IK (p<0.001), BioIK (p=0.015), and WJCD (p<0.001). There was no significant difference between AJCD-Static and AJCD-Relative (p>0.99).

For Pose Redirection, AJCD-Static was significantly higher than IK (p<0.001) and WJCD (p=0.02). There was no significant difference between AJCD-Static and BioIK (p=0.9) nor AJCD-Relative (p=0.715).

Question Three: Realism. For Pose Mimicry, AJCD-Static was significantly higher than IK (p<0.001), BioIK (p=0.015), and WJCD (p<0.001). There was no significant difference between AJCD-Static and AJCD-Relative (p>0.99).

For Pose Redirection, AJCD-Static was significantly higher than IK (p<0.001) and WCJD (p=0.002), but was not significantly different than BioIK (p=0.900) or AJCD-Relative (p=0.715). AJCD-Relative was not significantly different than WJCD (p=0.298) or BioIK (p>0.99).

The disclosed framework performed well when compared to current state-of-the-art pose redirection techniques. Large gains are achieved in end-effector accuracy while performing at least just as well, and usually even better, than current state-of-the-art. A general trend noticed in the experimental testing was the tendency for the AJCD adaptation technique to have comparable end-effector accuracy to the WJCD technique while having a marked increase in positive subject feedback from human subjects. In fact, the positive human subject feedback was significantly better than all other tested techniques, showing that the AJCD process leads to a good user experience when redirecting avatar posture and actions.

Regarding the IK and BioIK techniques, the technical testing clearly showed that while there is good mimicry of joint positions and rotations, this came at a significant loss in end-effector accuracy. The ramifications of this tradeoff are apparent in the human subject experiment, where responses overall are negative to neutral, except for BioIK's Pose Redirection Q3: Realism. BioIK's animation blending technique leads to an avatar that somewhat follows along with an animation, but is subdued in its expression. Simultaneously, this blending means that the end-effector accuracy is greatly diminished. Both of these observations are shown as a result of the experimentation. The mostly positive response to BioIK Pose Redirection Q3: Realism and its good quantitative results in joint mimicry, combined with the poor results for BioIK end-effector accuracy and negative feedback for Pose Redirection Q1: Naturalism, can be an indicator that accurate preservation of body posture is more important than accurate end-effector position for believable pose adaptation.

The WJCD technical results show that while it was the best performing technique in regards to end-effector accuracy, it had extremely poor mimicry of joint rotations compared to all other tested techniques. This is very nearly the inverse behavior as compared to the performance of the IK and BioIK techniques. Additionally, the results of the human subject feedback clearly showed that the WJCD had an overall negative opinion on Q1-3. The larger than normal amount of neutral responses to Q3: Realism show that it was a minor improvement compared to the IK technique, especially when considering the larger number of positive responses to Q1: Naturalism that is has compared to both IK and BioIK.

When considering the performance of the state-of-the-art and WJCD techniques, the overall trend was that each technique comes with a specific tradeoff, either sacrificing end-effector accuracy for accurate body posture mimicry or vice versa. When considering the human subject user feedback, it becomes apparent that neither one of these tradeoffs lead to accurate avatar performance. This leads to the conclusion that these techniques alone are insufficient for realistic and believable feedback.

AJCD-Static was the overall best performing pose adaptation technique for these experiments. Its end-effector error was only marginally higher than its WJCD cousin, especially when compared to the large increase of error found in IK and BioIK. It had average performance when it comes to joint positional error, but competes closely with Unity's IK technique for overall lowest joint rotational error. Unlike its WJCD predecessor and state-of-the-art techniques, there was no clear tradeoff between end-effector accuracy and accuracy in body posture mimicry. The results are even more in favor of the AJCD technique in general and AJCD-Static in particular when it came to subjective feedback. AJCD-Static had the most positive responses for all questions except Pose Mimicry Q1: Naturalism, and was close with its AJCD-Relative variant except for the high performance of BioIK in Pose Redirection Q3: Realism.

The AJCD-Relative variant exhibited much of the same performance as it's AJCD-Static cousin. Unlike AJCD-Static, there was a small but noticeable tradeoff in the quantitative data between end-effector accuracy and joint posture mimicry. It had significantly better end-effector accuracy than AJCD-Static while having a significantly worse performance in joint mimicry. That said, the ramifications of this are minor when translated to the user evaluation results.

AJCD-Relative performs slightly better than its Static counterpart for Pose Mimicry Q1: Naturalism and Q1: Mimicry, and is only slightly behind for Q3: Realism. This lead was not maintained when performing explicit pose redirection, with slightly worse performance overall than AJCD-Static for Pose Redirection Q1-3.

The overall takeaway from these results is that the AJCD-Relative variant can be a more accurate end-effector manipulation technique, coming at a very small and most likely unnoticeable cost of avatar realism and believability. These results demonstrate the versatility of the AJCD technique to adapt to different performance criterion.

The present disclosure provides the Augmented Joint Coordinate Distance (AJCD) multi-objective optimization objective function for preserving body posture during avatar adaptation. Current state-of-the-art techniques were shown to be insufficient for preserving such non-verbal behavior. Previous work, while improving upon the state-of-the-art, was also shown to have ineffective performance in comparison to the AJCD method. With the AJCD technique, errors in both the position and orientation of avatar body joints with respect to a reference pose were minimized, leading to an efficient, easily implemented objective function that was proven to be effective. When combined with other objective functions within a multi-objective framework, accurate posture mimicry was achieved even when undertaking explicit changes in hand/arm placement to display intended actions in AR.

Various features of the disclosure are set forth in the following claims.

What is claimed is:

1. A system to provide remote multi-user interactions in collaborative augmented reality (AR) via telepresence avatars, the system comprising:
   a first user wearing a first head-mounted display (HMD) positioned within a first environment;
   a second user wearing a second HMD positioned within a second environment, the first HMD communicatively coupled to the second HMD and configured to:
      receive, from external sensors, body pose angle data of the first user within the first environment;
      map the body pose angle data of the first user to the first user's telepresence avatar within the second environment while also redirecting an end effector of the first user's telepresence avatar to a corresponding object in the second environment that the first user intended to in the first environment by:
         applying a multi-objective optimization (MO) approach with dynamic weight allocation of an optimization fitness function to the body pose angle data of the first user, wherein the dynamic weight allocation includes weights dynamically distributed between a primary objective and a secondary objective based on a specified tolerance, and wherein the primary objective minimizes an error between the end effector of the first user's avatar and the object in the second environment, and wherein the secondary objective maximizes the preservation of the body pose angle data of the first user's telepresence avatar received from the first user.

2. The system of claim 1, wherein the MO approach is a priori type, using a scalarizing technique, knowing beforehand the order of importance of the primary objective and the second objective.

3. The system of claim 2, wherein the primary objective and the secondary objective are configured to fit into a single scalarized optimization function, with the secondary objective also taking into account the rotations of the captured user's body poses when redirecting the end effector of the first user's telepresence avatar toward the object.

4. The system of claim 3, wherein the primary objective and the secondary objective are optimized dynamically using a logistic function based on a minimum end effector-object error tolerance set by the first user, leading to smooth transfer of weights between the primary objective and the secondary objective resulting in natural looking interaction.

5. The system of claim 4, wherein the minimum end-effector-object error tolerance is configured to be modified depending on a type of the object allowing for optimized interaction in a large-scale environment.

6. The system of claim 1, wherein the second HMD is further configured to optimize for pointing interactions, wherein the primary objective is to reduce an angular error between a straight line from a joint used to point to the object and the straight line colinear with the corresponding bone for the joint, and wherein the secondary objective is to maximize the preservation of the body pose angle data of the telepresence avatar of the first user.

7. The system of claim 6, wherein the joint is a shoulder, a forearm, or a wrist.

8. The system of claim 1, wherein the telepresence avatar is an animation character including a plurality of joints and bones.

9. A method of providing remote multi-user interactions in collaborative augmented reality (AR) via telepresence avatars, the method comprising:
   receiving, from external sensors, body pose angle data of a first user within a first environment;
   receiving, from external sensors, body pose angle data of a second user within a second environment;
   receiving input of a minimum error tolerance;
   dynamically allocating weights between a first objective and a second objective based on the minimum error tolerance;
   mapping the body pose angle data of the first user to a telepresence avatar of the first user within the second environment, wherein the first objective minimizes an error between an end effector of the telepresence avatar of the first user and an object in the second environment, and wherein the second objective maximizes a preservation of the body pose angle data of the telepresence avatar of the first user; and
   mapping the body pose angle data of the second user to a telepresence avatar of the second user within the first environment wherein the first objective minimizes an error between an end effector of the telepresence avatar of the second user and an object in the first environment, and wherein the second objective maximizes a preservation of the body pose angle data of the telepresence avatar of the second user.

10. A system for mapping a user's positional interactions from a local environment to an avatar in a second environment, the system comprising:
   a head-mounted display (HMD) configured to be worn by a first user, the first user positioned within a first environment;
   a controller having one or more electronic processors, the controller communicatively coupled to a plurality of external sensors, the controller configured to:
      receive body pose angle data of the first user from the plurality of the external sensors, and execute a multi-objective optimization algorithm to apply a first objective and a second objective to the body pose angle data of the first user, wherein
the first objective of the multi-objective optimization algorithm minimizes a positional error between an end effector of a telepresence avatar of the first user and an object, and
the second objective of the multi-objective optimization algorithm maximizes a preservation of the body pose angle data of the telepresence avatar of the first user.

11. The system of claim 10, wherein the primary objective and the secondary objective apply a dynamic weight allocation to optimize the position of the end effector of the telepresence avatar of the first user relative to the object while preserving the body pose of the first user.

* * * * *